US012576391B2

(12) United States Patent
Seabaugh et al.

(10) Patent No.: US 12,576,391 B2
(45) Date of Patent: Mar. 17, 2026

(54) CATALYST SUPPORT MATERIALS, CATALYST SUPPORTS, CATALYSTS AND REACTION METHODS USING CATALYSTS

(71) Applicant: NEXCERIS INNOVATION HOLDINGS, LLC., Lewis Center, OH (US)

(72) Inventors: Matthew Seabaugh, Columbus, OH (US); Naftali Opembe, Powell, OH (US); Douglas Mitchell, Monrovia, IN (US)

(73) Assignee: NEXCERIS INNOVATION HOLDINGS, LLC, Lewis Center, OH (US)

( * ) Notice: Subject to any disclaimer, the term of this patent is extended or adjusted under 35 U.S.C. 154(b) by 210 days.

(21) Appl. No.: 16/972,865

(22) PCT Filed: Jun. 6, 2019

(86) PCT No.: PCT/US2019/035895
§ 371 (c)(1),
(2) Date: Dec. 7, 2020

(87) PCT Pub. No.: WO2019/236926
PCT Pub. Date: Dec. 12, 2019

(65) Prior Publication Data
US 2021/0245139 A1 Aug. 12, 2021

Related U.S. Application Data

(60) Provisional application No. 62/681,652, filed on Jun. 6, 2018.

(51) Int. Cl.
| | |
|---|---|
| *B01J 21/12* | (2006.01) |
| *B01J 21/04* | (2006.01) |
| *B01J 23/755* | (2006.01) |
| *B01J 27/224* | (2006.01) |
| *B01J 33/00* | (2006.01) |
| *B01J 35/00* | (2006.01) |
| *B01J 35/02* | (2006.01) |
| *B01J 35/30* | (2024.01) |
| *B01J 35/31* | (2024.01) |
| *B01J 35/55* | (2024.01) |
| *B01J 37/00* | (2006.01) |
| *B01J 37/02* | (2006.01) |
| *B01J 37/04* | (2006.01) |
| *B01J 37/08* | (2006.01) |
| *C01B 3/40* | (2006.01) |
| *C10G 2/00* | (2006.01) |

(52) U.S. Cl.
CPC .............. *B01J 21/12* (2013.01); *B01J 21/04* (2013.01); *B01J 23/755* (2013.01); *B01J 27/224* (2013.01); *B01J 33/00* (2013.01); *B01J 35/19* (2024.01); *B01J 35/31* (2024.01); *B01J 35/397* (2024.01); *B01J 35/55* (2024.01); *B01J 37/0018* (2013.01); *B01J 37/0207* (2013.01); *B01J 37/0217* (2013.01); *B01J 37/04* (2013.01); *B01J 37/082* (2013.01); *C01B 3/40* (2013.01); *C10G 2/332* (2013.01); *C10G 2/333* (2013.01); *B01J 2235/30* (2024.01); *C01B 2203/0233* (2013.01); *C01B 2203/1047* (2013.01); *C01B 2203/1052* (2013.01); *C01B 2203/1058* (2013.01); *C01B 2203/1064* (2013.01); *C01B 2203/107* (2013.01); *C01P 2004/03* (2013.01); *C10G 2300/1022* (2013.01); *C10G 2300/4006* (2013.01); *C10G 2300/4012* (2013.01); *C10G 2300/4018* (2013.01); *C10G 2300/70* (2013.01); *C10G 2400/30* (2013.01)

(58) Field of Classification Search
CPC . B01J 21/12; B01J 21/04; B01J 23/755; B01J 27/224; B01J 33/00; B01J 35/0006; B01J 35/008; B01J 35/026; B01J 37/0018; B01J 37/0207; B01J 37/0217; B01J 37/04; B01J 37/082; C01B 3/40
See application file for complete search history.

(56) References Cited

U.S. PATENT DOCUMENTS

| | | | |
|---|---|---|---|
| 6,616,909 | B1 | 9/2003 | Tonkovich et al. |
| 6,652,830 | B2 | 11/2003 | Wang et al. |
| 6,734,137 | B2 | 5/2004 | Wang |

(Continued)

FOREIGN PATENT DOCUMENTS

| | | | | |
|---|---|---|---|---|
| CN | 103910330 A | | 7/2014 | |
| EP | 2703082 A2 * | 3/2014 | .............. | B01J 23/40 |

(Continued)

OTHER PUBLICATIONS

Huestis et al., Thermochimica Acta, (2020), v.689, p. 178611.*

(Continued)

*Primary Examiner* — Yong L Chu
(74) *Attorney, Agent, or Firm* — Tucker Ellis LLP

(57) ABSTRACT

A catalyst having a core comprising a composite (A) of SiC grains and a protective matrix of one or more metal oxides, such as alumina, in voids between the SiC grains, said core having a density >60% of theoretical density, and a catalytically active layer (C) containing, e.g., Ni adhered to the core. A catalyst support comprising a composite of SiC grains and a protective matrix of one or more metal oxides in voids between the SiC grains is also provided, along with a method of fabricating a catalyst core. The catalyst can be used in Fischer-TRopsch synthesis or in steam methane reforming.

23 Claims, 12 Drawing Sheets

(56) References Cited

U.S. PATENT DOCUMENTS

| | | |
|---|---|---|
| 6,773,580 B2 | 8/2004 | Boger et al. |
| 7,008,560 B2 | 3/2006 | Ramani et al. |
| 7,105,107 B2 | 9/2006 | Ramani et al. |
| 7,585,899 B2 | 9/2009 | Wang et al. |
| 7,700,518 B2 | 4/2010 | Wang et al. |
| 7,951,350 B1 | 5/2011 | Taylor |
| 8,092,716 B2 | 1/2012 | Gary et al. |
| 8,569,202 B2 | 10/2013 | Watson et al. |
| 9,089,835 B2 | 7/2015 | Moon et al. |
| 9,346,714 B2 | 5/2016 | Izumi et al. |
| 9,387,462 B2 | 7/2016 | Partridge et al. |
| 2005/0169835 A1 | 8/2005 | Savin-Poncet et al. |
| 2007/0154728 A1 | 7/2007 | Ohno et al. |
| 2009/0011179 A1 | 1/2009 | Kikuchi et al. |
| 2009/0264277 A1 | 10/2009 | Raj et al. |
| 2014/0378297 A1 | 12/2014 | Tomita et al. |
| 2015/0191401 A1 | 7/2015 | Liu et al. |
| 2016/0214093 A1 | 7/2016 | Wang et al. |
| 2016/0312358 A1 | 10/2016 | Choi et al. |

FOREIGN PATENT DOCUMENTS

| | | | | |
|---|---|---|---|---|
| EP | 2138474 B1 | 8/2018 | | |
| JP | 2015-20929 A | 2/2015 | | |
| WO | WO-02098557 A1 * | 12/2002 | ........... | B01J 23/002 |
| WO | 2006/126018 A1 | 11/2006 | | |

OTHER PUBLICATIONS

Aitani, Abdullah M., Catalytic Naphtha Reforming, In Encyclopedia of Chemical Processing, pp. 397-406 (Dec. 12, 2007).

Choudhary, V.R. et al., Oxidative Conversion of Methane to Syngas over Nickel Supported on Commercial Low Surface Area Porous Catalyst Carriers Precoated with Alkaline and Rare Earth Oxides, Journal of Catalysis, vol. 172, Issue 2, pp. 281-293 (Dec. 1997).

* cited by examiner

CATALYST SUPPORT MATERIALS, CATALYST SUPPORTS, CATALYSTS AND REACTION METHODS USING CATALYSTS

CROSS REFERENCE TO RELATED APPLICATIONS

This application claims priority to U.S. Provisional Patent Application No. 62/681,652, filed on Jun. 6, 2018, entitled "CATALYST SUPPORT MATERIALS, CATALYST SUPPORTS, CATALYSTS AND REACTION METHODS USING CATALYSTS." The entire disclosure of the foregoing provisional patent application is incorporated by reference herein.

STATEMENT REGARDING FEDERALLY SPONSORED RESEARCH OR DEVELOPMENT

The present invention was partially made with Government support under grant number DE-SC0013114 awarded by the United States Department of Energy. The Government has certain rights in the invention.

BACKGROUND

While a variety of catalyst support materials, catalyst supports (also referred to here as catalyst cores), catalysts, methods for producing the foregoing, and reaction methods using catalysts may exist, it is believed that no one prior to the inventors has made or used an invention as described herein.

BRIEF DESCRIPTION OF THE DRAWINGS

While the specification concludes with claims particularly pointing out and distinctly claiming the invention, it is believed that the invention will be better understood from the detailed description of certain embodiments thereof when read in conjunction with the accompanying drawings. Unless the context indicates otherwise, like numerals are used in the drawings to identify similar elements in the drawings. In addition, some of the figures may have been simplified by the omission of certain elements in order to more clearly show other elements. Such omissions are not necessarily indicative of the presence or absence of particular elements in any of the exemplary embodiments, except as may be explicitly stated in the corresponding detailed description.

FIG. 6A is a picture of as-received commercial SiC pellets before (left) and after (right) exposure to 25% steam in air at 900° C. for 44 hours, while FIG. 6B shows a picture of the inventive catalyst support before (left) and after (right) exposure to the same conditions and time.

Figures 1, 2:
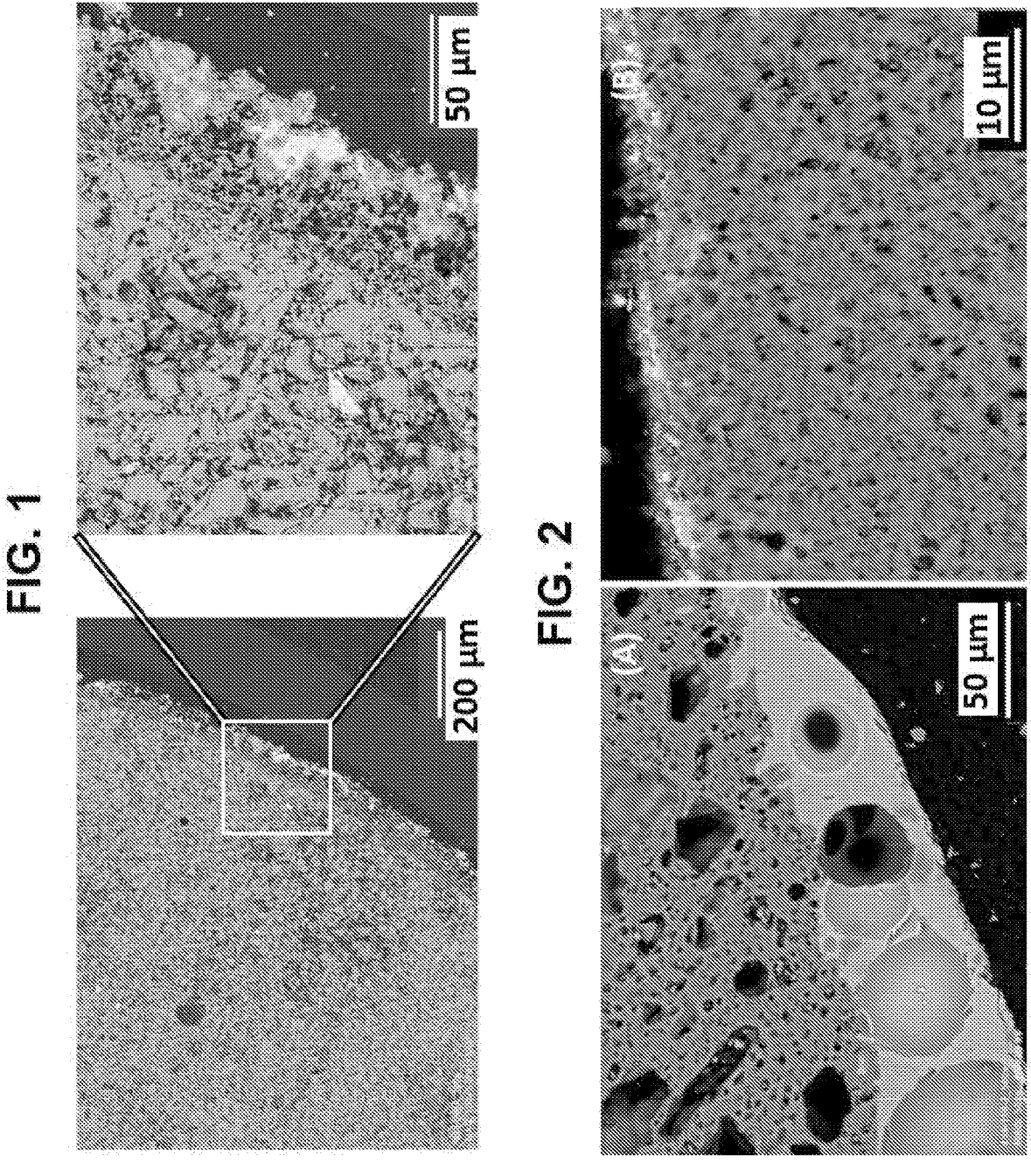
FIG. 1 provides SEM cross-sectional images of inventive catalyst at low magnification (left) and at high magnification (right) showing the interface between the core and outer layer. This material was processed in air at 1250° C., and contained an outer Al—Si layer.
FIG. 2 provides cross-sectional SEM images of the inventive materials coated with BSAS (A) and co-processed with BSAS (B) and heat-treated at high temperatures to transform BSAS into a protective coat. The BSAS is the white material.

The drawings are intended to illustrate rather than limit the scope of the present invention. Embodiments of the present invention may be carried out in ways not necessarily depicted in the drawings. Thus, the drawings are intended to merely aid in the explanation of the invention. Thus, the present invention is not limited to the precise arrangements shown in the drawings.

DETAILED DESCRIPTION

The following detailed description describes examples of embodiments of the present disclosure solely for the purpose of enabling one of ordinary skill in the relevant art to make and use the same. As such, the detailed description and illustration of these embodiments are purely illustrative in nature and are in no way intended to limit the scope of the invention, or its protection, in any manner.

Embodiments of the present disclosure provide catalysts comprising a silicon carbide (SiC) based core (also referred to in the art as a catalyst support) and one or more catalytically active materials (e.g., one or more metals) adhered thereto (e.g., within a porous catalyst support layer forming a shell over the core). Embodiments of the present disclosure also provide SiC-based cores for use in fabricating catalysts, particularly core-shell catalysts. In order to protect the SiC-based core from oxidation and corrosion during subsequent use in catalyzed reactions, especially under high temperature conditions in the presence of $H_2O$ (e.g., as steam), one or more protective materials are used in conjunction with the SiC-based core. In some embodiments, the catalyst core has a density that is ≥60% of theoretical density, and comprises a composite of SiC grains (or sub-particles) and a protective matrix of one or more metal oxides (e.g., alumina) in the voids between the SiC grains. In other embodiments, the SiC-based core is protected by one or more interfacial layers located between the SiC core and the outer catalytically active layer. The interfacial layer can comprise, for example, dense alumina (e.g., ≥80%, ≥90%, or >95% of theoretical density) or another protective material such as barium strontium aluminosilicate ("BSAS"). In still further embodiments this interfacial layer (also referred to herein as a "third layer") can be applied over a composite SiC/oxide (e.g., $SiC/Al_2O_3$) core.

The catalytically active materials can be adhered to the core in any of a variety of ways known to those skilled in the art or hereafter developed, such as being disposed as spots, dots, nanoclusters and the like on the surfaces (including the internal surfaces) of a porous catalyst support material, as is typical for achieving a high surface area active catalyst comprising a dispersed catalytic metal on an oxide support. In some embodiments, one or more interfacial layers (e.g., a layer comprising α-alumina) are provided between the catalytically active material(s) supported on a porous catalyst support and an interior, moderately solid particle core comprised of silicon carbide (SiC). One embodiment of an interfacial layer is a substantially dense layer of $Al_2O_3$ applied around the exterior of the catalyst support (i.e., core) that separates the SiC core from the porous catalyst layer comprised of a porous oxide with active catalyst metal dispersed therein.

Accordingly, catalysts of the present disclosure are defined by a combination of at least two, three and in some cases, four (or more) layers. The first layer is defined by a ≥60% of theoretical density core, comprised of SiC, that may also contain other components such as Al and/or Si, as well as oxides of Al and Si (particularly, alumina) dispersed therein. The outer, second layer, is catalytically active for a target reaction, and is typically comprised of a porous oxide support with at least one active catalyst metal disposed therein, such as in the form of nanoclusters, spots, dots, and the like. The third interfacial layer and in, some instances, a fourth non-porous, gas tight, protective coating layer (a "fourth layer"), sits between the first two layers. The interfacial layer can be, for example, a substantially dense alpha-alumina layer(s) that protects or passivates the first layer (i.e., the SiC surface) from corrosion by steam. The fourth layer can be a highly dense (≥90%, ≥95%, or about 100% of theoretical), non-porous, hermetic coating that is gas tight and prevents oxidation of the SiC in the core at high temperature in steam-containing environments. The third, and in some cases fourth, layer also act to anchor or support adherence of the coated catalyst or second layer for a long operating lifetime. It is undesirable for the second or outer layer comprised of a porous catalyst support with active metal disposed therein to delaminate, break, flake, or otherwise be lost from the surface of the structure. Also, any or all layers may be comprised, mixed, coated, or doped with high emissivity materials or surface finish modified to increase the bulk emissivity of the support.

In yet another alternative embodiment, particularly when the core includes a protective matrix such as alumina within the voids between the SiC grains, a porous interfacial layer can be provided between the first and second layers. For example, as further described herein, a translucent, porous layer of alumina can be used in order to increase the emissivity of the catalyst.

In some embodiments the catalyst core comprises a composite of SiC grains or sub-particles and a protective matrix of metal oxides, and, in some cases, residual metal, around the SiC grains. Grains are defined as discrete crystallites of SiC and other components in the range of 0.01 to 100 microns in size. In the catalyst structures of the present invention, the SiC grains of the first layer (i.e., core) are compressed during fabrication to produce a larger and compressed unified pellet or other desired shape, as further described herein. Catalyst pellets typically have a characteristic dimension or hydraulic diameter of about 1 mm to 50 mm. In some embodiments, the density of the catalyst core is from about 60% to 100% of theoretical density, or from about 60% to about 90% of theoretical density, or from about 65% to about 80% of theoretical density. The protective matrix acts to prevent steam, and in some cases oxygen, under reaction conditions from reaching the SiC in the core (i.e., first layer) of the pellet. In one embodiment, the protective matrix is comprised of alumina. In alternate embodiments, the protective matrix barrier is comprised of alumina, titania, silica, zirconia or combinations of two or more of the foregoing. The protective matrix not only protects the SiC grains from corrosive oxidation, it also serves as an intergranular phase that binds together the SiC grains to form a core. The result is a ≥60% theoretically dense composite catalyst core rather than a more porous (<60% theoretically dense) conventional SiC catalyst core.

As noted above, in some embodiments, the protective matrix comprises $Al_2O_3$. In still further embodiments, the protective matrix comprises $Al_2O_3$ as well as silica and/or one or more oxides of aluminum and silicon combined, such as mullite ($Al_6Si_2O_{13}$). Similarly, in other embodiments the protective matrix comprises alumina as well as titania, zirconia and/or one or more oxides of zirconia, aluminum and/or titanium combined. As also noted above, in some embodiments the catalyst core (i.e., the first layer) is somewhat densified, for example, an actual density between about 60% and about 100% of the theoretical density, from about 60% to about 95% of theoretical density, from about 60% to about 90% of theoretical density, from about 65% to about 90% of theoretical density, or from about 65% to about 80% of theoretical density. Even at 60% theoretical density, the cores of the present disclosure have a higher density than commercially available SiC catalyst cores, which are typically porous.

In the second layer, on the other hand, the active catalyst metal is dispersed within (i.e., on the internal and external surfaces of) a porous support having a porosity (also referred to as void volume) ranging from about 40% to about 80%. The third, optional, interfacial layer which can be disposed between the first and second layer is comprised of a dense material, wherein this third layer has a density from about 80% to 100% of theoretical. The third layer, which acts as a passivation layer to protect the underlying first layer of SiC, may be comprised of, for example, alumina, silica, titania, zirconia or other material that can form a substantially dense layer on the core, is substantially inert to unwanted reactions, and acts to help adhere the second layer comprised of a porous support and active catalytic metal disposed therein.

The fourth, gas-tight, protective coating layer, when utilized in combination with the third layer, presents a denser, more hermetic protective coating to enhance stability in corrosive gases, which for the core material, includes steam and highly oxidizing environments at high temperature. The fourth layer may be a gas-tight (>90% or ≥95% theoretical density) protective coating comprising $Al_2O_3$ in combination with a glass former such as alkaline earth aluminosilicate glasses, alkaline earth aluminoborosilicate glasses, and lanthanide aluminosilicate glasses.

Embodiments of the present disclosure also include methods for fabricating a catalyst core (i.e., support) by mixing SiC and Al (or Al—Si alloy) powders along with one or more additives such as binders, plasticizers, and/or lubricants. This mixture is thereafter formed into pellets (or other desired shape) such as by dry-pressing or extrusion, and then calcined (e.g., in ambient air) to form a densified catalyst core comprising SiC in a protective matrix of $Al_2O_3$.

The catalyst supports and catalysts of the present disclosure can be fabricated in any of a variety of shapes, including those known to those skilled in the art as well as those hereafter developed. Suitable shapes include, for example, spheres, cylinders, pellets, beads, lobed cylinders (e.g., bilobe, trilobe, tetralobe, etc.), saddles, wheels, rings, pall rings, Raschig rings, ribbed or grooved cylinders, notched cubes, grooved pyramids, daisy-shaped, and star-shaped pellets. Alternatively, the catalysts of the present disclosure can be fabricated as monolithic structures. The catalyst supports can be formed into the desired shape and size by, for example, extrusion, pressing, or molding. It will be understood that, although portions of the description herein refers explicitly to pellets, it will be understood that, unless the context indicates otherwise, that description will apply equally to any other catalyst shapes.

Catalysts of the present disclosure can be employed in any of a wide variety of reactor types and configurations, including those known to those skilled in the art as well as those hereafter developed. For example, catalysts of the present disclosure can be employed in fixed bed reactors (also referred to as packed bed reactors), fluidized bed reactors, mesochannel reactors, millichannel reactors, microchannel reactors, membrane reactors, ebullating bed reactors, chromatographic reactors, and moving bed reactors. The catalysts of the present disclosure are particularly useful for fixed bed (i.e., packed bed) reactors, wherein a free-flowing catalyst is loaded within a reaction chamber of various cross-sectional shapes such as cylindrical, rectangular, square, or other shape. The free-flowing catalyst conforms to the shape of the reaction chamber and is fixed in place for reaction operation. During operation, the catalyst is substantially fixed in position within the reaction chamber(s), rather than moving as in the case of a fluidized bed reactor.

The catalyst cores of the present disclosure can be used with any of a wide variety of catalytically active materials adhered thereto (either directly or using one or more interfacial layers), including those known to those skilled in the art as well as those hereafter developed. Suitable catalytically active materials include, for example, metals such as Ni, Co, Ru, Rh, Pd, Ir, Pt, Os, and Re. Additional suitable catalytically active materials include Au, Ag, Cu, Fe, Mn, Mg, V, Mo, and Cr.

Further embodiments of the present disclosure include reaction methods using the catalysts described herein. These reaction methods include, for example, steam methane reforming, acetylation, addition reactions, alkylation, dealkylation, hydrodealkylation, reductive alkylation, amination, aromatization, arylation, autothermal reforming, carbonylation, decarbonylation, reductive carbonylation, carboxylation, reductive carboxylation, reductive coupling, condensation, cracking, hydrocracking, cyclization, cyclooligomerization, dehalogenation, dimerization, epoxidation, esterification, Fischer-Tropsch, halogenation, hydrohalogenation, homologation, hydration, dehydration, hydrogenation, dehydrogenation, hydrocarboxylation, hydroformylation, hydrogenolysis, hydrometallation, hydrosilation, hydrolysis, hydrotreating, hydrodesulferization/hydrodenitrogenation (HDS/HDN), isomerization, methanation, methanol synthesis, methylation, demethylation, metathesis, nitration, oxidation, partial oxidation, polymerization, reduction, steam and carbon dioxide reforming, sulfonation, telomerization, transesterification, trimerization, water gas shift (WGS), and reverse water gas shift (RWGS).

Catalyst cores and catalysts in accordance with various embodiments of the present disclosure exhibit several advantageous properties and characteristics, as further described herein.

Composition and Fabrication of >60% Theoretically Dense, SiC-based Catalyst Cores Nickel-based catalysts have traditionally been used in the steam methane reforming ("SMR") reaction, as well as other types of catalytic reforming processes. Typically, nickel (a catalytically active material) is disposed or dispersed as small nanoclusters (5 to 100 nm in average diameter) on a high internal surface area (10 to 1500 $m^2/g$) catalyst support comprised of a porous ceramic (e.g., alumina, ceria, titanium oxide, magnesium oxide, silica, composites, mixtures, and the like). This type of catalyst system has also been used in catalytic dry reforming (DR) or combined steam and dry reforming (CSR), oxidative steam reforming (OSR), autothermal reforming (ATR), oxidative dehydrogenation (ODR) and catalytic partial oxidation (CPOX), in some instances with the addition of other elements beneficial to suppress coke formation and/or increase the rate of reaction and/or improve the catalyst thermal stability under high temperature operation with steam.

In addition to Ni, other metals such as Co, Ru, Rh, Pd, Ir, and Pt have been utilized as either the primary active catalyst metal or as a promoter or stabilizer when combined with Ni.

High temperature processes (exceeding 600° C.) are more likely to include one or more platinum group metals ("PGM": Ru, Rh, Pd, Ir Os, and Pt) either as the primary catalytically active material or as a promoter or stabilizer used in combination with Ni. Industrially, Ni is the preferred active metal for the production of hydrogen via SMR of natural gas due to its sufficient activity, low cost, and availability. Nickel is not the most active catalyst for SMR, but industrial fixed bed reactors are normally equilibrium reaction limited. Also, the heat addition necessary for endothermic reactions in industrial fixed bed reactors (e.g., for SMR) is slowed due to the relatively low effective thermal conductivity of commercially available fixed bed catalysts.

For conventional SMR catalysts as well as those used for other types of reforming, the active metal is almost always deposited onto another material that acts as a carrier or high surface area support. Table 1 below provides a non-exhaustive summary of the catalyst systems typically used in some of the above-described technologies. As noted in Table 1, alumina supports are commonly used but other compositions of porous supports that contain the active metal disposed therein can also be used. For example, industrial SMR using natural gas or biogas feedstock is typically catalyzed using Ni supported on a porous alumina support. In some cases, small amounts of other elements are added in order to, for example, improve the resistance of the catalyst against coke formation and enhance catalyst stability due to high temperature operation in a high steam environment. In Table 1, ATR refers to autothermal reforming reactions. CPOX refers to catalytic partial oxidation reactions. DR refers to dry reforming reactions. OSR refers to oxidative steam reforming reactions. SMR refers to methane steam reforming reactions.

TABLE 1

| Active Component | Support | Reaction |
|---|---|---|
| Ni/(and/or promoted Ni) | $Al_2O_3$ | ATR |
| Ni/(and/or promoted Ni) | $Al_2O_3$ | CPOX |
| Ni/(and/or promoted Ni) | $Al_2O_3$ | DR |
| Ni/(and/or promoted Ni) | $Al_2O_3$ | OSR |
| Ni/(and/or promoted Ni) | $Al_2O_3$ | ODR |
| Ni/(and/or promoted Ni) | $Al_2O_3$ | SMR |
| Ni/(and/or promoted Ni) | $CeO_2$-$ZrO_2$ | DR |
| Ni/(and/or promoted Ni) | H-ZSM-5 | DR |
| Ni/(and/or promoted Ni) | MCM-41 | DR |
| Ni/(and/or promoted Ni) | $MgAl_2O_4$ | SMR |
| Ni/(and/or promoted Ni) | MgO | DR |
| Ni/(and/or promoted Ni) | MgO | OSR |
| Ni/(and/or promoted Ni) | MgO-$Al_2O_4$ | OSR |
| Ni/(and/or promoted Ni) | $SiO_2$ | DR |

Silicon carbide (SiC) is one material that has been investigated as a catalyst support for use in reforming reactions. SiC is attractive because the base material exhibits high thermal conductivity, which is ideal for improving heat conduction in reactors. For example, at room temperature, dense alumina has a thermal conductivity of about 25 W/m-K, which drops to about 10 W/m-K at 530° C., and further drops to about 7 W/m-K at 830° C. Bulk (dense, not semiconductor grade) SiC, on the other hand, has a thermal conductivity of about 130 W/m-K at room temperature (dropping to about 60 W/m-K at 530° C., and further dropping to about 38 W/m-K at 830° C.). The higher thermal conductivity of SiC as compared to alumina is advantageous when used as a catalyst support. SiC also exhibits a high level of inertness with respect to side reactions including carbon formation, resistance to acid and base environments, mechanical hardness, and other characteristics advantageous for a catalyst support. However, SiC is not ideal as a catalyst support or core for applications requiring exposure to oxygen and/or steam at high reaction temperatures, as this degrades the material by forming $SiO_2$, which, in the presence of steam, forms volatile SiO—(OH) species.

Thus, despite having some advantageous properties, unprotected SiC lacks adequate stability at high temperatures in oxygen (e.g., air) and/or $H_2O$ (e.g., steam) environments. Under these conditions, the surface of SiC will oxidize to $SiO_2$, which further corrodes to form gaseous Si(OH)+in the presence of steam or steam plus oxygen. With time, this phenomenon continues until all of the SiC is oxidized. This causes the SiC structure to recede or weaken, resulting in the failure of the material or catalyst system. This is the main failure mechanism of SiC, and is the primary reason for its lack of industrial adoption as a catalyst support in reactions that require high temperature and the presence of oxygen (e.g., as air) or water (e.g., as steam) despite its excellent thermal properties. Furthermore, when SiC transforms into $SiO_2$, the thermal properties of the material change substantially. Silica has a much lower thermal conductivity than SiC value, and therefore the formation of $SiO_2$ will also degrade the thermal conductivity of the material.

Because of these problems, the application of a catalytically active material directly to an unprotected SiC substrate (e.g., a foam, monolith, pellet or the like) will lead to an oxidation rate that results in an unacceptably short catalyst life for a steam methane reforming catalyst and many other reactions as well. It is necessary to protect or passivate the SiC surface if it is to be used for high temperature oxidative or hydrothermal reactions that include steam. Accordingly, the use of SiC as a catalyst support in reforming and related reactions typically has been confined to depositing an outer porous layer such as alumina onto commercial SiC (either a or B) followed by impregnating the porous alumina layer with a catalytically active metal such as Ni. Alternatively, the addition of Ni and the porous layer (e.g., alumina) can be done in a single step. The coating of a porous ceramic catalyst support layer such as alumina onto the outer surface of a SiC core will slow the rate of ingress of steam and oxygen into the underlying SiC during use of the catalyst. However, the slight delay to corrosion will not provide a commercially acceptable lifetime for an industrial methane reforming catalyst.

Catalyst cores of the present disclosure advantageously employ SiC, taking advantage of its beneficial thermal properties, while protecting the SiC core from oxidation and corrosion so as to significantly increase the useful life of the catalyst. In one embodiment, the SiC core comprises a composite of SiC and alumina (and optionally silica). The alumina is present as a protective matrix around the SiC grains within the composite core. In an alternative embodiment (or in addition to the protective alumina matrix around the SiC grains within the core), a shell coating of dense alumina extends over the exterior of the SiC core. (It will be understood that an outer coating of, for example, alumina, including porous alumina, can also be provided over the $\geq$60% theoretical dense composite core of SiC/$Al_2O_3$, as further described herein.)

In a first embodiment, aluminum (e.g., as a powder, including as a powder of Al—Si alloy) is combined with SiC (e.g., as a powder) prior to forming the core pellets or other desired shape such as by pressing or extrusion. Various additives can be included in the mixture, such as one or more binders, plasticizers, lubricants, processing aids, etc., During pressing or extrusion (or other pellet/core forming process), the aluminum is plastically deformed so as to flow around the SiC grains. Then, during a subsequent heat treatment in the presence of oxygen (i.e., calcination), the aluminum melts and rearranges into the voids between the SiC grains and is converted into alumina with oxygen at high temperature (e.g., a process temperature of about 850° C. or higher). The aluminum scavenges oxygen from the heat treatment atmosphere, not only preventing the oxidation of the SiC grains, but also converting much of the aluminum into protective alumina. The alumina, as well as any unoxidized aluminum that will be entrapped in the matrix, provides coverage and protection against steam and oxygen attack of the SiC grains during use of the catalyst. At the specified heat treatment temperatures, the aluminum that has not formed an alloy with other materials in the system under the high pressure pressing process or the high temperature heat treatment process becomes liquid as the heat treatment temperature exceeds the melting point of aluminum (660° C.). The portion of the aluminum that remains neat will melt and may flow into the interstices between and around the SiC grains, thereby making the aluminum more accessible to oxygen so as to form the alumina matrix. In the final structure, the aluminum added to the SiC will be transformed into alumina, with a portion of the aluminum believed to be alloyed with other materials, thereby providing a stable, protective matrix around the SiC grains that does not form an internal liquid film within the core during use of the catalyst (e.g., during high temperature methane steam reforming). It is also believed that some of the formed alumina will be exposed on the surface of the core, providing further protection of the core. When Si is used in conjunction with Al (e.g., as an Al—Si alloy powder), it is believed that some of the Si will be entrapped in the alumina matrix, and some of the Si will oxidize and react with aluminum oxide to form mullite ($Al_6Si_4O_{13}$) during calcination.

By providing an internal, protective alumina matrix around the SiC grains of a catalyst core, embodiments of the present disclosure largely preserve the advantageous thermal properties of SiC while protecting the SiC from oxidation and corrosion. The addition of the internal protective (or barrier) matrix of alumina can extend the commercial lifetime of the catalyst by limiting the oxidation and corrosion of the dense SiC core, thereby achieving a longer and commercially acceptable catalyst lifetime. In one embodiment, the lifetime of the catalyst ranges from 6 months to 5 years. In another embodiment, the lifetime of the catalyst ranges from 6 months to 30 months before requiring replacement within industrial reforming tubes. Such extended catalyst lifetimes can be achieved at an industrial pressure of 20 bar, S: C ratio of 3, a gas hourly space velocity ("GHSV") of 2000 $hr^{-1}$, and a reaction temperature exceeding 800° C.

In some instances, SiC powder is mixed with an Al—Si alloy (e.g., an alloy containing up to about 25% Si, between about 5% and about 20% Si, between about 10% and about 15% Si, or between about 11% and about 13% Si) is used rather than pure or substantially pure Al. Among other things, the Si in the alloy serves to reduce the melting temperature of the metal constituent and/or improve the wetting of the molten metal. In one embodiment, an eutectic or near-eutectic alloy of Al and Si with a melting point less than 600° C. is used.

Alternatively, pure or substantially pure Al and Si powders may be combined with SiC rather than an Al—Si alloy. Likewise, it is contemplated that other aluminum alloys or even other metals or metal alloys having a melting temperature below 1400° C. could be used (with, or in place of Al or Al—Si).

For high energy demanding reactions (e.g. strongly endothermic or exothermic heats of reaction) the high thermal conductivity of SiC is advantageous for driving heat radially into an endothermic reaction chamber or radially removing heat away from an exothermic reaction chamber if the SiC is disposed in a thermally effective form, as described herein with respect to the pelleted or particulate catalyst structures of the present disclosure. The catalysts described herein will also surprisingly offer advantages for autothermal reactions. The higher effective thermal conductivity of the catalysts of the present disclosure will reduce local axial thermal gradients within a tubular reactor that arise due to the strongly exothermic portion of the combined autothermal reactions by increasing axial conduction and heat transfer. Heat is more efficiently transferred to the endothermic reactions within the combined autothermal reactions by axial conduction within the catalyst bed. Although the overall or global reaction energy or heat is balanced for an autothermal reaction, the local rate of exothermic reactions and their heat release usually exceeds the local reaction rate for endothermic reactions. This results in the formation of localized hot spots. The catalysts of the present disclosure reduces the magnitude of hot spots in the front part of reaction channels and improves overall process efficiency by giving more time with more temperature for the slower endothermic reactions to reach a higher extent of reaction at the end of the reaction tube.

The alumina protective matrix of the catalyst cores of the present disclosure can be created, for example, from a composition comprising aluminum dispersed in SiC by plastically deforming the aluminum (e.g., during pellet formation) so as to flow around the SiC grains, and thereafter forming an alumina protective barrier around the SiC grains by an oxidative heat treatment process. Optionally, silicon can be included, such as by using an Al—Si alloy dispersed in SiC powder and/or by adding Si powder along with Al powder.

In one particular embodiment, SiC powder is mixed with aluminum and, optionally, silicon, powders or sub-particles (these terms are used interchangeably). This mixture is then pressed under high pressure or load, or alternatively extruded, into pellets (or other desired shape), and then calcined to form a bonded (i.e., fused) structure wherein the grains are stuck together and will not easily fall apart. As a test for bonding structure, if a pressed particle is dropped from a height of one meter it will not break or fracture into the original array of grains. The pellets can be calcined before or after being coated with a catalytically active material or other coating (e.g., an interfacial layer), as further explained herein. The pellet calcination temperature can, for example, vary between 850° C., and 1450° C., with a duration of between about 0.5 and 24 hours, or between about 900° C., and about 1000° C. for at least two hours, in ambient air. As noted further herein, in some embodiments multiple heat treatment steps can be employed, at various temperatures and under various conditions. The result is an $SiC/Al_2O_3$ composite core (e.g., a pellet) composed of angular SiC grains bound together by an intergranular phase of $Al_2O_3$.

The pellet (or other shape), prior to calcination, is composed of silicon carbide (SiC) powder and aluminum-silicon (Al—Si) powder—the later as either a mixture of Al and Si powders, or as a powdered alloy of Al and Si. In one particular embodiment, SiC powders of different particle sizes are blended with Al—Si powder. Two or more different size fractions of SiC powder can be used in order to optimize particle packing within the green body (e.g., the pellet). For example, a coarse fraction of SiC (e.g., about 30 to about 70 micron average diameter) can be blended with smaller amount of a fine fraction of SiC (e.g., about 15 to about 30 micron average diameter), with the fine fraction used to fill in large voids between the coarse fraction. The powder blend is further mixed with various additives, such as one or more organic binders (polyvinyl alcohol, polyvinyl butyral ("PVB", ethyl or methylcellulose, and the like), and/or one or more plasticizers (e.g., butyl benzyl phthalate ("BBP"), ethylene glycol, polyethyl glycol, and the like). These additives allow the fine powders to be processed (e.g., via pan drying, crushing and sieve separation, or by spray drying) to form larger agglomerated powders that are more easily fed into a dry pressing operation (or other pellet forming equipment). Further, to aid in the pressing operation, lubricants, such as zinc stearate, steric acid, and/or carbon powders such as graphite can be added to the agglomerated powder to ease the dry pressing operation.

While dry pressing can be used to form the catalyst cores (e.g., as pellets), various other methods can be used to form the cores such as extrusion, wet pressing, slip casting, isostatic pressing, injection molding, and other common ceramic forming approaches, provided that the process applies sufficient pressure to achieve the targeted density in the green state (>60% of the theoretical density of the blended SiC/Al powders) and cause plastic deformation of the aluminum.

While the pressed or extruded pellets can be subjected to calcination following pellet formation, in an alternative embodiment the pellets can be further subjected to a pre-calcination high temperature heat treatment in a substantially oxygen-deficient environment before being subjected to calcination. When used, the pre-calcination heat treatment step may cause the aluminum (or aluminum alloy) particles to sinter (e.g., at temperatures above ~400° C.) and further melt and coalesce (e.g., at temperatures above ~550° C.) allowing for rearrangement of the microstructure. This liquid phase may also further slow or prevent the oxidation of the SiC during subsequent heat treatment at temperatures above 500° C. in air or oxygen-containing environments by preventing oxygen or steam (gas) diffusion into the structure. Thus, a pre-calcination heat treatment can be performed at a temperature which is the same as or different from the calcination temperature, particularly one that is lower. Typically, however, the pellets will be calcined following pellet formation (i.e., no pre-calcination heat treatment), at a temperature of 850 to 1450° C., or 900 to 1000° C., for a period of time sufficient to convert the aluminum into an alumina matrix around the SiC grains. Calcination is performed in an oxygen-containing environment, such as oxygen, air, steam, or dilutions of the foregoing with nitrogen, argon, hydrogen and/or another carrier gas. In one embodiment, the pellets comprising SiC and Al (or Al—Si) are calcined in ambient air, without having to control the amount of oxygen in the calcination environment, thereby reducing costs.

Example of Core Formation-SiC Grains in a Protective Matrix of Metal Oxide(s)

180 grams of 400 grit SiC (about 40 microns in average diameter), 45 grams of 1200 grit SiC (about 15 microns in average diameter), and 21 grams of Al—Si alloy powder (Valimet Eutectic Alloy 4047 (11-13% Si), grade S-2, 2 microns in average diameter) are combined and transferred to a powder mixer where they are kept mixing. Separately, 3.5 grams of PVB is dissolved in 50 grams isopropyl alcohol by warming. The PVB in IPA solution is then sprayed into the powder under continuous mixing. The uniformly moist powder is then spread into a shallow bed and dried at 120° C. until completely dry. To this powder is added 4 wt % stearic acid and 4 wt % graphitic carbon (KS-6). These powders are added dry but isopropyl alcohol is added to moisten the mixture. This mixture is once again dried prior to pressing. The dry powder blend is then dry-pressed into pellets in a laboratory-scale press. Pressing is accomplished in either manual or automated pellet presses, and pressure can be applied uniaxially or isostatically.

The above example can be varied by changing the type and amount of coarse and fine SiC fractions that are used. In some embodiments, coarse SiC may be chosen from SiC with grit sizes of 230 (about 70 microns in average diameter) to 600 (about 30 microns in average diameter), while fine SiC may be chosen from SiC with grit sizes of 600 (about 30 microns in average diameter) to 1200 (about 15 microns in average diameter). The weight percent of coarse SiC in the mixed SiC powders may be varied between 50% and 100% while that of fine SiC from 0% and 50%. For the Al—Si alloy powder, Valimet eutectic alloy 4047 (11-13% Si) can be used, with a range of particle sizes, such as a median particle size of 2 to 50 microns. Specific examples include the S-2, S-5, S-8, S-10, S-15, S-20, and S-25 grades of Al—Si eutectic alloy 4047 powder from Valimet, Inc. Other Al—Si alloys can be used, such as those having up to about 25% of Si (on a molar basis). The volume of Al—Si (or Al, when an alloy is not used) in the mixture can be varied between about 2.5% and about 80% of the volume of SiC, between about 5% and about 50% of the volume of SiC, between about 5% and about 30% of the volume of SiC between about 10% and about 30% of the volume of SiC, or between about 10% and about 25% of the volume of SiC. When others oxide-forming metals are used in place of, or in addition to, Al or Al—Si alloy, similar total amounts of oxide-forming metals in the mixture are employed (e.g., 2.5-80% of the volume of SiC, 5-50% of the volume of SiC, 5-30% of the volume of SiC, 10-30% of the volume of SiC, or 10-25% of the volume of SiC).

Figure 5:
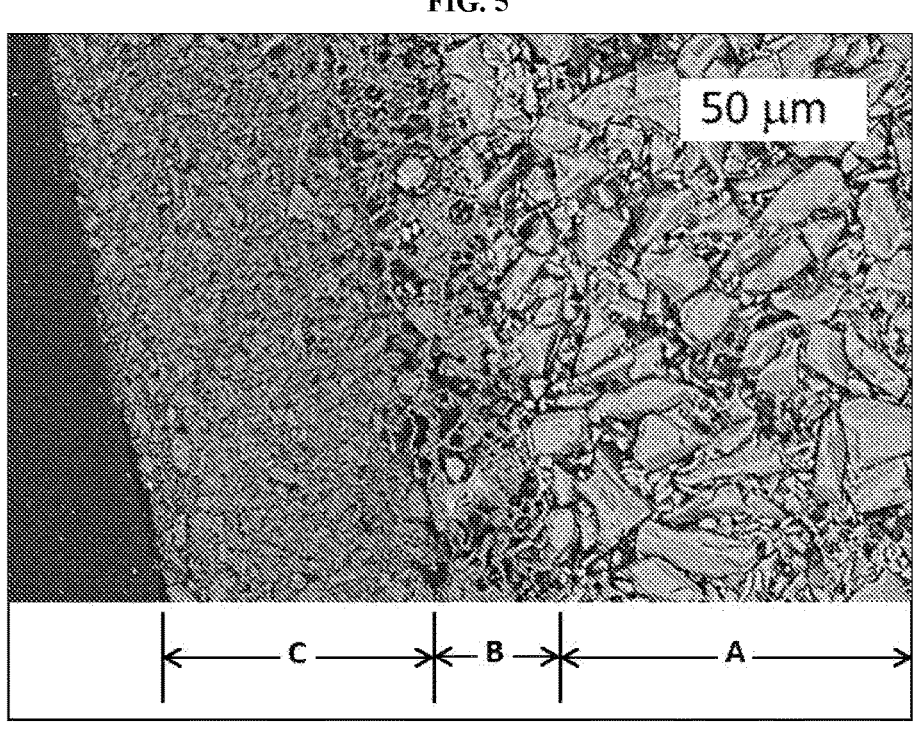
FIG. 5 provides a cross-sectional SEM image of a $SiC/Al_2O_3$ composite core pellet that has been coated with a first interfacial layer of alumina and then with an outer layer of a Ni-containing catalytically active material.

The volume of the combined PVB and BBP may be varied between 1% and 15% (based on the total formulation prior to pellet formation), while the weight percentages of stearic acid and carbon may each be varied between 0% and 15%. Finally, the volume ratio of BBP to PVB may be varied between 0% and 50%. A summary of these variations is shown in Table 2 below, wherein the amounts of SiC and Al—Si are reported as a volume % of the total amounts of SiC and Al—Si powders, and the amounts of PVP, BBP, stearic acid and carbon are similarly reported as a % of SiC and Al—Si powders. FIG. 5 depicts SEM images of a catalyst particle having an SiC/Al$_2$O$_3$ core produced in the manner described above, along with an outer catalytically active layer and an additional interfacial (i.e., third) layer of alumina between the SiC/Al$_2$O$_3$core and the outer catalytically active layer.

TABLE 2

| Components | | Amount (range) | |
|---|---|---|---|
| | SiC (vol. %) | 55 | 97.5 |
| Coarse SiC | Grit | 230 | 600 |
| | Vol. % | 47.5 | 97.5 |
| Fine SiC | Grit | 600 | 1200 |
| | Vol. % | 0 | 50 |

<table>
<tr><td colspan="2">13</td></tr>
</table>

TABLE 2-continued

| Components | | Amount (range) | |
|---|---|---|---|
| Al-Si | Size (μm) | 2 | 25 |
| | Vol. % | 2.5 | 45 |
| | PVP + BBP (vol. %) | 0 | 15 |
| | BBP/PVP (vol. %) | 0 | 0.5 |
| | Stearic acid (wt. %) | 0 | 15 |
| | Carbon (wt. %) | 0 | 15 |

Example of Alumina Interfacial/Third Layer Deposition via Al-Coating Deposition

As mentioned previously, some embodiments of catalysts of the present disclosure include one or more interfacial (i.e., third layers) coated over the core. The catalyst core comprising SiC and Al₂O₃ is coated with one or more of these interfacial (i.e., third layers) to further protect the SiC constituent from oxidation when exposed to oxidizing environment at high temperature. Under such conditions, on unprotected SiC, a slow growing, silica scale develops. This scale acts as a barrier to further oxygen diffusion into the core of the granule and thus preventing further attack of the substrate. However, a major drawback resultant silica scale is its susceptibility to volatilization (e.g. forming Si(OH)+) and corrosion in the presence of alkali salts (e.g. forming Na₂SO₄), which limits the applicability for intended purpose. To mitigate this, the protective "third layer" coating acts as a barrier between the atmosphere and the SiC surfaces. In some embodiments, each of the one or more interfacial layers comprises alumina, silica, titania, zirconia, or mixtures or oxide compounds of two or more of the foregoing (e.g., mullite).

In some embodiments, the interfacial layer(s) has a density of ≥80%, ≥90%, or ≥95% of theoretical density. In some particular embodiments, the interfacial layer(s) have a density greater than that of the core.

As another example, an external layer of aluminum or of aluminum alloys containing other transition metals or metal mixtures with metal oxides can be applied as a thin coat on the surface of the support material in order to form an interfacial layer that is converted into a substantially dense oxide layer upon calcination.

The particle sizes of the metals and/or metal oxides used in this system to form the interfacial layer(s) can be controlled to specific ranges. For example, the particle size can be controlled such that substantially most of the granules fall around 2 microns in size. The range of granule sizes can vary from less than 1 micron to as high as 20 microns.

One example of this approach is a thin coat of aluminum applied to the core surface. The coating can be applied by a number of methods including but not limited to: dip coating, spray coating, spin coating, or vacuum infiltration, applied either manually or through an automated process. The coating slurry used can vary from a wholly organic solvent and binder system, to an aqueous solvent system with polymeric binders, or a combination thereof. The coating material can vary from a pure alumina material to an alumina mixed with other metals, metal oxides, or non-metals. Also, the interfacial coatings can be applied to a pre-calcined support material, or as disclosed below, to as-formed core shapes. Following calcination, any metal (e.g., aluminum) in the coating is converted into alumina.

In this specific example, a wholly organic-based coating media is adopted. The composition of the coating slurry for third-layer coatings is disclosed in Table 3. Examples of successful coating formulations ranges are listed, but should not be considered limiting in terms of potential coating systems.

TABLE 3

| Raw Material | Weight Percent in Suspension (%) | |
|---|---|---|
| | Minimum | Maximum |
| Al—Si Powder, S-2 | 5 | 45 |
| Methyl Acetate | 40 | 87.5 |
| Ethyl Cellulose | 0.25 | 5 |
| Alpha Terpineol | 7.5 | 20 |
| Acetylacetonate | 0.5 | 2.5 |

The slurry is deposited onto either prior-calcined or prior non-calcined materials cores of the present disclosure. In this example, the coating is deposited onto the core through an organic-based aerosol spray-approach, both manually and alternatively using automated spray equipment. In both approaches, depending on the required thickness of the final coat, the spraying is accomplished in either one step or through several repeated coatings with intermediate drying cycles. The drying cycles can be at varying temperatures from 60° C. to 150° C. Once dry, the coated pellets are calcined at temperatures ranging from 800° C. to 1500° C., but preferentially between 1000° C., and 1300° C., and even more preferentially between 1250° C. and 1350° C. The result is a substantially dense (>80% theoretical) alumina interfacial layer that also includes a small amount of mullite (due to the use of Al—Si alloy). An example of an aluminum-derived coating applied using manual spraying and converted to an alumina layer is shown in FIG. 1.

Example of BSAS "Third Layer" Protective Coating via Aerosol Deposition of Glass Formers As discussed previously, one method of protecting the core of the catalyst support material of the present disclosure involves processing SiC in the presence of other elements such as aluminum or a mixture or alloy of aluminum and silicon as described previously. This affords SiC excellent protection against oxidation at high steam environments at high temperature conditions.

Two other methods of protecting an SiC core from oxidation are presented in this example, one using barium strontium aluminosilicate (BSAS) as a second phase in a SiC-based composite core and the other using a protective coating of BSAS around an Si—C core. FIG. 2 depicts examples of materials obtained by both approaches. The white layer in these SEM images is BSAS.

While BSAS has been used to demonstrate this concept, potential glass phase formers that could similarly be used in these coatings are polycrystalline solids prepared by pre-reaction of glass-forming oxides, such as CaO—SiO₂—Al₂O₃, or MgO—SiO₂—Al₂O₃, SrO—SiO₂—Al₂O₃, or BaO—SiO₂—Al₂O₃. Other suitable glasses could include binary mixtures of alkaline earth elements in the glass phase former (such as BSAS itself), the addition of rare earth elements substituted for the alkaline earth elements in the formulation, or the addition of small amounts B₂O₃ or TiO₂ as glass modifiers. Generally, alkaline earth aluminosilicates, with modifications of rare earth elements, borosilicate variants of the same, or titania-modified variants of any of these formulations would suffice to provide a hermetic, gas tight coating. Further, such glass coatings could include a second crystalline ceramic phase addition, such as alumina, titania, zirconia mullite or other common oxide ceramics to modify thermal expansion of the layer and its densification behavior during heat treatment. In such composite coatings, the content of crystalline oxide phase could be as high as 40 volume percent of the coating solids.

In the first example, BSAS is coated onto pelletized SiC, either prior to sintering (i.e., heat treatment) of the pelletized Si or after. If applied after firing of the SiC, the BSAS coating is subsequently heat treated. Heat treatment of this coating leads to the formation of a substantially dense, protective layer on the core material. The BSAS coating protects the SiC core from oxidation and corrosion during use.

Alternatively, BSAS is added to the SiC powder and both powders are granulated together. This approach is similar to that described previously with respect to the fabrication of $SiC/Al_2O_3$ composite cores. The granulated powder is thereafter heat-treated in air (e.g., at temperature above 1000° C.). During this treatment, BSAS melts, forming a glassy composite that flows around the SiC coating it in the process, encapsulating the SiC and preventing oxidation. The demonstrated SiC/BSAS composites produced by dry pressing and heat-treating a mix of precursor powders is a unique and previously undisclosed approach to composite materials. FIG. 2 shows examples of materials obtained by both approaches. The white layer in these SEM images is BSAS Example of Alumina "Third Layer" Interfacial Coating from (Al+Al₂O₃)

In this example, a wholly organic-based approach is utilized. The specific composition of the coating slurry is disclosed in Table 4, which provides the exact reagents used in the formulation as well as the ranges these components can have. The slurry can optionally be formulated from an aqueous media. In this example, a combination of aluminum metal and alumina are used in the coating slurry. The aluminum metal and alumina may be mixed in given ratios as indicated in Table 4 such that the ratio between Al and $Al_2O_3$ varies between 2.5% and 50% by volume.

Figure 3:
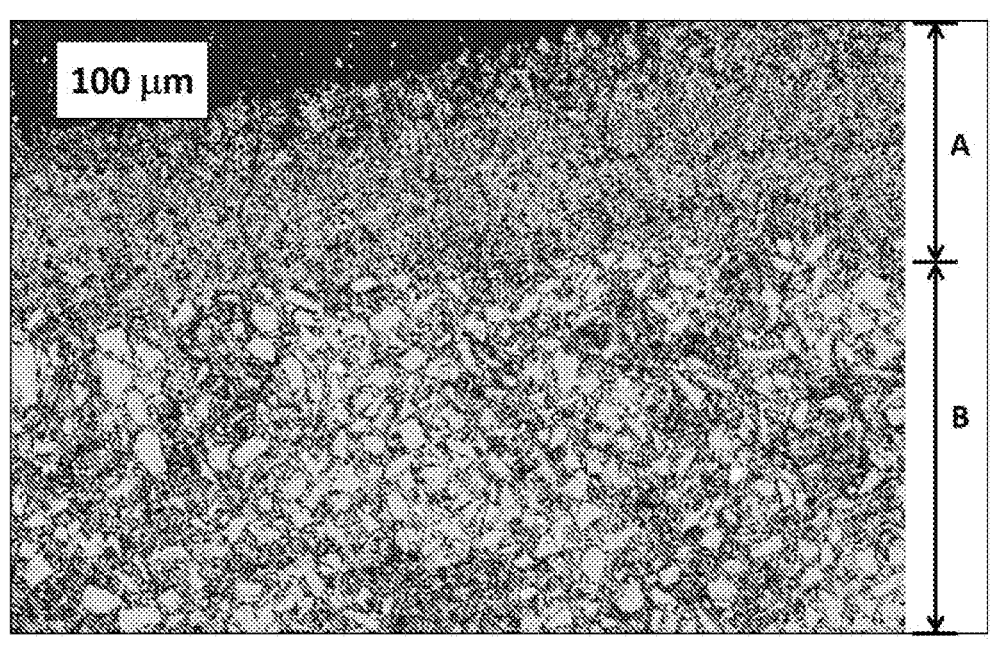
FIG. 3 provides cross-sectional SEM image of the inventive material coated with a mixture $Al_2O_3$, introduced as a mixture of Al and $Al_2O_3$ in the slurry at a volume ratio of 25% to 75%.

Similar to the previous example, the slurry is deposited onto either a prior-calcined or prior non-calcined core material of this disclosure, and dried. The coated cores (e.g., pellets) are then calcined at temperatures ranging from 800° C. to 1500° C., but preferentially between 1000° C., and 1400° C., and even more preferentially between 1250° C., and 1350° C. The resultant material is a core with a uniform layer of substantially dense alumina around it as seen in FIG. 3.

TABLE 4

| | Allocation Amount (%) | |
|---|---|---|
| Raw Material | Minimum | Maximum |
| Al—Si or Al powder | 5 | 45 |
| Al₂O₃ | 5 | 45 |
| Methyl Acetate | 87.5 | 87.5 |
| Ethyl Cellulose | 0.25 | 5 |
| Alpha Terpineol | 7.5 | 20 |
| Acetylacetonate | 0.5 | 2.5 |

Example of Multi-Layer Protective Coatings

In this example, the inventive catalyst core is coated with a multi-layer coating that includes a highly dense (hermetic) protective coat (fourth layer) and an underlying interfacial layer (third layer). The approach produces an interfacial layer that is 70-90% dense, followed by the deposition of an additional protective coating comprising aluminum oxide powder coating containing a small addition of glass phase former, referred to below as (Al₂O₃+Glass Former). Upon firing at 1000-1400° C., the multi-layer structure creates a hermetically sealed coating on the core.

For the interfacial layer, the process of "Example of Alumina "Third Layer" Deposition via Al-Coating Deposition" is used to deposit a layer of aluminum metal powder 10-40 microns thick on the surface of the core. In one embodiment, this coating is heated in air at 1000-1400° C. to produce an aluminum-oxide coating 70-90% dense. After this heat treatment, the (Al₂O₃+Glass Former) powder coating is applied at a thickness of 20-80 microns thickness, by dip coating, spray deposition, or the like. The deposited coating is then fired at 1000-1400° C. in air to produce a hermetic, protective coating.

In a second embodiment, the initial aluminum-derived layer is dried, but not heat treated, prior to the deposition of the (Al₂O₃+Glass Former) powder coating at a thickness of 20-80 microns thickness, by dip coating, spray deposition, or the like. Both deposited coatings are then fired at 1000-1400° C. in air to produce a hermetic coating.

The (Al₂O₃+Glass Former) formulation is comprised of (75-99%) commercial alumina powder with the balance (1-25 wt %) being a glass-phase forming material. The melting of the glass former effectively allows enhanced densification of the coating, better adhesion to the underlying surface and compliance of the coating during heat treatment to allow the achievement of a hermetic coat.

Suitable candidates for the glass former include precursor blends prepared by pre-reaction of glass-forming oxides, such as CaO—SiO₂—Al₂O₃("CAS") or MgO—SiO₂—Al₂O₃ ("MAS"), SrO—SiO₂—Al₂O₃, or BaO—SiO₂—Al₂O₃. Other suitable glasses include mixed alkaline earth aluminosilicates (e.g., BSAS), rare earth elements doped alkaline earth aluminosilicates, or B₂O₃ or TiO₂ modified alkaline earth aluminosilicates.

In the current examples, eutectic formulations in the CaO—Al₂O₃—SiO₂ and MgO—Al₂O₃—SiO₂ families have been added to the alumina coating in the form of pre-reacted oxide mixtures. Mixtures of the glass phase former, in appropriate ratios to Al₂O₃ powder were mixed in aqueous solutions.

To synthesize the glass phase former precursors (Table 5) eutectic CAS and MAS compositions (based on individual oxides in the final formula) were blended from calcium or magnesium nitrate, colloidal silica (SiO₂) and boehmite (AlOOH) in water, then dried at 150° C. and crushed to form a powder. Precursor powder was then calcined at 1000° C. to pre-react the oxides and reduce the surface area of the powder between 8 and 12 m²/g.

TABLE 5

| | Oxides | | | |
|---|---|---|---|---|
| Entry | CaO | MgO | SiO₂ | Al₂O₃ |
| CAS Glass Eutectic | 24.3% | 0.0% | 62.4% | 13.3% |
| MAS Glass Eutectic | 0.0% | 20.3% | 61.4% | 18.3% |

The glass phase formers powders were then blended with alumina and appropriate polymeric additives (dispersants, plasticizers and binders) in an aqueous suspension, as listed in Table 6. Commercially available alumina and synthesized CAS or MAS, or other glass formers are mixed in various proportions. While aqueous suspensions are shown in Table 6, organic based solvent systems could also be used.

Figure 4:
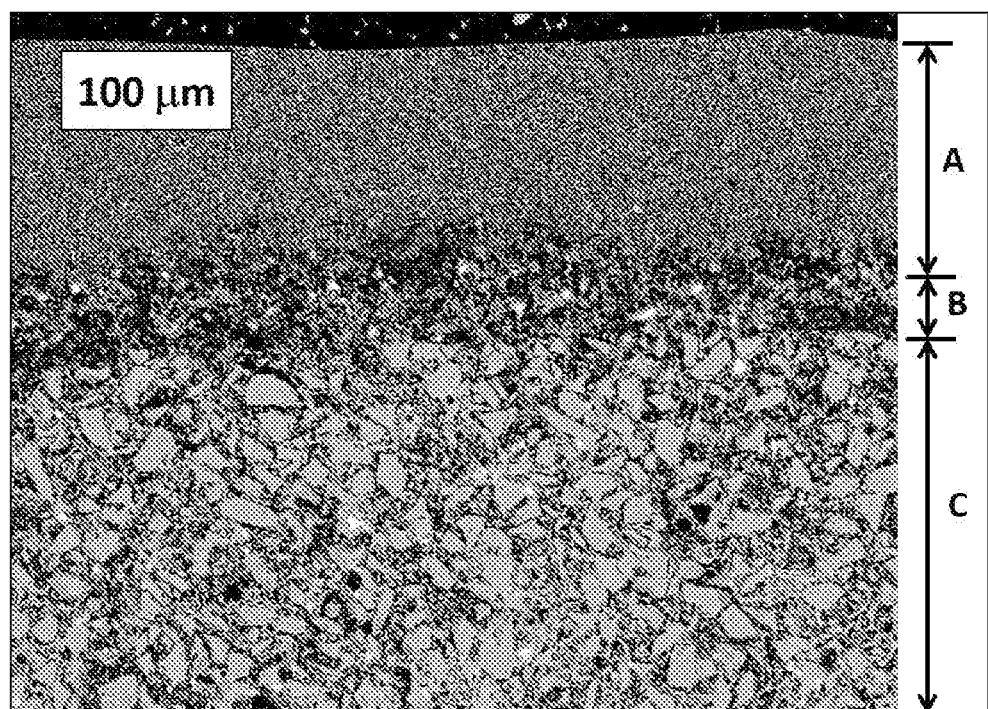
FIG. 4 provides a cross-sectional SEM image of a hermetically coated $SiC/Al_2O_3$ composite core pellet. (A) refers to a coat containing $Al_2O_3$ mixed with a CAS glass former, (B) refers to the $Al_2O_3$ coat, while (C) is the material's core.

The coat application process is preferentially done through a dip-coating process, but could also be done through spray deposition processes and other coating processes known to those in the art. The coating thickness is controlled through these processes and can vary from 20 to more than 80 μm, The coated pellets are heat-treated in air to temperatures between 1000 and 1500° C., but preferentially between 120° and 1400° C. A cross-sectional SEM micrograph of a hermetically coated pellet is shown in FIG. 4.

TABLE 6

| Composition | Ranges (%) | |
| | Low | High |
|---|---|---|
| Alumina | 12 | 80 |
| Calcium Aluminosilicate (CAS), Magnesium Aluminosilicate (MAS), or other glass phase former | 0 | 30 |
| Polyvinyl Alcohol | 0.1 | 5 |
| Ethylene Glycol | 0.1 | 5 |
| Water | 20 | 80 |

As described in more detail in the next section, a catalytically active material can be applied to the SiC/Al—Si core produced in the manner described above, either before or after heat treatment (i.e., calcination) of the composite core. The resulting core/shell catalyst is comprised of at least two distinct layers and functions. The first layer is comprised of the high thermal conductivity and high total, normal emissivity SiC core which acts to improve heat transfer either radially or axially within a reactor vessel. The optional third layer is a protective or barrier layer of alumina that acts to minimize access of corroding steam to the underlying SiC core and thereby extend the useful catalyst lifetime. This optional layer may be desirable in some instances in order to fully passivate the underlying SiC in addition to (or in place of) the alumina that forms around the grains within the core. This optional third, barrier layer is preferentially comprised of a continuous, dense layer of alumina with a density of between 80 and 100% of theoretical. This optional layer can be formed by applying a coating of aluminum (e.g., as a slurry) followed by heat treatment in an oxygen environment (e.g., ambient air) to convert the aluminum into a dense coating of alumina. The second layer is the outer layer of catalytically active material. In some embodiments, this second layer is comprised of two sub-layers: an inert, but porous high surface area support; and a catalytically active metal disposed within the porous high surface area support so as to catalyze a desired reaction.

In some embodiments, the first layer is defined by an average pellet diameter from 50 to 50,000 microns, with a preferred range from 200 to 15,000 microns average diameter. The third zone is defined by an average thickness ranging from 0.3 to 50 microns with a density greater than 80% of theoretical. The second zone or active catalyst coating layer is defined by an average thickness range of 5 microns to 200 microns, with a preferred range of 10 to 100 microns thickness.

Process of Coating the Catalyst Support Materials

The nature of many industrial processes has required the replacement of powder catalysts with their pelletized versions. In so doing, the difficulties associated with powders such as handling, dosing, and accurate measurements are avoided. In some processes such as SMR, the use of powder catalysts is not possible due to the process conditions involved, i.e., high pressure, steam, and flow conditions and the associated excessive and hence uneconomic pressure drop for flow through a small powder bed. Under these conditions, powder catalysts are further prone to being blown downstream of the reactor and into the product stream, which is undesirable.

The problems associated with use of powder in industrial processes are avoided by pelletizing the powders, reducing the pressure drop and significantly enhancing handling and ease of use. Industrial processes such as SMR, catalytic partial oxidation, dry reforming, among others, use pelletized catalysts in the reactors. For instance, in SMR, the active metal (Ni) is impregnated into granulated high surface area alumina.

In the present disclosure, the catalysts comprise a high thermal conductivity and emissivity support material (i.e., core) composed of either pre-sintered alpha and beta silicon carbide pellets with a protective outer coating (e.g., dense alumina or BSAS), or a composite of $SiC/Al_2O_3$ (with added Si). The powder is first pelletized by either dry-pressing or extrusion, and then heat-treated in an oxygen environment. The pellets are thereafter coated with a catalytically active layer, thus providing a core/shell catalyst. The coating methods and options are described further herein.

To protect the core SiC from oxidation under high steam and temperature conditions, several methods can be adopted. Firstly, SiC can be admixed with metals that will aid in its protection such as Al—Si powder in which, upon pressing, the aluminum plastically deforms to flow around the SiC particles forming an oxide phase around the SiC grains during a subsequent oxidative heat treatment. Secondly, a mixture of barium strontium aluminosilicate (BSAS) can be added to the SiC powder and granulated prior to dry pressing into pellets. The pellets are thereafter heat treated in air to temperatures from above 1000° C. to 1500° C. During this treatment, BSAS reacts forming a glassy composite that melts, flowing around and coating the SiC grains. BSAS has good protective properties. Thirdly, BSAS (or another protective layer such as dense alumina) can be coated onto pelletized SiC (pure or as a $SiC/Al_2O_3$ composite) either prior to firing the core material or after. Heat treatment of this coat at 1000° C. to 1500° C. leads to formation of a protective coat of BSAS on the core material. The BSAS coat ensures the core is protected from oxidation. An example of the last two approaches to protecting the core were provided in FIG. 2.

In this disclosure, the inventive high thermal conductivity material is processed with various options discussed earlier such as: (1) commercially available granulated SiC materials can be coated with a protective outer layer such as BSAS, (2) BSAS can be added into commercially available SiC and granulated prior to being heat treated, (3) a mixture of Al and Si can be admixed into commercially available SiC powder, granulated, pelletized (or otherwise formed) and heat treated thereafter. In these options, the resultant pellets are further coated with an outer layer of either a catalytically active material or a support layer (i.e., interfacial layer) for the catalytically active material, leading to the formation of a core-shell catalyst. The outer layer can be applied either after the catalyst support (i.e., the core) has been heat-treated or before heat-treatment (i.e., applied to a "green" core material). In either instance, the deposited outer layer is typically heat treated at various temperatures in order to allowing the deposited outer layer to adhere to the core support material. The deposited layer varies in size, with an average layer thickness from 10 μm to 200 μm. It is this layer that is impregnated with catalytic metals for various catalytic applications (unless the catalytically active material is incorporated into the outer layer deposited onto the core).

In some embodiments, the outer layer is deposited from a slurry containing the material of choice to the granulated high thermal conductive catalyst support material that has not been heat-treated (i.e., is still green). In other embodiments, the deposition of the outer layer is done to an already heat-treated core. In both of these instances, the deposited outer layer is heat treated at various temperatures ranging from 600° C. to 1500° C., or from 850° C. to 1450° C.

The outer layer(s) of the catalysts of the present disclosure can be applied to the SiC/Al—Si composite core in a variety of ways, including spray coating or dip coating. In spray coating, the material of the outer layer is sprayed onto pellets as an organic or aqueous slurry. In dip coating, the granulated particles are dipped into an organic or aqueous slurry containing the material of the outer layer. An example of the inventive catalyst support core is shown in the SEM image of FIG. 5, wherein an outer layer of a Ni-containing catalytically active layer (shown as C) has been deposited onto a SiC/Al$_2$O$_3$ composite core (A), with an intervening interfacial layer of alumina (B).

As noted above, catalysts described herein are of the core-shell variety that is prepared by the physical deposition of an outer layer onto the SiC/Al—Si solid core. This outer shell can be an interfacial layer that is subsequently impregnated with a catalytically active material, or a layer that is deposited with the catalytically active material already incorporated therein (e.g., oxide porous catalyst phase).

In one embodiment, pressed pellets are coated with an organic or aqueous slurry containing a secondary material either in metallic or oxide forms. The slurry is composed of known transition metals and metal oxide catalyst support materials. In one embodiment, the slurry comprises a nanoscale suspension of Ni particles (or other PGM particles) synthesized by a polyol process. After coating, the slurry is allowed to dry such that a solid coating is retained on the surface. A calcination step is common for a slurry-based catalyst coating to oxidize binders and other carbonaceous-based materials used in the formation of the slurry. The catalyst calcination step also acts to bind the catalyst coating layer to the surface. The materials largely fall into two classes: (1) supported catalyst powders, and (2) catalyst support powders. The former refers to catalyst support powders that already contain active catalysts, while the latter to support powders with no active metals but are impregnated with active catalyst metals after the composite coating is formed. The active catalyst layer can be added to or coated on the pressed pellets either as a complete catalyst which includes the active metal disposed throughout a high surface area support or just the high surface area support without the active metal can be added or coated to the pressed pellet. In the latter case, the active metal is impregnated in a secondary step into the porous support layer that has already been coated on the pellet.

A coating slurry can be prepared, for example, by adding the desired powder material into an organic medium such as, but not limited to, ethyl cellulose, polyvinyl alcohol, or α-terpineol. Powder materials may be chosen from the following non-exhaustive list: aluminum-silicon, zirconia-ceria doped alumina, alumina, zirconia doped ceria, alumina-silica mixture, gamma alumina, alpha alumina, magnesium-promoted alumina, calcium-promoted alumina, sodium-promoted zirconium-cerium oxide, cerium oxide, titania-promoted silica, among others. These materials will form a coating on the core that either supports a catalytically active material incorporated in the slurry, or can be impregnated with a catalytically active material after heat treatment. The above oxides may be applied with or without the following catalytically active metals disposed therein in the form of dispersed nanoclusters, spots, dots, and the like: nickel, platinum, rhodium, ruthenium, cobalt, rhenium, iridium, among others. Elements known to play promoting roles or suppression of coke formation may optionally be added.

The as-dried coating is calcined on the pellets by raising the temperature slowly to target temperature and held there for about at least 1 hour. A catalyst calcination temperature may range from about 300° C. to about 800° C. The oxygen environment (e.g., ambient air) of the calcination process will result in the burning off of any binders used in the formation of the catalyst slurry. After the catalyst calcination step, the catalyst coating layer will be fused to the underlying ≥60% theoretically dense SiC core and the catalyst coating layer will retain porosity and be largely free from organic binders.

If the applied coating did not include a catalytically active material, a last step for fabricating the core-shell catalyst is to infiltrate (i.e., impregnate) this layer with active catalyst metal ions. Metal ions of interest are dissolved in a medium, preferably water but can also be organic. Pellets are immersed into the medium upon which the ions impregnate the porous outer layer. After a defined time ranging, for example, from about five minutes to about four hours, the metal ion-infiltrated support materials are drained from the solution and dried, e.g., at 120° C. for time periods between 30 and 60 minutes or longer. Lastly, support materials are calcined in air at various target temperatures in order to, for example, remove binders (e.g. residual organics).

Inventive Catalyst Structure and its Support defined by its Oxidation Resistance Silicon carbide (SiC) and SiC-based composites require a protective coating when the application involves exposure to oxidizing environments and high temperature as typical for many chemical reactions, including but not limited to steam methane reforming. SiC undergoes simultaneous oxidation and volatilization in steam under these conditions. SiC oxidizes on exposure to oxygen at high temperatures via:

$$SiC + H_2O(g) \rightarrow SiO_2 + CO(g) + 3H_2(g)$$

Oxidation of SiC is limited by mass transfer of oxygen into the core of the material. Thus, oxidation will be non-uniform, slowing down towards the core of the material. It has also been determined that the unwanted oxidation of SiC is enhanced in the presence of water as compared to a dry feed mixture at high temperature. This oxidation is due to the pronounced solubility of SiO$_2$ in water which shifts the rate in favor of the unwanted SiO$_2$ formation. In the presence of water, the reaction behind the volatilization of SiC is per the following:

$$SiO_2 + H_2O \rightarrow Si(OH) + (g)$$

The underlying oxidation of an SiC catalyst support during a catalytic chemical reaction is especially problematic as the base layer underneath the catalyst coating might become weak, such that the catalyst coated on top of a weak base layer can be lost due to spallation and delamination. Loss of catalyst manifests as catalyst deactivation during operation of a chemical reactor which then reduces efficiency. Further, spallation introduces fines within the packed bed reactor which can block some gas pathways, giving rise to increased pressure drop and reduced process or reaction efficiency.

As described previously herein, a catalyst support according to embodiments of the present disclosure can be fabricated by pre-mixing SiC with Al (and optionally Si, particularly by using an Al—Si alloy), pressed into densified pellets, and then further fused by heating at high temperatures in an oxygen environment. The resultant material ($SiC/Al_2O_3$) has increased density as compared to conventional, porous SiC and has excellent oxidation resistance properties. Experiments to study the oxidation behavior of SiC in the resultant composite of SiC and alumina pressed pellets reveal a composite material which, unlike bare SiC that oxidizes readily in an atmosphere of air and steam at high temperatures, is highly resistant to oxidation and subsequent volatilization as indicated by low gain in weight at such conditions as seen below.

Figure 6:
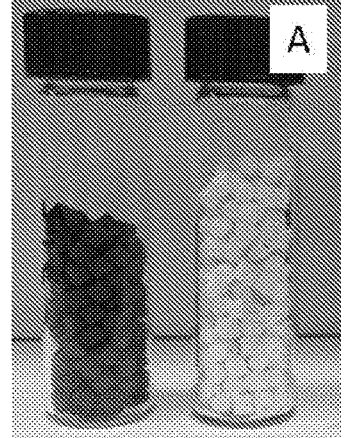
FIG. 6 provides photographs that demonstrate the oxidation resistance of the inventive of catalysts under steam-containing and high temperature environments.
Figure 6:
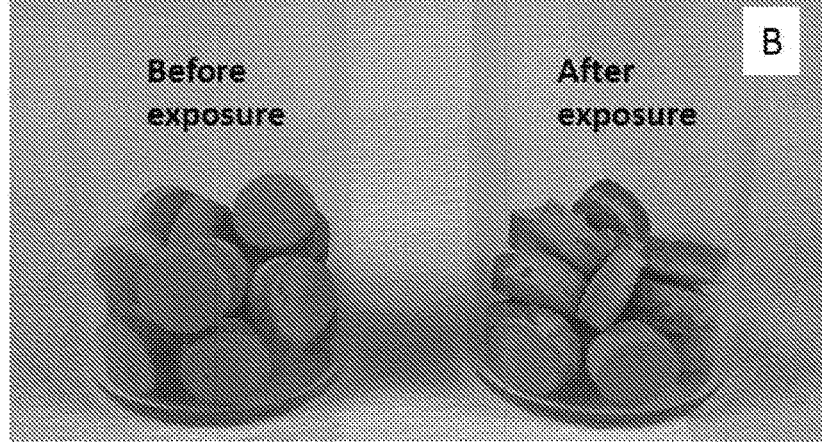
Figure 7:
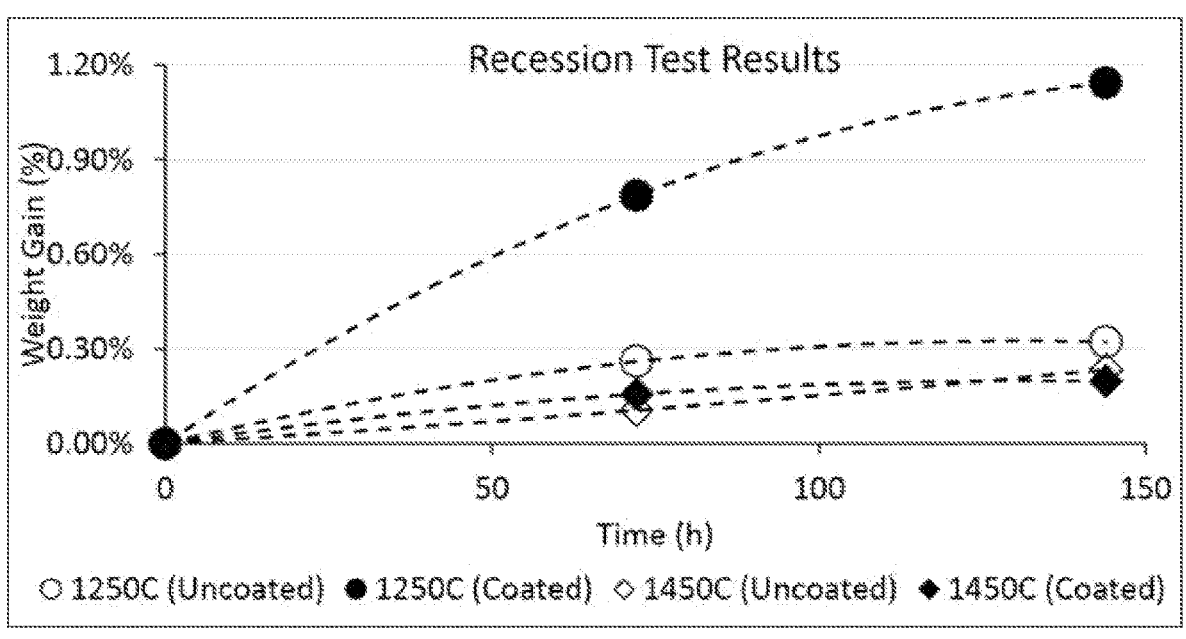
FIG. 7 provides weight gain results for a representative sample of the inventive material with time under conditions of 50% steam in forming gas (3% hydrogen in nitrogen) at 900° C.
Figure 8A:
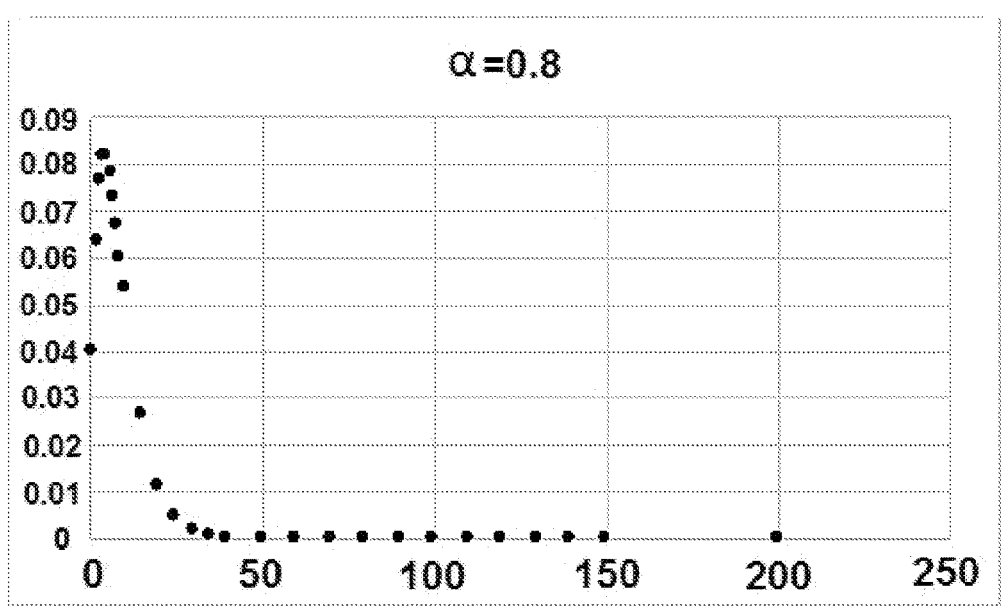
FIG. 8 (A to D) provides plots showing the mass fraction of the nth hydrocarbon versus the carbon number for alpha ranging from 0.8 to 0.99. As alpha increases the mass fraction of heavier hydrocarbons increases substantially.
Figure 8B:
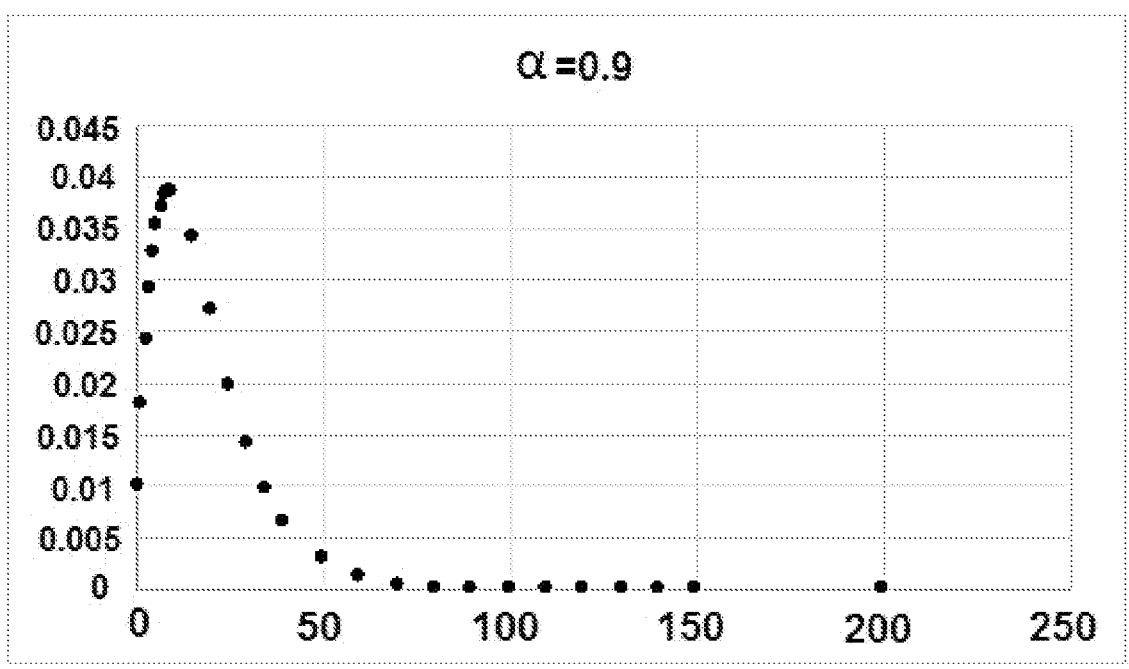
Figure 8C:
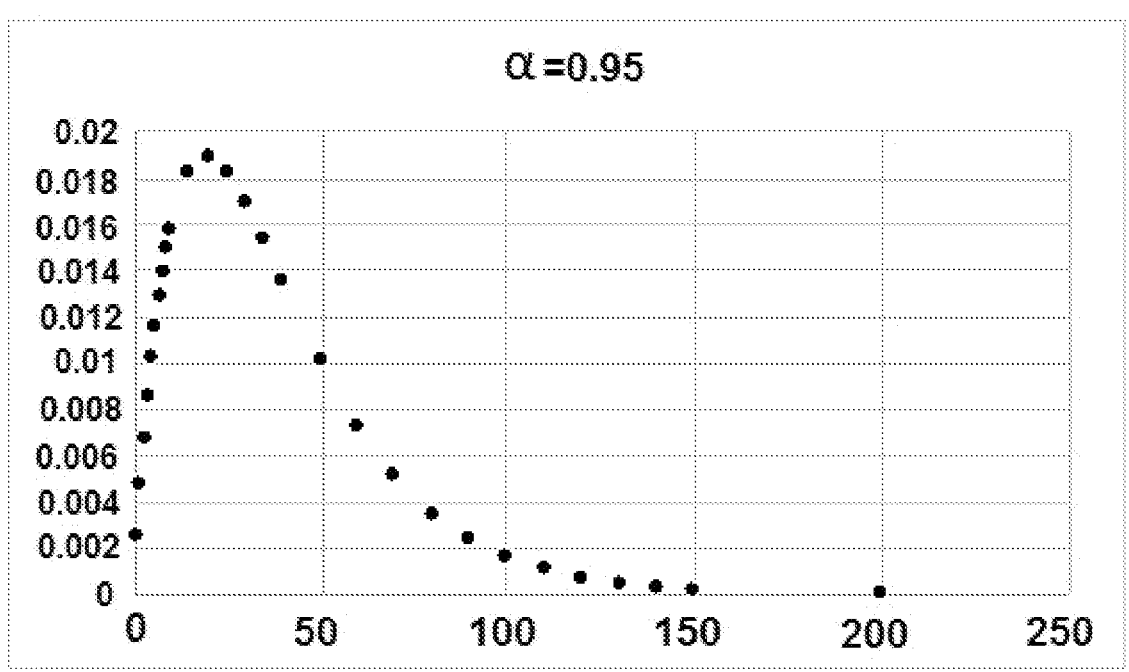
Figure 8D:
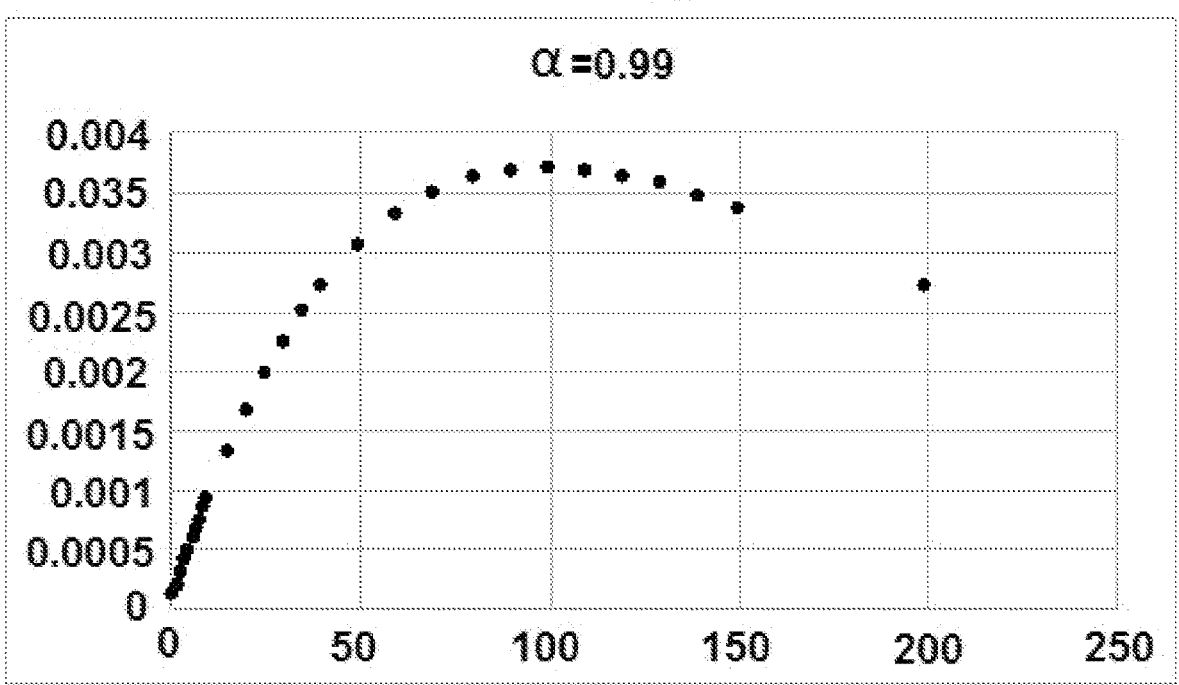

The resistance of the pellets with Layers 1 and 2 against oxidation and volatilization was tested by heating the materials at a temperature of 900° C. in an environment of 25% steam in air. The materials tested at 900° C. in steam were first processed or thermally treated at temperatures of 1250° C. for one hour prior to running the aging test. The heating rate to 1250° C. for this test was 3° C./min and the cooling rate was 5° C./min. Similarly, the oxidation behavior of the materials (coated or uncoated) processed at various temperatures from 1050° C. to 1450° C. has been studied in an environment of 50% steam in forming gas (3% hydrogen, balance nitrogen). These reactions have been studied for different time periods. FIGS. 6A and 6B are photographs depicting sample results from these studies, and FIG. 7 is a plot of the sample weight gain during the studies. In the photograph of FIG. 6B, there is no visible change of the material (no weight gain nor color change) after a 44-hour period in 25% steam in air environment at 900° C. In contrast, commercial SiC pellets (FIG. 6A) under the same conditions are completely oxidized as seen by the white color in the unprotected SiC pellets in FIG. 6A. FIG. 7 shows how the substantial weight gain occurs with time and the importance of protecting SiC when used in a high temperature environment with steam as required for an industrial methane reforming catalyst.

To further quantify the weight gain, pellets to be subjected to this test are weighed and first dried at a temperature of 150° C. Dry pellets are loaded on an alumina ceramic boat and slid into the hot zone of a one-inch nickel-Inconel tube. A flow of forming gas (3% $H_2$ in $N_2$) is passed over the pellets and the tube is heated to 900° C., at a temperature of 3° C./min. Once the furnace temperature reaches above 300° C., water (pumped using an HPLC pump) is introduced into the tube. The water passes through a vaporization zone maintained at 500° C. that turns water into steam. The water introduced is such that the steam partial pressure is 50% of the total gaseous compounds. The test duration starts when the furnace reaches 900° C. At the end of a timed test, the furnace cools down at 5° C./min. Water is switched off when the furnace temperature reaches about 300° C. The pellets are unloaded when the furnace has substantially cooled to below 100° C., and their weight recorded immediately. The cumulative weight gain for the inventive composite pellets of SiC and alumina is less than 1% weight gain over 300 hours, and more preferably the protected inventive pellets will have less than 0.1% weight gain over 300 hours when tested at 900° C. in a mixture of 50% steam in forming gas. Similar results would be obtained from testing of catalyst particles (i.e., the cores coated with a catalytically active layer.

As discussed previously herein, the pressed pellets are first formed using an admixture of SiC and aluminum grains. Aluminum is dispersed within the pellet and plastically deforms around the SiC grains under a high pressure pressing operation. Grains are defined by the substantially micron size SiC particles (range from 0.1 micron to 50 microns) that are admixed with aluminum particles (from 0.1 micron to 50 microns) before densifying and forming pellets as created with the use of a high-pressure pelletizing press. When the pellet comprised of SiC and aluminum undergoes an initial heat treatment process, aluminum preferentially reacts with oxygen (in the form of air, oxygen, and/or steam) to form a protective scale comprised of aluminum oxide around the exposed or gas-diffusion reachable (excluding solid state diffusion) surface area of the SiC grains of the pellet. The most preferred form of the protective scale is the phase alpha-alumina. In one embodiment, the protective scale comprises a combination of alumina phases. The phase of alumina is controlled by the selection of heat treatment conditions, primarily temperature. Above about 900° C., alpha alumina becomes favored and oxides formed at lower temperatures are further transformed to a substantially dense alpha alumina phase. In some embodiments, the protective scale is comprised of alpha-alumina and has an average thickness ranging from about 0.3 to 3 microns. The formation of the protective alumina scale occurs at high temperatures exceeding ~850° C., such as by calcining at 900 to 1000° C. for 2 to 20 hours.

The formation of a substantially dense alumina layer protecting the interior pressed SiC grains will reduce the oxidation or degradation of the SiC grains and extend the catalyst lifetime. The resulting catalyst core material will show less than 1% weight gain over 300 hours, and more preferably the protected inventive pellets will have less than 0.1% weight gain over 300 hours when tested at 900° C. in a mixture of 50% steam in forming gas. Similar results would be obtained from testing of catalyst particles (i.e., the cores coated with a catalytically active layer.

The resulting catalyst, as created after the formation of a protective alumina barrier and after subsequent coating of an active catalyst, will demonstrate less than 1% loss of activity between 100 and 1000 hours of time on stream during the operation of the methane steam reforming reaction. The catalyst, due to its protective internal barrier against oxidation corrosion of the underlying high thermal conductivity SiC core, will have an expected catalyst lifetime of at least two years before replacement. In situ regeneration cycles may be required to improve the catalyst performance during the two-year lifetime but the catalyst is still effective for operation and the production of hydrogen. The operating conditions for the catalyst are 20 bar, a steam to carbon ratio of at least 3, a GHSV of at least 2000 $hr^{-1}$, and a tube wall temperature of at least 850° C., wherein the methane conversion exceeds 50% and or has an equilibrium approach temperature closer than at least 50° C.

In another embodiment, the catalysts according to the present disclosure will match the extended lifetime of the steam methane reforming tubes. As the lifetime of the tubes has been increased, maintenance and plant downtime that corresponds with tube replacement is matched with catalyst lifetime and cycle for catalyst replacement. The net result is a methane steam reforming plant operated with an increased uptime. In one embodiment, with the use of the inventive catalyst, the methane reforming plant uptime is greater than 0.95 and more preferably greater than 0.98 and in a most preferred embodiment the plant uptime exceeds 0.99. The uptime exceeding about 0.99 corresponds to a one-week turnaround time or downtime without hydrogen production over at least a roughly two-year operating cycle. During the one-week turnaround time, both the reaction tubes and the inventive catalyst housed therein are replaced to maximize the desired productivity or uptime (defined by the on-stream factor or the fraction of time that a plant is producing a product) of a methane steam reforming plant. For example, a commercial hydrogen plant producing at least 10 MM standard cubic feet per day hydrogen using a catalyst of the present disclosure operates continuously for 12 months, where continuously includes the use of intervening catalyst regeneration cycles lasting less than 48 hours but not a full plant shutdown (as would be required to change out tubes). Improved Selective Oxidation Reactions with Disclosed Catalysts Selective or partial oxidation reactions combine a small molar volume of oxygen (added as pure oxygen, air, or with some level of dilution with inert gas) with a hydrocarbon reactant that can be in the gas or liquid phase. Oxygen reacts over a solid catalyst with the reactant hydrocarbon to preferentially produce a high value product. A small fraction of oxygen may combine with the reactant and/or desired product to form unwanted deep, full oxidation or combustion products. These reactions are exothermic for the desired partial or selective oxidation reaction and the reaction energy is less than the heat released for oxygen molecules to form full combustion products. As the temperature rises when heat is released from any of the series-parallel reactions, the rate of reaction towards the unwanted deep oxidation reactions increases. It is therefore advantageous to reduce the temperature rise on a catalyst during these reactions in order to produce a higher selectivity to the target or desired partial or selective oxidation products.

An example selective oxidation reaction is the production of maleic anhydride from n-butane over a commercial VPO (Vanadium-Phosphorous-Oxygen) catalyst. As described in Hofmann and Turek (2017), the gas-solid reaction mechanism is series-parallel, wherein deep oxidation products can be formed in parallel and in series with the production of the desired product, maleic anhydride. Selectivity is highly sensitive to the reactor temperature and heat removal through the catalyst particulate bed is an important parameter for efficient production.

Hofmann and Turek compare performance for a 1.5 mm and 3 mm catalyst bed thickness for a GHSV of 4800 hr$^{-1}$, a reaction temperature of 420° C., and an n-butane initial concentration of 1.4%. In a reaction diameter (tested as VPO catalyst particles packed within a microchannel slit or chamber) of 1.5 mm and a mean catalyst particle diameter of about 400 microns, the selectivity to maleic anhydride was about 65% at an n-butane conversion of about 60%. At a higher n-butane conversion of about 95%, the selectivity of maleic anhydride drops to about 55%. The selectivity reduction as conversion rises is a result of changing partial pressures within the catalyst bed which favor the deep oxidation reaction pathway.

At a larger channel slit or gap or diameter of 3 mm for the same catalyst particle size and reaction conditions, the selectivity drops to about 45% at about 95% conversion whereas the selectivity was 55% at equal conversion in the 1.5 mm slit. The lower selectivity at equal conversion and GHSV for the larger 3 mm slit as compared to the 1.5 mm slit is a result of a temperature rise within the catalyst particulate bed which is packed within a 3 mm reactor gap.

The measured reactor temperature was substantially isothermal in the 1.5 mm slit reactor. The 3-mm slit reactor experimentally showed hot spots and a thermal gradient of about 10° C., across the 3-mm reactor heat transfer distance for this case with an n-butane feed concentration of 1.4 vol %. For a higher n-butane feed concentration of 4.5 vol %, the hot spot rises to 15° C. for the 3-mm packed bed slit reactor. This type of hot spot formation and reduction in product selectivity for selective oxidation reactions is common. GHSV is typically reduced to lower the local heat generation rate and maintain good selectivity.

In one embodiment, the use of the SiC-based catalysts of the present disclosure will allow for an increase in GHSV of about 0.1 to 10% while maintaining an equivalent selectivity for an equivalent tube diameter, feed composition, temperature, pressure, catalyst composition, and mean catalyst particle size.

The catalysts of the present disclosure enable a higher effective thermal conductivity for a fixed bed or particulate catalyst. When applied for a selective oxidation reaction for the range of measured effective thermal conductivity, the expected increase in selectivity to the desired partial or selective oxidation reaction will be about 0.1% to about 10% higher at equal WHSV, feedstock composition, temperature, pressure and active catalyst composition. WHSV (weight hourly space velocity) is defined as the weight of feedstock per hour divided by the weight of catalyst as contained in the active layer or shell coated around the SiC core of the disclosed catalyst.

In another embodiment, the catalysts of the present disclosure can be applied to selective liquid phase oxidation reactions. Liquid phase reactions typically operate with much longer residence times and lower catalyst WHSV. The mass diffusivity of reactants in the liquid phase reaction medium is roughly 3 orders of magnitude lower than a gas phase mass diffusivity and hence the eggshell (i.e., coreshell) form of the catalysts of the present disclosure will offer advantages for effective catalyst use during liquid phase selective oxidation reactions. Liquid phase oxidations are also highly exothermic, and some reactions can operate near explosion conditions. Heat removal is essential for safe operation and to maintain a high selectivity to the target selective oxidation product. The catalysts of the present disclosure will remove heat more effectively than a traditional fixed bed pellet due to its higher effective thermal conductivity. It is anticipated that the selectivity to a high value selective oxidation product will increase from about 0.5 to 15 percent over a traditional fixed bed catalyst when operated at the same WHSV, feed concentration, temperature, pressure, and catalyst composition. Temperature in liquid phase selective oxidation over a fixed-bed particulate catalyst is often controlled by running with a low WHSV to minimize heat generation and thermal hot spots while maximizing desired product selectivity. Selectivity is often very high for liquid phase selective oxidation reactions because WHSV is very low. The use of the catalysts of the present disclosure are expected to be able to increase the reaction WHSV without adversely affecting product selectivity. In one embodiment, the WHSV of a liquid-phase selective oxidation reaction productivity will be increased by a factor of 1.2 while maintaining the same selectivity. In an alternate embodiment, the WHSV and reaction productivity will be increased from 1.05 to 1.3, while maintaining the same selectivity, over a catalyst of equivalent composition, when operated with a similar feed rate of hydrocarbon and oxidant, diluent composition, temperature, and pressure.

Catalysts Comprising SiC Supported Catalysts that can be Loaded Onsite without Loading Process or Reactor Modification Steam methane reforming (SMR) is used industrially for generating hydrogen and is a highly endothermic process ($\Delta Hr=-206$ KJ/mol). The process operates at high pressure (up to 40 bar) and high temperature (as high as 950° C. reaction temperature or 1050° C. tube temperature) so as to ensure high methane conversion as a result of thermodynamic equilibrium limitations for this reaction at high temperature and pressure.

To maintain high temperatures and supply the necessary energy to drive the strongly endothermic reaction, heat is supplied around the exterior of a series of parallel reactor tubes that contain an active catalyst. Several technologies have been designed to heat the reactors. Methods to supply heat for the endothermic reaction include convective heat transfer, radiant heat transfer, and direct combustion or burners. Compact reformers are also an active area of development to intensify heat transfer and reduce the size and cost of industrial hydrogen production from methane reforming. Most industrial methane reformers supply heat from integrated natural gas burners. The reactor furnace contains a box-type radiant section that houses the burners and a convection section whose purpose is to recover waste heat from flue gases leaving the radiant section.

Catalysts used in steam methane reforming are usually made of Ni deposited on a high surface area support, primarily a high surface area, porous alumina. Alternative metals such as cobalt and precious metals have also shown high activity but have not been widely adopted due to cost. Nickel surface area is the main factor controlling catalyst activity but the overall productivity of hydrogen is limited primarily by heat transfer rather than catalyst activity.

For use in industrial reformers, the typical $Ni/Al_2O_3$ catalyst is shaped into cylindrical pellets of less than about 10 cm in length (typically 1 to 5 cm in length) and a diameter less of than 10 cm (typically 0.5 to 3 cm in diameter). To ensure maximum methane contact with Ni particles and reduce the likelihood of pressure drop increase, radial holes are formed throughout the cylindrical pellets. These catalyst pellets are loaded into reactor tubes that are typically about 0.1m in diameter and up to about 10 meters in length.

The loading of catalyst pellets into industrial SMR reactor tubes is not a trivial process. The typical 10-m tubular reactors are catalyst-loaded from the top, and the pellets drop under gravitational force. Inherently, the pellets are subjected to a large impact as they tumble during loading from the tall fixed height. Companies have designed methods of loading that aim to minimize this mechanical impact. These methods include: (1) the use of a supersack and attached sock that ensures pellets are charged gradually and that the maximum free fall distances are minimized, (2) Unidense method that charges catalyst pellets using a proprietary Unidense equipment; and (3) other vibration technology can be used to densify the catalyst packing in stages along the tube length while minimizing mechanical stress on catalyst pellets. A dense packing is preferred so as to minimize non-uniformity in pressure drop between the many parallel tubes that comprise an industrial methane reforming plant. Flow maldistribution between tubes will affect performance and catalyst lifetime, as those tubes that receive less flow will be less able to utilize the heat provided from the exterior burner and in turn create hot spots in the metal tube walls. Hot spots act to deteriorate reactor tube lifetime. Ultimately, reduced catalyst breakage through collision, attrition, and abrasion, as well as denser packing to minimize flow maldistribution is desired and favored for catalysts.

Not only do the catalysts of the present disclosure have advantageous thermal properties, they are designed to be free flowing and as such can be utilized in current SMR reactor tubes without any modification to existing equipment nor modification to the existing catalyst loading and packing densification tools. The catalysts of the present disclosure can be loaded on-site after installation of the original or replacement tubes. In an alternate embodiment, the catalysts of the present disclosure can be loaded in a separate facility and shipped with the replacement reactor tubes during a plant turnaround. This embodiment would minimize the need for specialized catalyst loading equipment on site and could allow for a high utilization of catalyst loading equipment from a specialized facility.

Given the free-flowing nature of the catalysts of the present disclosure, it will follow a conformal loading characteristic. If the catalyst must be replaced at a frequency greater than the frequency of tube replacement, then the catalyst can be packed more easily around tube deformations. Industrial methane reforming tubes, as operated at high temperature and pressure, will deform over time during operation due to mechanical creep. Tubes that may no longer be perfectly symmetric can still be relatively easily reloaded due to the conformal and free-flowing nature of the catalysts of the present disclosure. The conformal packing attribute of the catalysts of the present disclosure will reduce the overall cost of the plant operation by allowing catalyst replacement either before the end of the useful life of the industrial reforming tubes or allow replacement coincidentally with new reactor tubes.

The catalysts of the present disclosure are made of a densified (>60% of theoretical density) SiC core having excellent mechanical properties. The crush strength and vibration resistance of the SiC-based catalyst pellets is improved over the crush strength and vibration resistance of a traditional porous alumina pellet. The disclosed catalyst will provide for initial performance closer to expected after catalyst loading and a longer catalyst lifetime by a reducing crack formation, catalyst breaking and formation of fines after the catalyst loading process.

The disclosed catalyst support material has been subjected to mechanical studies aimed at identifying how they will survive a typical loading processes used in industrial reforming tubes. These mechanical studies have been developed using standard ASTM methods and involve radial crush testing that involves putting the pellets under a radial load to study how much force is needed to crush the pellets. Table 7 summarizes mechanical properties of catalyst cores of the present disclosure support in comparison with commercial catalysts. Results indicate that the materials are competitive and will not need any special modification to the current reactor loading methods.

TABLE 7

| Property | Gen 1 | Gen 2&3 | Gen 4 | Gen 5 | Comm. |
|---|---|---|---|---|---|
| Density (% of theoretical) | 45 | 69 | >70 | >70 | 45 |
| Oxidation resistance (% weight gain) | 0.4-6 | 0.2-0.4 | 0.9 | 1 | n/a |
| Radial crush resistance (N/mm) | 71-89 | 53-125 | 120 | >125 | 44 |

The crush strength of the disclosed catalyst support exceeds the commercial catalyst by a factor of at least 2 and in one embodiment from 2 to 5. The crush strength of the disclosed catalyst exceeds 50 N/mm and has a range of 50 to 150 N/mm where the commercial reforming catalyst has a crush strength of 44 N/mm. The crush strengths of the disclosed and commercial catalysts were performed following an established ASTM International testing protocol (ASTM D6175-03 (2013)).

In Table 7, "Gen 1" was a commercially available, porous SiC catalyst support coated with BSAS. The porous SiC catalyst support was not sufficiently dense (i.e., less than 60% of theoretical density). "Gen 2 & 3" were composite cores comprising SiC/BSAS, and "Gen 4" and "Gen 5" were composite cores comprising SiC/Al₂O₃ with slightly different amounts of lubricants added during processing.

Catalyst for Fischer Tropsch Reaction

Fischer Tropsch synthesis (FTS) (see Equations 1 and 2 below) is a method for converting non-petroleum carbon sources including coal, coal-bed gas, and biomass into liquid fuels and chemicals. The transformation of these sources via FTS into fuels and chemicals is first preceded by the production of synthesis gas also known as syngas (CO and $H_2$) through technologies such as steam reforming or gasification. Two categories of products are obtained from FTS: non-oxygenated products such as gasoline, diesel, and light olefins, and oxygenated hydrocarbons such as methanol, ethanol, and mixed higher alcohols.

$$(2n+1)H_2+nCO=C_nH_{2n+2}+{}^{nH}{}_2O \qquad \text{(Equation 1)}$$

$$2\ nH_2+nCO=C_nH_{2n}+nH_2O \qquad \text{(Equation 2)}$$

Due to FTS's role of transforming non-petroleum carbon sources via syngas, it has attracted much renewed interest in recent years because of the diminishing crude oil reserves and the rapidly increasing global demand for liquid fuels.

Crucial to the success of FTS is the catalyst that plays an active role in the transformation of syngas to products. A catalyst with higher activity, selectivity, and stability is the current main thrust of research in FTS studies. Typical active metals used for FTS are Fe, Co and Ru. Typically, these metals are deposited on supports such as: $Al_2O_3$, $SiO_2$, $TiO_2$, among others. FTS is an exothermic reaction which releases heat to the surroundings. As a result, excessive heat on the catalyst surface will lead to hot spots which may work to the detriment of the catalyst's performance (activity and selectivity). To be effective, this heat must be dispersed faster from the surface of the catalyst. A catalyst support system capable of removing heat from the reaction surface to the outside of the tube is therefore highly desirable. Thus, apart from the catalyst being active, selective, and stable, its ability to efficiently remove heat from the reaction surface and hence preventing hotspot development makes it a more efficient catalyst. Improved efficiency may lead to increased activity or selectivity.

The catalyst supports (i.e., cores) of the present disclosure (a high effective thermal conductivity support material) offer an improved support for FTS catalysts. The high thermal conductivity as compared to the low thermal conductivity of present FTS supports will enhance the removal of heat away from the reaction surface. This will lead to avoidance of thermal hotspots and thus to a more efficient FTS catalyst.

The Fischer Tropsch reaction combines carbon monoxide and hydrogen (synthesis gas) over a cobalt or iron-based catalyst at high pressure and temperature to enable chain forming reactions that produce synthetic crude. The product mixture is a blend of hydrocarbons from $C_1$ (methane gas) through $C_{100}$ and beyond (solid wax). Synthetic crude can be subsequently refined and upgraded to create distinct product mixtures: gasoline, diesel, jet fuel, and waxes.

It is desired to convert as much of the synthesis gas to a carbon fraction above five-carbon atoms to minimize the amount of undesired light gases, primarily methane. A high carbon efficiency is desired and characterized with chain propagation, alpha. Alpha is the chain growth parameter in an Anderson-Shultz-Flory distribution (see Equation 3 below), where Fn is the mass fraction of the hydrocarbon with n number of carbon atoms (e.g. n=8 for octane, $C_8H_{18}$).

$$F_n=n(1-\alpha)^2\alpha^{n-1} \qquad \text{(Equation 3)}$$

FIGS. 8A-D present the mass fractions of the nth hydrocarbon versus the carbon number for alpha ranging from 0.8 to 0.99. As alpha increases the mass fraction of heavier hydrocarbons increases substantially. As alpha approaches a value of 1, the resulting hydrocarbon product consists of very long chain hydrocarbons that are substantially solid wax. In a practical system, an alpha value of 0.95 is very good and minimizes the amount of light gases produced with a methane slip or selectivity of less than 5% by mole. An alpha value less than 0.8 is not considered good and represents a methane slip of greater than 10% by mole. It is noted that light gas (less than carbon number 5) composition can deviate (exceed) the weight fraction predicted by the traditional Anderson-Schultz-Flory distribution.

The chain forming reactions (Equation 4 below) are favored at lower temperatures while higher temperatures favor light gas production, primarily methane (Equation 5 below). The Fischer Tropsch reaction is strongly exothermic; heat must be removed from the chemical reactor during operation to avoid thermal runaway and control selectivity to desired products.

$$CO+2H_2=(-CH_2-)+H_2O\ \Delta_{r\_298K}=-152\ \text{kJ/mol} \qquad \text{(Equation 4)}$$

$$CO+3H_2=CH_4+H_2O\Delta H_{r\_298K}=-206KJ/mol \qquad \text{(Equation 5)}$$

The chain forming reaction is slightly less exothermic than methane formation and thus hot spots within the catalyst tend to further enhance unwanted methane formation with a negative feedback loop. In some cases, thermal runaway can occur where poor heat removal and high internal temperatures promote a high extent of reaction to methanation.

A fixed catalyst bed design is common for a Cobalt-based catalyst. Typical operating conditions range from 190 C to 240 C and pressures range from 10 to 40 bar. The reaction tubes are typically cooled by steam generation as water flows around and between tubes to remove reaction energy at the edge of each catalyst-filled tube. As temperature rises 10 C or more within the catalyst bed or particles, the methane formation molar selectivity increases by 5% or more and reduces alpha by 0.05 or more. It is desirable to minimize the exotherm or hot spot within the catalyst bed to less than 10° C., and more preferably to less than 5° C.

One option to reduce the catalyst hot spot is to reduce the tube diameter that houses the particulate or fixed bed catalyst. A practical tube diameter of about 1 to 2.5 inches may be reduced to about 0.5 to 0.75 inch but this negatively affects overall process economics. The larger number of tubes to achieve a given capacity or production volume adds more metal (higher cost) and greater complexity to manifold more tubes within a larger vessel. It is desirable to reduce the hot spot within the fixed bed catalyst without reducing the reactor tube diameter.

The catalysts of the present disclosure have two features that positively reduce the hot spot and provide better reaction performance for a reactor filled with a Fischer Tropsch catalyst. The first advantage is the higher effective thermal conductivity within the fixed bed. Improved radial heat transfer removes more exothermic heat and reduces the hot spot within the catalyst bed. The improved axial and radial heat transfer decreases or smooths out the large thermal gradient decreasing the overall magnitude of the hot spot. A lower hot spot thereby increases the reaction alpha and reduces the amount of unwanted methane. Higher reaction alpha is preferred as the value of produced wax is high and depending on current market drivers, the wax can be hydrocracked to valuable jet fuel or a different fuel blend.

It is anticipated that a Fischer Tropsch catalyst created by a thin catalyst layer on top of the disclosed SiC-based core will result in an exotherm or hot spot that is reduced by 2° C. to 8° C. compared to a conventional Fischer Tropsch catalyst when operated under equal conditions. The resulting methane molar selectivity will be reduced by 2% or more from a corresponding conventional catalyst when operated under similar conditions and likely range from 2 to 5% lower. The product alpha will be at least 0.02 higher and range from 0.02 to 0.08 higher for tube diameters between about 0.75 and 2.5 inches, a GHSV from about 500 to 5000 $hr^{-1}$, a starting temperature between about 200 and 240° C. for a Cobalt-based catalyst and about 300 to 350 C for an iron-based catalyst, a pressure between about 10 and 40 bara, and a hydrogen to carbon monoxide feed ratio between about 1.9 and 2.5.

The second advantaged feature of the disclosed catalyst for the Fischer Tropsch reaction is the local control of hydrogen to carbon monoxide ratio. From the reaction equations, a synthesis gas feed ratio ($H_2/CO$ ratio) closer to 2 favors the desired chain forming reactions while a synthesis gas ratio closer to 3 favors the undesired methane formation. Inside catalyst pores, hydrogen is much more facile and diffuses more quickly than carbon monoxide to internal active catalyst sites. Methane formation is favored within the catalyst as the hydrogen to carbon monoxide ratio gets closer to three. Increased methane formation within the catalyst particle has two negative attributes-more unwanted methane forms and more heat is released inside the particle which acts to further shift the reaction away from the desired chain forming reactions and thus form even more methane.

The use of an egg-shell type catalyst, where an active catalyst is impregnated in a thin ring or shell around the outside of a porous catalyst pellet has been described in the Fischer Tropsch prior art. An egg-shell catalyst acts to reduce the number of active catalyst sites where the local synthesis gas ratio is greater than 2 and typically greater than about 2.5 to 3.

The catalyst structures of the present disclosure employ a densified (>60% of theoretical density) catalyst core rather than a porous core, and as such the center of the catalyst pellet cannot fill with unconverted hydrogen nor remain a repository of formed liquid or wax products. The interior repository of liquid or wax at the interior of a catalyst particle makes catalyst regeneration more challenging. Unconverted hydrogen that remains in the porous core of a catalyst particle can counter-diffuse to the internal edge of an eggshell catalyst and thereby increases the local ratio of hydrogen to carbon monoxide and in turn increases the undesired methane selectivity.

The disclosed catalysts described herein have hydrogen and carbon monoxide diffusing only from the exterior of the catalyst particle surface due to the solid core and the diffusion distance is kept small, i.e. from 10 to 100 microns, within the catalyst coating on the exterior of the densified pellet. It is anticipated that the selectivity to desired chain forming reactions will be increased with the disclosed catalyst and the alpha value will be from 0.02 to 0.08 higher than a conventional catalyst pellet while the methane selectivity will be from 2 to 5% lower than a conventional catalyst when operated under similar conditions. The anticipated performance increase of lower methane selectivity and higher alpha represents a significant improvement to the overall process economics for Fischer Tropsch processes.

The disclosed Fischer Tropsch catalysts according to the present disclosure can be used in a traditional gas to liquids plant. Methane or natural gas is steam reformed to produce synthesis gas before undergoing process steps to reduce temperature and remove some hydrogen (to adjust the synthesis gas ratio closer to 2 versus 3) before entering a fixed-bed Fischer Tropsch reactor. The disclosed Fischer Tropsch catalysts can also be used with non-traditional gas-to-liquids plants, including the use of biogas or bio-derived synthesis gas as formed from gasification processes using waste or biomass feedstock materials. The synthesis gas generation process may include partial oxidation, auto-thermal reforming or traditional reforming to form the carbon monoxide and hydrogen synthesis gas feed mixture ahead of the Fischer Tropsch process utilizing the disclosed catalyst.

Catalysts for Benzene Toluene and Xylenes (BTX) Production

Benzene, toluene and xylenes (commonly referred to as "BTX") are important petrochemical compounds and are among the most abundantly produced chemicals in the world. BTX is defined by a product mixture comprising benzene, toluene, and/or xylene. The BTX chemicals are essential feedstocks for the production of automotive products, textiles, plastics, solvents and many other common industrial products. BTX are primarily produced by the endothermic catalytic reforming of naphtha refined from petroleum, particularly naphtha obtained from the distillation of crude oil. Bio-based processes to produce BTX chemicals are in development but face similar challenges as found in conventional naphtha reforming, including heat-limited production rates and strong catalyst deactivation exacerbated by cold spots. Catalysts produced in accordance with the present disclosure will be effective not only for use in conventional BTX production using a naphtha feedstock, but also in bio-based processes.

By way of example, a typical catalytic reforming system for producing BTX from naphtha includes multiple reactors (e.g., 3 or 4) operating in series. Because the catalytic reaction is endothermic, heaters are typically provided upstream of the first reactor and between reactors in order to heat (and reheat) the gas mixture. Electrical heaters are also provides along the reaction tubes to supply additional energy needed for the endothermic reaction. The reactors are typically packed with a catalyst made of Pt deposited on chlorinated $Al_2O_3$. The base catalyst has been modified through the years by adding various elements that extend catalyst lifetime and reduce deactivation. The reaction is carried out at temperatures of up-to 550° C., and pressure levels of up-to 40 bar.

There are various reactions that occur in a catalytic reforming reactor. For the production of BTX, the dehydro-cyclization of paraffins into aromatics and the aromatization of paraffins lead to formation of BTX compounds. These reactions are endothermic and characterized by consuming heat as it is externally provided to the catalyst. For this reason, heaters at the exterior of reactor tube walls must maintain a high heat generation rate to maintain a sufficient heat flux across the reactor walls to drive the reaction. Heat is also added to the cooled effluent gas mixture from one reactor stage using a gas-gas heat exchanger placed between reactors to preheat reactants before entering the next reactor in series. The thermal conductivity properties of porous alumina catalyst pellets are low and thus heat transfer efficiency from radial heat transfer is limited by the current catalyst technology.

The catalyst cores of the present disclosure, having a high effective thermal conductivity, are advantageous for use as naphtha reforming catalysts to produce BTX. Use of the disclosed catalyst support technology will lead to improved heat transfer from the reactor tube wall to the active catalyst sites across the reactor radius and thus lead to a higher BTX productivity.

Fixed bed reactors as used in semi-regenerative reactor designs for the catalytic reforming of naphthalenes to form BTX typically include an additional reactor bed (e.g. 3 primary reactors plus a spare used during regeneration) to maintain continuous and steady production. The reaction is prone to coke formation and requires a regeneration cycle for each fixed bed within every 6 to 24 months. Performance will slowly drop as carbon builds up between regeneration cycles. The catalyst can be regenerated only 3 to 4 times before it must be replaced.

The disclosed catalysts of the present disclosure will improve the radial heat addition from the tube walls to the endothermic reaction occurring within the catalyst. As more heat is added to the reactor, BTX productivity can be increased by reducing cold spots. A reduction in the cold spot (higher thermal gradient) within the reactor also decreases the rate of deactivation, including carbon formation. Lower deactivation rates increase production capacity between reactor regeneration cycles and increases the time between regeneration cycles to thereby extend the total catalyst lifetime. Turaga and Ramanathan report that productivity or highest catalyst activity for naphtha reforming to BTX is within the temperature range of 733-798 K (460-525° C.) and deactivation is increased in the temperature range of 755 to 773° K (482-500° C.). Therefore, the disclosed catalysts of the present disclosure with a higher effective thermal conductivity will result in a smaller cold spot and thus a lower rate of deactivation.

Maintaining a temperature across the reactor radius above 500° C. lowers the rate of deactivation and can be enabled by the use of the high effective thermal conductivity disclosed catalysts of the present disclosure. In one embodiment, the catalysts of the present disclosure could enable a simplified construction of naphtha reforming plants. Existing naphtha reforming plants could be retrofit to increase capacity, where an inventive process based on the use of the disclosed catalysts could be based on just two fixed bed reactors rather than three or four. The first primary fixed bed reactor operates with improved radial heat addition as enabled by the disclosed catalyst to reduce internal catalyst thermal gradients to maintain productivity and to minimize deactivation, including coking. Reactor operation can be switched between just two reactors to allow for regeneration of one fixed-bed reactor while maintaining production capacity with the second fixed bed reactor. In one embodiment a four-reactor bed naphtha reforming plant could be retrofit as two 2-reactor naphtha plants thereby increasing the overall plant production capacity of BTX.

The other major type of naphtha reforming to BTX is a continuous catalytic reformer where a portion of the catalyst is removed from a reactor bed during operation and flowing to a regeneration reactor before adding back to the top of the original catalyst bed. For this type of process, the free-flowing nature of the catalysts of the present disclosure along with its improved effective thermal conductivity will act to reduce deactivation and increase the time between regeneration cycles.

Examples of multiple types of naphtha reformers have been described in the prior art and include continuous catalytic reforming reactors (CCR) or continuous cyclic processes used by producers or supporting catalyst suppliers: Axens, Criterion Catalyst Co, Exxon Mobil, Indian Petrochemicals Corp, IMP (Instituto Mexicano del Petroleo) and UOP. Examples of semi-regenerative reactors for naphtha reformers used by producers or supporting catalyst suppliers include: Axens, Criterion Catalyst Co, Exxon Mobil (Powerforming Process), BP (Ultraforming Process), Chevron (Rheniforming Process), BASF (Magnaforming Process developed by Engelhard), Air Products and Chemicals (Houdriforming Process), Indian Petrochemicals Corp, IMP (Instituto Mexicano del Petroleo) and UOP.

BTX can also be produced from biomass rather than from crude oil. One process under development by Anellotech takes biomass derived fast pyrolysis oils to produce BTX over a zeolite catalyst in a single stage catalytic fluidized bed reactor. A slip stream of the catalyst is continuously regenerated. Virent has also developed the BioForming process for producing BTX with co-production of jet fuel and gasoline from biomass feedstocks. Other researchers [5] are developing production process for bio-feedstocks, including crude glycerol, to produce bio-BTX. The reaction remains endothermic and improved heat addition as afforded by the catalysts of the present disclosure will improve efficiency. The production of bio-BTX remains challenged by the co-production of carbon or solid coke that covers the catalyst and limits production efficiency.

It is envisioned that the use of the catalysts of the present disclosure can extend the time between catalyst regeneration by 1 to 12 months compared to conventional catalysts as defined by a catalyst composition, feed WHSV (gram feedstock per gram catalyst per hour), and equivalent feedstock composition.

Catalyst Comprising SiC Supported Catalysts that can Provide Longer Tube Life

High thermal conductivity catalyst supports, as created by the disclosed catalyst system described herein, enables a significant energy reduction, for strongly endothermic reactions (such as methane steam reforming or dry or $CO_2$ reforming of methane). The disclosed catalysts also reduce wall temperatures, allowing simplified metallurgy or extended tube lifetime. Alternatively and in addition, such catalysts can increase reactor production capacity or throughput.

It is a well-established problem in steam methane reforming that high operating temperatures (800-950° C.), along with the high operating pressures (up to about 40 atmospheres) are required to overcome fundamental thermodynamic limitations on reaction conversion and selectivity in the production of hydrogen from methane. These conditions are also required to allow downstream syngas purification via pressure-swing absorption, or other reactors, such as Fischer-Tropsch synthesis. To drive heat into the endothermic reaction, metal walls that house a traditional particulate or fixed-bed catalyst must be operated at very high temperatures as created by an external burner. Combustion near the tube exterior surface gives rise to a high wall temperature as is required to drive sufficient energy into the tubes and through the particulate catalyst to match energy consumption demand from the strongly endothermic reaction.

The highly endothermic methane reforming reaction is shown in Equation 6 below. The highly endothermic dry reforming reaction is shown in Equation 7. The water gas shift reaction which occurs in parallel and is fully reversible following thermodynamic limits as a function of temperature is shown in Equation 8. The combustion of methane reaction provides energy for the endothermic reactions and is shown in Equation 9.

$$CH_4+H_2O=CO+3H_2 \Delta Hr\_0=206 \text{ KJ/mol} \qquad \text{(Equation 6)}$$

$$CH_4+CO_{2=2}CO+2H_2 \Delta r\_0=247 \text{ kJ/mol} \qquad \text{(Equation 7)}$$

$$CO + H_2O = CO_2 + H_2 \, \Delta Hr\_0 = -41 \text{ KJ/mol} \qquad \text{(Equation 8)}$$

$$CH_{4+2O2} = CO_{2+2} \, H_2O \, \Delta r\_0 = -803 \text{ kJ/mol} \qquad \text{(Equation 9)}$$

The high wall temperatures coupled with the high internal pressure creates tremendous thermomechanical stress on reactor tubes. Extremely expensive, high chromium and high nickel alloys are centrifugally cast to meet the design requirements of operation. However, even these tubes are taxed by the combined heat and pressure, which accelerate grain growth, precipitation, and grain-boundary void formation (due to microstructural coarsening). Tube operation conditions reside completely in a metallurgical creep regime that limits practical lifetimes for these expensive components. It would not be uncommon for a tube life to be on the order of 1 year in industrial service.

Tube failure is highly dependent on the operating temperature, through the Larson-Miller relationship (Ref API 530). Operation at tube wall temperatures significantly above design can result in a rapid increase in the number of tube failures, since tube life is very sensitive to the absolute operating temperature of the tube. An increase of 20° C. in the tube metal temperature can reduce the life of the tube by over 50% (Reference, Boumaza, World Academy of Science, Engineering and Technology International Journal of Chemical and Molecular Engineering, Vol: 4, No: 11, 2010).

A catalyst and catalyst support comprised of a high thermal conductivity support material, as described herein, improves the effective thermal conductivity of the catalyst particulate bed. As the catalyst bed effective thermal conductivity increases due to the disclosed catalyst system, the required wall temperature to achieve equivalent performance is reduced. More heat is drawn away from the walls of the tube and into the catalyst bed and the reactant gases. This effect, in turn, reduces the required heat generated by the reactor burner, resulting in significantly lower maximum operating temperatures while also reducing the fuel consumption. Lower fuel feed-rate improves the carbon efficiency for hydrogen production and in turn reduces production costs. By reducing the metal reactor wall operating temperature, the tube lifetime can be significantly increased, resulting in less tube maintenance, higher plant on-stream factors and extending the replacement interval during reactor operation. It is anticipated that the tube lifetime can be increased by 3 to 18 months with the use of the disclosed catalyst over the existing tube life of about 12 months when operated with a conventional reforming catalyst. The anticipated tube service life for a steam methane reforming plant when operated with the disclosed high effective thermal conductivity catalyst system will range from 15 to 30 months.

Further, the lower operating temperatures may offer other advantages in system design, allowing for thinner walled tubes, tubes of less-expensive alloys, or more conventional manufacturing processes, which would also contribute to capital cost reduction.

Catalysts Comprising SiC Supported Catalysts that can Reduce Metal Wall Temperature A catalyst and catalyst support comprised of a high thermal conductivity support (i.e., core), as described herein, offers improved heat transfer in a packed bed even when maintaining similar geometry and bed packing density to conventional materials. The effective bed thermal conductivity was determined experimentally using experimental procedures and equipment described in the example provided later herein titled "Reduced wall temperature and increased hydrogen production for Steam Methane Reforming using disclosed catalyst." As described in that example, the anticipated wall temperature when using the disclosed catalyst system can be 10 to 30° C. lower in comparison to the requisite wall temperature of a conventional methane reforming catalyst while providing an equivalent hydrogen production rate.

The relationship between the material thermal conductivity and bed conductivity is function of several non-trivial, nonlinear relationships:

$$K_{effective} = F(T, P, \beta_p, k_p, k_g, \varepsilon_{n,p}, \varepsilon_b, \phi_p, d_p, h_p, d_{tube}, U, Re, Pe)$$

where, T is the pellet and gas temperature, P is the gas pressure, $\rho_p$ is the density of the catalyst pellet, $\phi_p$ is the fractional pellet porosity, $k_p$ is the thermal conductivity of the catalyst pellet, $\varepsilon_{n,p}$ is the total normal emissivity of the catalyst pellet surface, $d_p$ is the diameter of pellet, hp is the height of the pellet, $d_{tube}$ is the diameter of the reactor bed, U is the superficial gas velocity (Darcy), $k_g$ is the thermal conductivity of the void gas, $\varepsilon_b$ mean bed void fraction, Re is the Reynolds number of the superficial gas with respect to the $d_p$, Pe is the Peclet number of the superficial gas with respect to the $d_p$.

Although very complex, these relationships can be broken down into core constituents:

$$K_{effective} = k_{p,o} + k_{convective} + k_{radiation}$$

where, $k_{p,o}$ is the quiescent pellet conductivity inclusive of the effects of porosity and grain boundary interactions. $k_{convective}$ is the result of convective effects, thermal dispersion, turbulent conduction, and other gas, pellet interactions within the porous bed. $k_{radiation}$ is directly linked to the emissivity of the pellet's surface and the temperature of the pellet. For the same pellet and reactor geometry, the effects from convection are largely the same. Although the radiation effects will deviate from changes in material emissivity, they can largely be ignored for comparative reasons. In addition, for the materials studied, the surface emissivities are within 10-15%. Therefore, conductivity gains are directly linked to quiescent pellet conductivity. This can clearly be seen in FIG. 11, as described in the text associated therewith further herein. Across a wide range of temperatures, the total effective radial conductivities are consistently separated by the same value which is the quiescent pellet conductivity, $k_{r,o}$.

Figure 9:
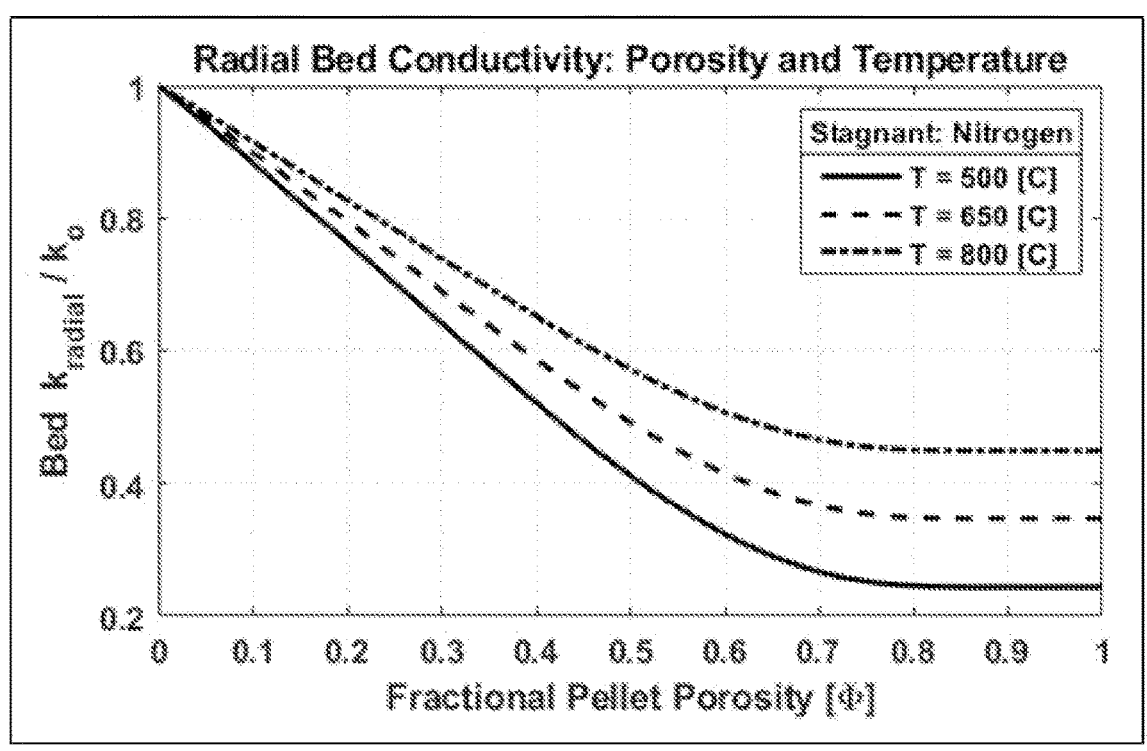
FIG. 9 provides a plot of pellet porosity and temperature effects on a normalized, quiescent packed bed radial conductivity.

Calculations of the quiescent radial bed conductivity for a representative geometry were performed using simplified models, numerical simulation, and experimental methods. The effects of pellet porosity and temperature for a quiescent packed bed are shown in FIG. 9. Degradation in thermal conductivity is driven by pellet porosity until porosity reaches 40%. At this porosity level, loss in internal pellet thermal conduction is overridden by the conduction of the gas and the emissivity of the pellet's surface. Surface effects of high porosity on emissivity were ignored for this model. Porosity fraction and dense fraction add to unity. Therefore, the material composition, porosity, grain boundaries, and surface emissivity are the key levers for controlling the bed conductivity.

Thus, by enhancing the thermal conductivity of the catalyst by substituting a high thermal conductivity material for the conventional catalyst (that is, replacing the porous Ni—Al$_2$O$_3$ composite material with a catalytic coating on a densified support comprising SiC), the heat transfer capability of the bed improves by a factor of approximately 4 in stagnant conditions, and with an additional increase from about 1.5 to 3.5 at the anticipated system flow of 2000 to 5000 GHSV (see FIG. 10, FIG. 11, and Table 8) representative for methane reforming reactions at high temperature due to the effects of thermal dispersion and pressure turbulent conduction.

TABLE 8

| | Stagnant Solid Conductivity | |
| Catalyst Type | 500° C. | 800° C. |
| --- | --- | --- |
| Commercial Catalyst | 0.98 W mK | 1.05 W/mK |
| Inventive Catalyst | 6.29 W/mK | 4.82 W/mK |

The increase in effective radial thermal conductivity more efficiently transfers heat away from the walls of the high temperature reactor tube to the catalyst bed and the reactant gases which more efficiently drives endothermic reactions. The heat required for completing the reaction does not change, but thermal losses are reduced as the peak temperature is reduced, allowing the energy input to be reduced in the form of the feed-rate for fuel and oxygen (or air).

The thermal gradient between the tube wall and the center of the catalyst particulate bed is reduced which allows for a reduced tube wall temperature to produce an equivalent amount of hydrogen. Alternatively, the tube wall can be maintained at the same temperature with a correspondingly similar tube lifetime as a conventional catalyst while concurrently increasing the throughput or productivity of hydrogen by a range of 5 to 40% as compared to a conventional catalyst. Tube lifetime can be significantly increased, thinner-walled tubes, tubes using less-expensive alloys or more conventional manufacturing processes may be used, all of which would achieve significant system capital cost reduction.

Examples Demonstrating Improvements in SMR Using Catalysts of the Present Disclosure Reduced Wall Temperature and Increased Hydrogen Production for Steam Methane Reforming Using Inventive Catalyst Steam methane reforming (SMR), or reforming, is an important industrial reaction for the production of hydrogen. Hydrogen is commonly used in refinery applications to upgrade crude to commodity fuels, metal working, hydrogenation of lipids, and many other diverse areas. Hydrogen is produced by adding steam to methane (the primary constituent of natural gas) and reacting at high temperature and pressure over a Nickel-based catalyst. The SMR reaction is strongly endothermic and requires the addition of a significant amount of energy (e.g. heat) to drive the reaction for hydrogen production:

$$CH_4+H_2O=CO+3H_2(\Delta H_{r\_298K}=206KJ/mol)$$

$$CO+H_2O=CO_2+H_2(\Delta H_{r\_298K}=-41\ KJ/mol)$$

Industrial methane reformers utilize burner technology to combust natural gas outside parallel arrays of tubes (100 cm is a typical diameter) filled with catalyst pellets or catalyst particles. Heat or energy released by the exothermic combustion reaction conducts through tube walls and then subsequently conducts into and through the packed or fixed bed reactor. This radial heat conduction through the catalyst particles drives the endothermic reforming reaction. Energy is also added and dispersed via gas convection: Gas heats when contacting the inner surface of the tube wall and then spreads the heat as the gas flows in a tortuous path around the catalyst particles.

Improving heat transfer through a fixed bed with the use of the inventive, higher effective thermal conductivity catalysts of the present disclosure will drive more energy into the reforming reaction and thus require a lower wall temperature for equivalent performance. Reducing the peak wall temperature on reforming tubes can act to increase the lifetime and reduce the failure rate which increases the on-stream factor of a hydrogen plant. Lao et al. 2016 reports that a 20° C. reduction in wall temperature doubles the expected tube lifetime. Replacement costs for the high nickel alloy SMR tubes and associated plant downtime add to the capital and operating costs for hydrogen production. Operating costs are also reduced with lower wall temperatures within the industrial burner, as less fuel is required.

At equal wall temperature, the use of the inventive higher effective thermal conductivity catalysts of the present disclosure increases overall reactor productivity as more hydrogen is produced per equal reactor volume as compared to a conventional commercial SMR catalyst.

As discussed previously herein, catalysts of the present disclosure rely upon a central core of high thermal conductivity SiC that has been passivated with an interior matrix of alumina or/and an outer coating of dense alumina, BSAS or other protective material, and coated with an effective layer of high surface area catalyst support with a catalytically active metal (e.g., Ni) for methane reforming.

Data were collected to measure the effective thermal conductivity of the inventive catalyst and compared to a traditional methane reforming catalyst. Specifically, data were collected at 500° C., and 800° C. under a range of GHSV ($hr^{-1}$). Under stagnant conditions, the effective thermal conductivity of the inventive catalyst is roughly five times the conventional SMR catalyst (4.8 W/m-K versus 1.0 W/m-K at 800° C.). As the GHSV increases (higher flow-rate), the total effective thermal conductivity of the catalyst further increases due to thermal dispersion and convective heat transfer.

Figure 10:
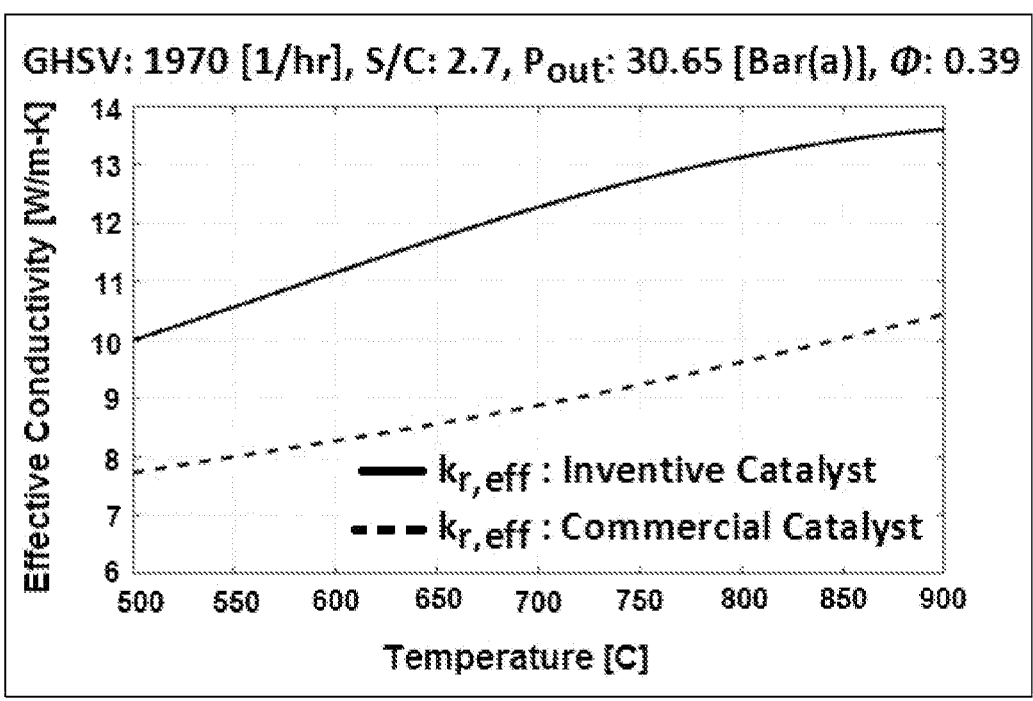
FIG. 10 provides a plot of effective packed bed thermal conductivity at 1970 $hr^{-1}$ (superficial velocity 0.52 m/s) for both commercial SMR catalyst and inventive catalyst.
Figure 11:
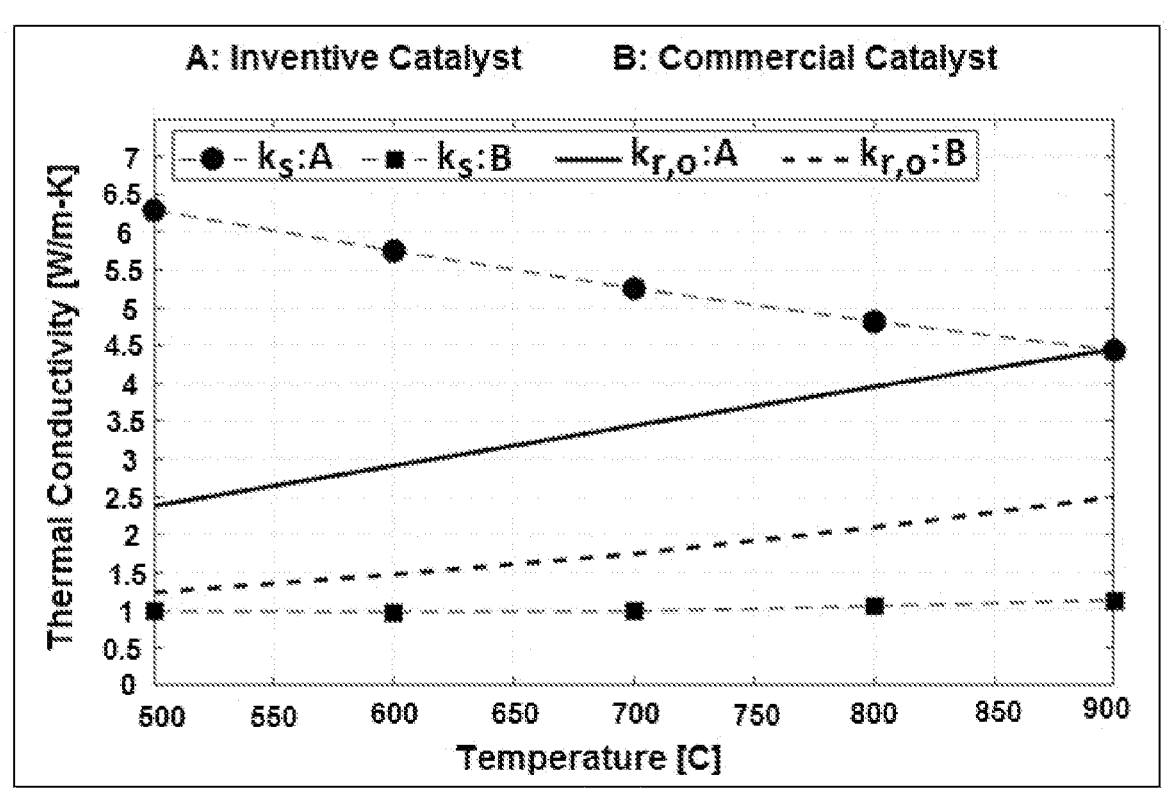
FIG. 11 presents comparison plots of experimental data for stagnant thermal conductivity ($k_r$) for a commercial SMR catalyst ($k_r$) and the inventive catalyst support ($k_s$).

FIG. 10 provides a comparison of experimental data of effective thermal conductivity for a commercial SMR catalyst with the inventive catalyst both with and without the active catalyst layer as a function of temperature. At a GHSV of about 1970 $hr^{-1}$ and a temperature of 800 C, the total effective thermal conductivity for the inventive catalyst is 13.1 W/m-K and the conventional reforming catalyst is 9.6 W/m-K, roughly a ~36% increase in effective thermal conductivity due to the inventive catalyst. These respective values of effective thermal conductivity were used to evaluate reactor performance for the inventive catalyst system relative to the conventional industrial reformer catalyst. The addition of the catalyst support coating layer and its active metals made little difference in the effective thermal conductivity of the overall inventive catalyst system. FIG. 11 presents a comparison of experimental data for effective thermal conductivity for a commercial SMR catalyst and the inventive catalyst under stagnant conditions at 500° C., and 800° C.

Modelling Results Support High Thermal Conductivity Properties of the Inventive Support Material It has been experimentally shown that the inventive catalyst support has superior pellet thermal conductivity compared to a commercial alumina-based steam methane reforming catalyst, as shown in FIG. 11 (inventive catalyst (circles) as compared the commercial catalyst (squares)). The inventive catalyst pellet thermal conductivity ($k_s$: for the inventive catalyst) varies from 6.3 W/m-K at a temperature of 500° C., and to 4.5 W/m-K at 900° C., while that of commercial SMR catalyst ($k_s$: Commercial) remains almost unchanged at 1.0 W/m-K in the temperature regime.

These experimentally determined values enable the determination of stagnant packed bed thermal properties using a modified Zehner, Bauer, Schlünder (ZBS) model as shown in FIG. 11, ($k_{r,o}$: HP, solid line for The inventive catalyst and $k_{r,o}$: Com, dashed line for commercial). The inventive catalyst maintains a consistent 1.25-2.00 W/m-K packed bed thermal conductivity advantage over commercial catalyst.

Using commercially available geometric and reactor run conditions for comparisons, the effective radial thermal conductivity properties of the inventive catalyst under flow conditions have also been enhanced over those of the commercial material. FIG. 10 provides plots of packed bed thermal conductivity for the commercial and inventive catalysts. Under gas flow conditions of 1970 $hr^{-1}$ (superficial velocity 0.52 m/s), steam to carbon (S/C) ratio of 2.7, inlet gas temperature of 580° C., pressure of 30.65 bar(a), and reactor of diameter 152.4 mm (outer, 127 mm inner) and a length of 10.0 meters, there is 35% more enhancement in the effective radial thermal conductivity using the inventive catalyst compared to commercial SMR catalyst.

Figure 12:
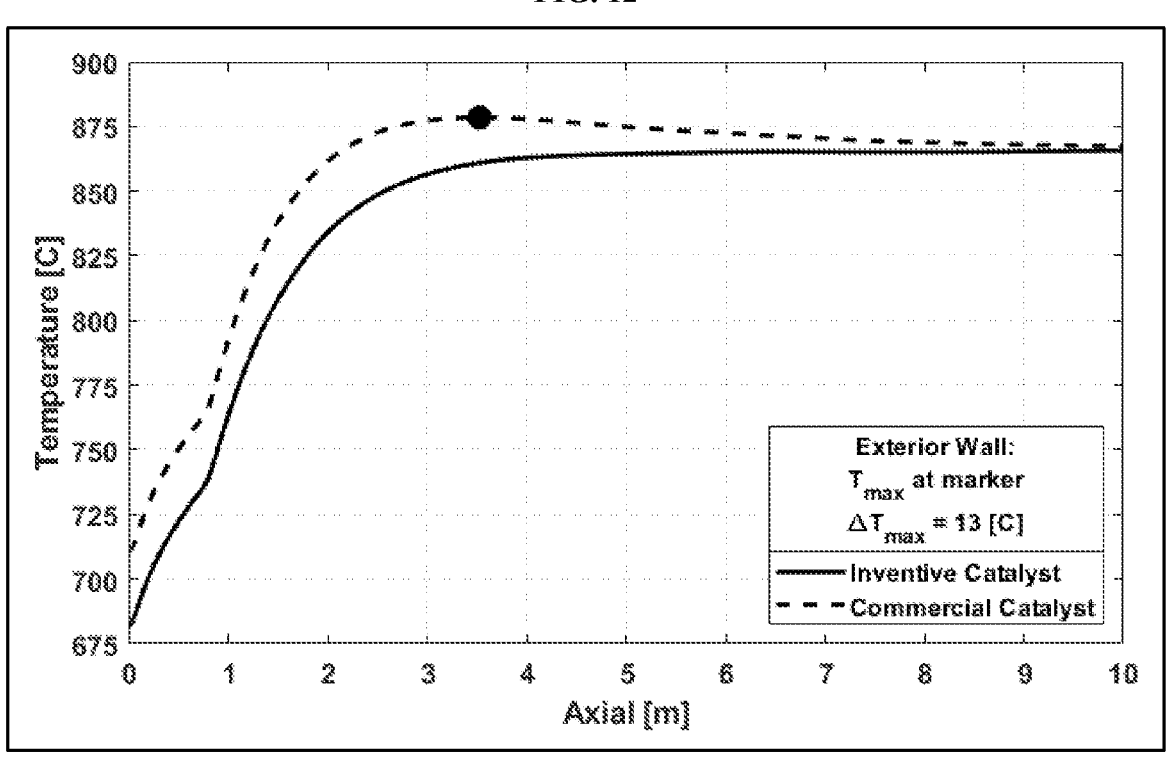
FIG. 12 provides a plot of reactor exterior wall temperature versus axial distance with an applied average heat flux of 33.17 $kW/m^2$, showing that enhanced thermal conductivity from the inventive catalyst reduces the maximum wall temperature by 13° C.
Figure 13:
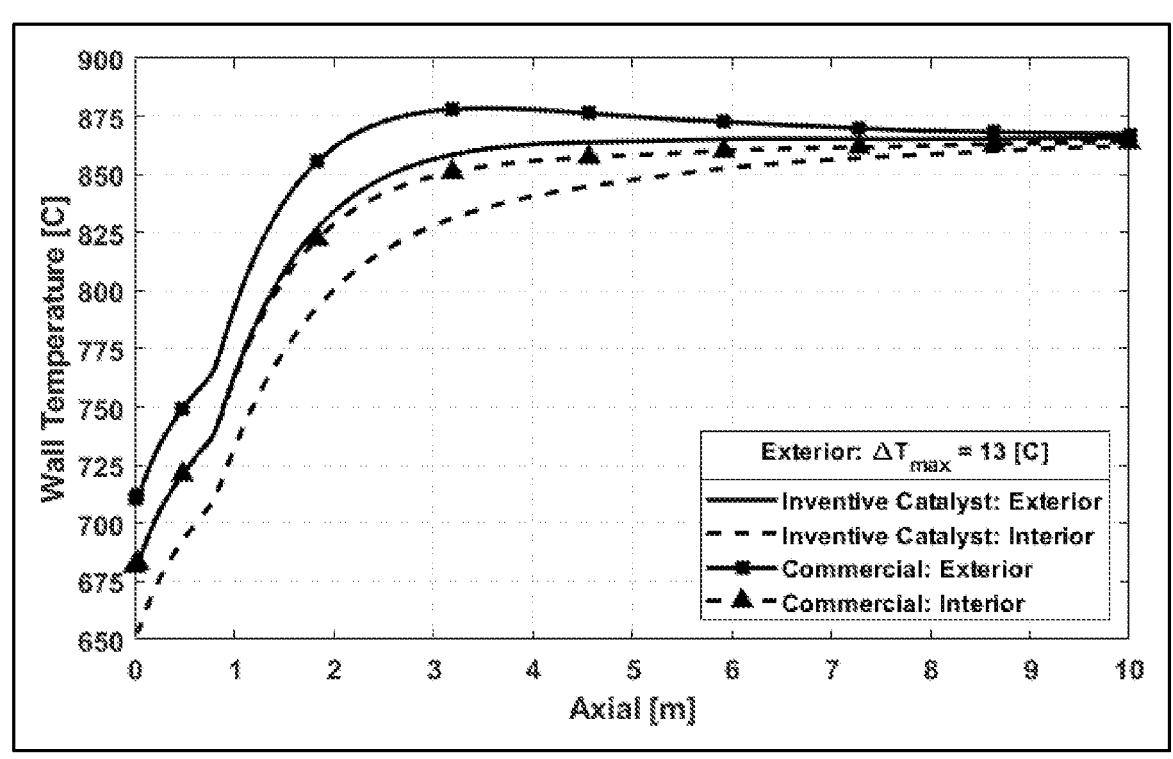
FIG. 13 compares wall and gas temperatures versus axial distance for the commercial and inventive catalyst packed beds at a space velocity of 1970 $hr^{-1}$.

The enhanced thermal conductivity of the inventive catalyst has an effect on other reactor properties, such as tube wall temperature. FIG. 12 and FIG. 13 provide plots of reactor exterior wall temperature and interior reactor temperature versus axial distance with an applied average heat flux of 33.17 $kW/m^2$. For a fixed reactor heat flux, the inventive catalyst's enhancement of bed conductivity leads to:

1. Increased tube wall temperatures by 13° C.
2. Decreased equilibrium distance i.e. 4.0 meters (using the inventive catalyst) compared to 9.0 m for commercial SMR catalyst.

Literature suggests that a 20° C. reduction in tube wall temperature doubles the reactor tubes' lifetime. The inventive catalyst provides a 13° C. tube wall temperature advantage over commercial SMR catalyst, which will increase tube lifetime by 65% compared to commercial SMR catalyst.

Figure 14:
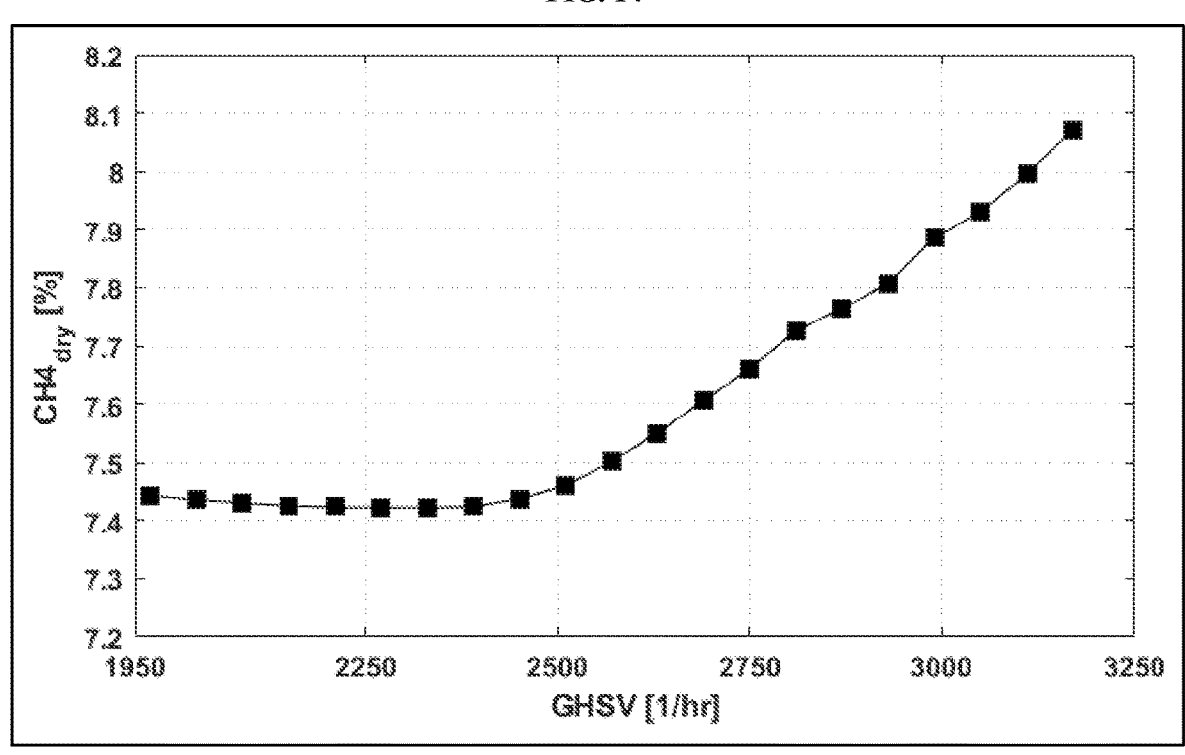
FIG. 14 shows the impact of increasing GHSV on dry methane slip for inventive catalyst showing that the use of the inventive catalyst as support allows for 36% higher GHSV for equivalent dry slip.

Fitting a tube wall temperature profile obtained from a commercial run to a The inventive catalyst fixed bed results in a lower methane slip of 0.6 vol. % at 1970 $hr^{-1}$. The commercial catalyst's tube wall thermal profile that leads to a 8.0 vol. % methane slip results in a 7.4 vol. % methane slip when the inventive catalyst is used instead (FIG. 14) confirming the superior properties introduced by the inventive catalyst.

Figure 15:
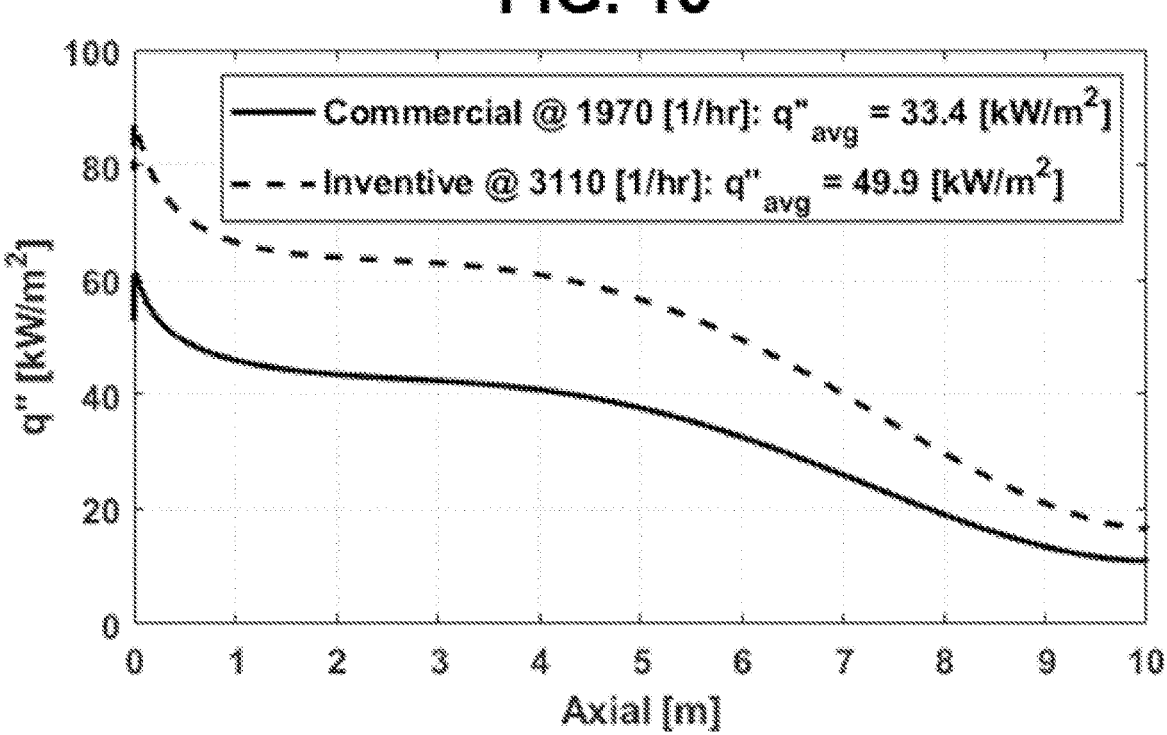
FIG. 15 provides a plot of the heat flux profiles for equivalent dry methane slip. For the same wall temperature and slip, the inventive material absorbs 33% more heat.

Data presented in FIG. 15 show that with a constant tube wall temperature profile, increasing the reactant gas-hourly-space-velocity (GHSV), the inventive catalyst leads to an increase in throughput. The use of the inventive catalyst leads to an 8.0 vol. % methane slip only after the GHSV is increase 3110 $hr^{-1}$. This increase in GHSV represents a 36% increase over commercial catalyst. For the same wall temperature and slip, the inventive catalyst absorbs 33% more heat.

Table 9 summarizes the added enhancements offered by using the inventive catalyst compared to a commercial SMR technology.

TABLE 9

| Fixed Average Heat Flux Profile | | | |
|---|---|---|---|
| Parameter | $CH_4$ Slip [%, dry] | q", avg [$kW/m^2$] | Twall [° C.] |
| Commercial | 8.0 | 33.17 | 878 |
| Inventive Catalyst | 8.0 | 33.17 | 865 |
| Inventive Catalyst Advantage | 0.0 | 0 | 13 |
| Fixed Wall Temperature Profile | | | |
| Parameter | $CH_4$ Slip [%, dry] | q", avg [$kW/m^2$] | ATE [° C.] |
| Commercial | 8.0 | 33.4 | 13 |
| Inventive Catalyst | 7.4 | 34.3 | 10 |
| Inventive Catalyst Advantage | 0.6 | 0.9 | 3 |
| No Constraint with Fixed Wall Temperature Profile | | | |
| Parameter | $CH_4$ Slip [%, dry] | q", avg [$kW/m^2$] | GHSV [$hr^{-1}$] |
| Commercial | 8.0 | 33.4 | 1970 |
| Inventive Catalyst | 8.0 | 49.9 | 3110 |
| Inventive Catalyst Advantage | 0.0 | 16.5 | 1140 |

Core-Shell SMR Catalyst Defined by Catalyst Utilization

The predominant catalyst used in the steam reforming of methane is Ni metal deposited on alumina ($Ni/Al_2O_3$). Current industrial catalysts are prepared by impregnation of Ni ions in solution onto porous alumina or by a related process. The typical industrial catalyst is a cylindrical pellet of dimensions roughly of 0.5× 0.5 inches (L×OD) with up to four interior holes (or more). The composition of Ni in this catalyst is anywhere between about 10% and 20 wt % (average is about 12 wt %). The catalyst also contains other elements in smaller quantities as compared to Ni. This is a single pellet catalyst having no outer or inner shell, whereas Ni is dispersed throughout the entire pellet structure. A typical weight of this cylindrical pellet is 2.9 grams but it can vary based on the size of the pellet used. Using the average value of about 12% and the above weight of a cylinder, the amount of Ni is about 0.35 grams on average per pellet. This full weight of Ni per pellet is not active however due to mass and heat transfer limitations.

Core-shell materials are composed of core materials onto which another material is deposited to form the outer shell. These materials are normally designed to achieve specific purposes. There are various aims of designing core-shell materials. One reason to form a shell is to combine two materials and therefore create two different properties within the same material, another reason is to utilize the properties of the material brought about by the specific design and geometry, and lastly to generate an entirely new set of properties that the individual materials do not have. For instance, in $Fe_3O_4/SiO_2$ core-shell materials, the properties of the core such as magnetic susceptibility could be the property in systems that desire magnetic separation while utilizing the unique luminescent optical properties of the $SiO_2$. The properties of the core and the shell can be designed such that the best synergistic effects are realized. Core-shell materials have opened up research opportunities in almost all areas of science, including nanotechnology, catalysis, optics, electronics, medicine, catalysis, materials, biotechnology, energy storage, among others.

The majority of core-shell materials have been synthesized at the nano- or micro-scale levels. The synthetic processes for making these structures involve either chemical or physical methods. Chemicals methods involve chemical syntheses or cation exchange processes. Chemical syntheses involve the synthesis of the core materials first followed by the growth of the shell on top of the core. Cation exchange relies on synthesizing the core followed by generating the shell from the core itself through a cation exchange of the lattice elements with ions in solution. Physical methods are few and a majority of reported ones involve deposition of gaseous components onto a substrate. For reforming applications, $Ni/SiO_2$, $Ni/Al_2O_3$, $Ni/CeO_2$ and $Ni/TiO_2$ catalysts have been designed and their activity studied in the reforming of acetic acid. Of the catalysts studied, $Ni/Al_2O_3$, showed the best activity which was attributed to the small and narrow Ni nanoparticle sizes at the core. Core-shell $Ni/SiO_2$ catalysts have also been used in reforming biogas.

The inventive catalysts of the present disclosure are core-shell structures prepared by the physical deposition of an oxide porous catalyst phase onto a composite solid core. In some embodiments, the core comprises SiC and a protective matrix of alumina. The catalytically active shell can be deposited, for example, via spray deposition of chosen metals or metal oxides from an aqueous or organic medium. In alternate embodiments, catalyst shells or coatings can be deposited by other means as known in the art besides spray coating or deposition.

In a typical process, pressed pellets of the present disclosure are coated with a slurry of a catalyst support powder, with or without the active catalyst material in the slurry. If the slurry does not include the active catalyst material, the catalyst support layer is later impregnated with the active catalyst material after the coating is formed.

The coating slurry is prepared by adding the powder material into an organic medium such as, but not limited to, ethyl cellulose, and $\alpha$-terpineol. Powder materials for supporting the active catalyst on the pellet core may be chosen from the following non-exhaustive list: aluminum-silicon, zirconia-ceria doped alumina, alumina, zirconia doped ceria, alumina-silica mixture, gamma alumina, alpha alumina, magnesium-promoted alumina, calcium-promoted alumina, sodium-promoted zirconium-cerium oxide, cerium oxide, titania-promoted silica, among others. The above oxides may be applied with or without one or more of the following metals (or other catalytically active material): nickel, platinum, rhodium, ruthenium, cobalt, rhenium, iridium, among others. Elements known to play promoting roles or suppression of coke formation may optionally be added.

At the laboratory scale, as-pressed (green) catalyst pellets are weighed and placed on a stainless-steel strainer. The coating slurry is transferred into a specially made glass receptacle which is connected to a slurry spraying system for manual deposition. A coating of porous outer layer is manually applied to the pellets by manually spraying them with the above-described slurry. The pellets are constantly agitated on the strainer for uniform coating. Coated pellets are then dried at temperatures of 70° C. to 120° C. for time periods between 30 and 60 minutes. After drying, a final weight is taken to determine how much porous material in the form of a coating was deposited on the pellets. Uncalcined coated pellets are calcined by raising the temperature slowly to target temperature and held there for at least about one hour. An alternative method of applying the outer coat is through dip coating. An active catalyst layer calcination temperature may range from about 300° C. to about 800° C.

As a last step for core-shell inventive catalyst materials that only contained support material shell without active catalyst is to infiltrate this layer with active catalyst metal ions. Metal ions of interest are dissolved in a medium, preferably water but can also be organic. Pellets are immersed into the medium such that the metal ions impregnate the porous layer. After time period sufficient for the desired loading, the metal ion-infiltrated support materials are drained from the solution and dried between 70° C., and 120° C. (e.g., for between 30 and 60 minutes, or sometimes longer). Lastly, the coated and impregnated pellets are calcined in air.

For the intended application in steam reforming, this approach of coating a high thermal conductivity core with a porous outer layer (also referred to as a shell or eggshell) is unique compared to current practice of methane steam reforming as discussed earlier. In some embodiments, the shell has a controllable thickness which ranges from about 10 microns to about 200 microns, or between about 50 and about 100 microns. The amount of material needed to achieve a thickness of 50 microns is about 0.05 grams for each gram of catalyst. By replacing conventional steam reforming catalysts with the disclosed catalyst, and assuming each pellet of the disclosed catalyst weighs the same as a typical industrial SMR catalyst (e.g., 2.9 grams), a 50 micron shell on this pellet will utilize about 0.145 grams of material to form an outer shell. Depositing an already formed catalyst with about 12% Ni active metal or impregnating the shell with a target Ni weight of about 12% will add about 0.02 grams of Ni per pellet of catalyst. This represents an absolute decrease in Ni metal weight of about 94% per pellet, or a range of about 80 to 95% reduction. If there were no mass or heat transfer limitations for the reaction, then a reduction of 94% in the absolute amount of catalyst metal would reduce the overall reaction rate or productivity. However, since the traditional methane reforming pellet is strongly limited by mass and heat transfer, a very small fraction of the Ni (on the order of 10% or less) effectively contributes to the overall rate of reaction in a conventional reforming catalyst pellet.

The porosity of the outer layer is also of importance and has been studied as a design principle. Addition of porosity retaining elements in the slurry leads to a layer with improved porosity. Increased porosity is important in the application of the inventive material in catalysis and also acts to increase reactant diffusion within the coating layer thereby further enhancing the effective use of the active catalyst contained therein. Additives that lead to improved outer layer porosity may include: lanthanum carbonate, magnesium carbonate, graphitic carbon, among others. FIG. 5 depicts cross-sectional SEM images of a catalyst according to the present disclosure, including an outer layer deposited onto the core. The left image shows an unaltered outer layer while the right image shows the effect of altering the composition to enhance outer layer porosity.

Although the amount of active Nickel on an absolute basis is reduced on the inventive catalyst pellets of the present disclosure, the associated effectiveness factor for the eggshell coating of the present disclosure is substantially higher than the effectiveness factor for a conventional methane reforming pellet. With a much higher effectiveness factor, the net activity of the inventive catalyst will be comparable to a conventional catalyst even though the absolute mass of catalytically active material is reduced. In one embodiment, the volumetric activity of a fixed-bed reactor comprised of the inventive catalyst will be within 80% of the activity of a conventional methane reforming catalyst. In an alternate embodiment, the activity of the inventive catalyst on a reactor volume basis will be comparable to a conventional methane reforming catalyst. In a preferred embodiment, the inventive catalyst will have a volumetric activity that ranges from about 1.0 to 1.3 times the volumetric activity of the conventional methane reforming catalyst.

Reactions occur inside of a catalyst pellet and are limited by both mass transfer and heat transfer. As the endothermic reaction proceeds inside a pellet it becomes cold and the net catalyst activity for this thermodynamically limited reaction is reduced. It is preferential to have a catalyst in an eggshell layer for the methane steam reforming reaction to enable a high effective use of the active metal catalyst while also effectively driving heat into the catalytic shell coating rather than needing to transfer heat deep within a cold pellet.

A classical effectiveness factor analysis is conducted to assess the effectiveness of catalysts according to the present disclosure, wherein the relationship between the effectiveness factor and the Thiele Modulus is known in the art. It has been reported that the effectiveness factor for a conventional methane steam reforming reaction is between about 1 and 10%. That is to say, more than 90% of the active catalyst metal is ineffective for the desired methane steam reforming reaction in a conventional methane reforming pellet.

The effectiveness factor (ratio of actual or apparent reaction rate to the intrinsic reaction rate) for a conventional SMR catalyst is low due to mass diffusion limitations within the conventional catalyst pellet and poor internal heat transfer. The internal volume of a catalyst pellet cools as the reaction proceeds, which further slows down the apparent reaction rate beyond the mass transfer limitations. Adris reports a commercial effectiveness factor for methane consumption of ~0.008. Lao also reports a commercial steam methane reformer effectiveness factor of 0.1, wherein the effectiveness factor has been increased due to the use of internal pellet holes and other shape modifications to reduce internal pellet mass transfer resistance.

The Thiele Modulus ($\phi$) is shown in Equation 10 below. The effectiveness factor ($\varepsilon$) is shown in Equation 11 below.

$$\phi = R \sqrt{\frac{k1}{D\_eff}} \qquad \text{(Equation 10)}$$

$$\varepsilon = \frac{3}{\phi^2}(\phi \coth(\phi) - 1) \qquad \text{(Equation 11)}$$

wherein R is the radius for a pellet or the diffusion distance for mass transfer within the catalyst coating. The reaction rate constant is k1. The effective diffusivity ($D_{eff}$) is gas diffusion within the porous catalyst divided by a tortuosity factor, which is typically around 3 for most catalyst systems. The analytical equation for effectiveness factor as shown in Equation 11 is for a first order reaction, but this equation has been readily shown in the literature to be robust and work reasonably well for zero through second order rate equations.

For the methane reforming reaction operated at about 20 bara and about 850° C. the molecular diffusivity can be calculated using the Chapman-Enskog theory of mass diffusion and is roughly 0.143 cm$^2$/sec for water (steam) and 0.495 cm$^2$/sec for methane. Molecular diffusion breaks down when the molecular mean free path is within a factor of 3 of the pore diameter through which diffusion occurs. The mean free path for steam and methane respectively under reaction conditions is 0.03 and 0.01 microns respectively. For catalysts with pore diameters less than about 0.1 microns, Knudsen rather than molecular diffusion should be considered as the dominant mode of mass transfer within catalyst pores. The Knudsen diffusivity for both reactants is about 0.05 cm$^2$/sec or roughly 2 to 3 times slower than molecular diffusion.

As shown in the SEM pictures of catalysts according to the present disclosure and its method of making, the voids (i.e., pores) within the catalyst coating layer are greater than about 1 micron and diffusion readily occurs by a molecular mechanism therein. To consider the effectiveness factor for the inventive catalyst, a diffusivity for the slowest reactant (steam) will be used with a molecular diffusion mode, for an estimate of 0.143 cm$^2$/sec.

The conventional methane reforming catalyst pellet has been compressed to form the desired shape and diffusion of reactants is considered to be in the Knudsen regime. The gas phase reactant diffusivity through a conventional methane reforming pellet is about 0.05 cm$^2$/sec.

When adding the impact of tortuosity, e.g. the circuitous route for mass transfer and not a straight diffusion path, through the catalyst layer or pellet for reactants to reach active catalyst sites disposed therein, then the actual or effective Diffusivity for the inventive catalyst is estimated at 0.0477 cm$^2$/sec and for the commercial SMR catalyst the effective Diffusivity is estimated as 0.0167 cm$^2$/sec.

By using the selected catalyst coating for the inventive catalyst of the present disclosure with larger pores as designed, the diffusion of reactants through the catalyst thickness occurs primarily with the more advantageous molecular rather than the slower Knudsen diffusion as found in a traditional methane reforming pellet.

The value of k1 or the reaction rate constant (in units of sec$^{-1}$) has been estimated using the Hoang 2005 reaction kinetics as about 34.3 sec$^{-1}$. The effective distance or R in the Thiele Modulus equation is evaluated for the catalyst of the present disclosure and compared to the Conventional SMR Catalyst. Table 10 calculates the effectiveness factor for the catalyst of the present disclosure with a coating thickness up to about 200 microns. In all cases, the effectiveness factor is very high showing that the actual reaction rate is very close to the intrinsic reaction rate for methane steam reforming. The effectiveness factor is about 0.98 for a 200-micron coating and about 0.999 for a 50-micron coating thickness. Thus, effectiveness factor for the inventive catalyst is greater than about 0.90 for the methane steam reforming reaction, and in a preferred embodiment greater than about 0.95, and in a most preferred embodiment from about 0.99 to 0.9999.

TABLE 10

| Catalyst Thickness (microns) | 50 | 100 | 200 |
|---|---|---|---|
| Effective Diffusivity (m$^2$/sec) | $4.67 \times 10^{-6}$ | $4.67 \times 10^{-6}$ | $4.67 \times 10^{-6}$ |
| Rate Constant, k1 (sec$^{-1}$) | 34.3 | 34.3 | 34.3 |
| Thiele Modulus (unitless) | 0.14 | 0.27 | 0.54 |
| Effectiveness factor | 0.999 | 0.995 | 0.981 |

Using the same calculation methodology and conditions for a conventional methane steam reformer, the calculated effectiveness factor is shown in Table 11 over a practical range of catalyst pellet sizes. The conventional catalyst effectiveness factor is very low, as suggested in the literature. For a ½ inch catalyst pellet (without internal holes), the effectiveness factor is about 0.051. For an effective diffusion distance of about ¼ inch, the effectiveness factor for the conventional methane reforming catalyst is about 0.1. Even with very small catalyst pellets such as those with a diameter of about 1 mm, then the effectiveness factor rises to only about 0.5. These very small pellets of about 1 mm in diameter would have a very high pressure drop in a full-length reactor and would not be commercially considered.

TABLE 11

| Catalyst Thickness (microns) | 1000 | 6350 | 12800 | 30000 |
|---|---|---|---|---|
| Catalyst thickness (m) | $1.00 \times 10^{-3}$ | $6.35 \times 10^{-3}$ | $1.28 \times 10^{-2}$ | $3.00 \times 10^{-2}$ |
| Catalyst dimesnion (in) | 0.04 | 0.250 | 0.50 | 1.18 |
| Effective Diffusivity (m²/sec) | $1.67 \times 10^{-6}$ | $1.67 \times 10^{-6}$ | $1.67 \times 10^{-6}$ | $1.67 \times 10^{-6}$ |
| Rate Constant, k1 (sec⁻¹) | $3.43 \times 10^{-1}$ | $3.43 \times 10^{-1}$ | $3.43 \times 10^{-1}$ | $3.43 \times 10^{-1}$ |
| Thiele Modulus (unitless) | 4.53 | 28.79 | 58.04 | 136.04 |
| Effectiveness factor | 0.516 | 0.101 | 0.051 | 0.022 |

The catalysts described herein thus provide for a substantially higher effectiveness factor than a conventional methane steam reforming catalyst. The inventive catalyst will have an effectiveness factor greater than about 0.9 while the commercial methane reforming catalyst operates with an effectiveness factor about 0.1 and less than about 0.2. In other words, the inventive catalyst has an effectiveness factor between 9 and 10 times greater than the effectiveness factor for a conventional methane steam reforming pellet. The amount of active nickel (or other metal) sites can be reduced per volume by a similar factor of 9 to 10 in the inventive catalyst while maintaining the same or similar volumetric reactor activity as a conventional methane steam reforming catalyst.

Core-Shell SMR Catalyst Defined by Performance

Industrial production of hydrogen is realized through steam methane reforming (SMR), which is the main component of natural gas. In steam reforming, methane reacts with steam at elevated temperatures in the presence of a catalyst to generate hydrogen and carbon monoxide. The generated CO further reacts with steam to generate more hydrogen and carbon dioxide:

$$CH_4 + H_2O = CO + 3H_2 (\Delta H_{r\_298K} = +206 \text{ KJ/mol}) \quad (1)$$

$$CO + H_2O = CO_2 + H_2 (\Delta H_{r\_298K} = -41 \text{ KJ/mol}) \quad (2)$$

providing an overall reaction of:

$$CH_4 + 2H_2O = CO_2 + 4H_2, (\Delta H_{r\_298K} = +165 \text{KJ/mol}) \quad (3)$$

This reaction is catalyzed by specific catalysts. In the absence of catalysts, the reaction would require extremely high temperatures. Steam reforming of methane is catalyzed by metals such as Nickel (Ni), Cobalt (Co), Ruthenium (Ru), Rhodium (Rh), Palladium (Pd), Iridium (Ir) and Platinum (Pt). Ni is the most widely used catalyst for SMR.

Embodiments of the catalyst cores of the present disclosure comprise a high thermal conductivity composite of $SiC/Al_2O_3$. These materials are mixed, pressed into pellets, optionally coated in a subsequent step, and then fired in an oxygen environment (e.g., ambient air). The resultant material which has been confirmed to have high thermal properties is then either impregnated with SMR-active metal ions or coated with an active metal-containing slurry and fired. The metals impregnated or slurry of catalysts coated are drawn from the above SMR-active metals. These metals are supported on different supports, drawn from the following non-exclusive list: aluminum-silicon, zirconia-ceria doped alumina, alumina, zirconia doped ceria, alumina-silica mixture, gamma alumina, alpha alumina, magnesium-promoted alumina, calcium-promoted alumina, sodium-promoted zirconium-cerium oxide, cerium oxide, titania-promoted silica, among others.

The coated catalyst operates with a high effectiveness factor, e.g. greater than 0.9, while a conventional reforming pellet operates with a low effectiveness factor, typically less than about 0.2, and in some embodiments from about 0.05 to about 0.1. The net activity for the coated catalyst with a net reduction in mass of Nickel will remain similar to the conventional pellet with Nickel dispersed throughout due to the much higher effectiveness factor of the inventive support material.

Figure 16:
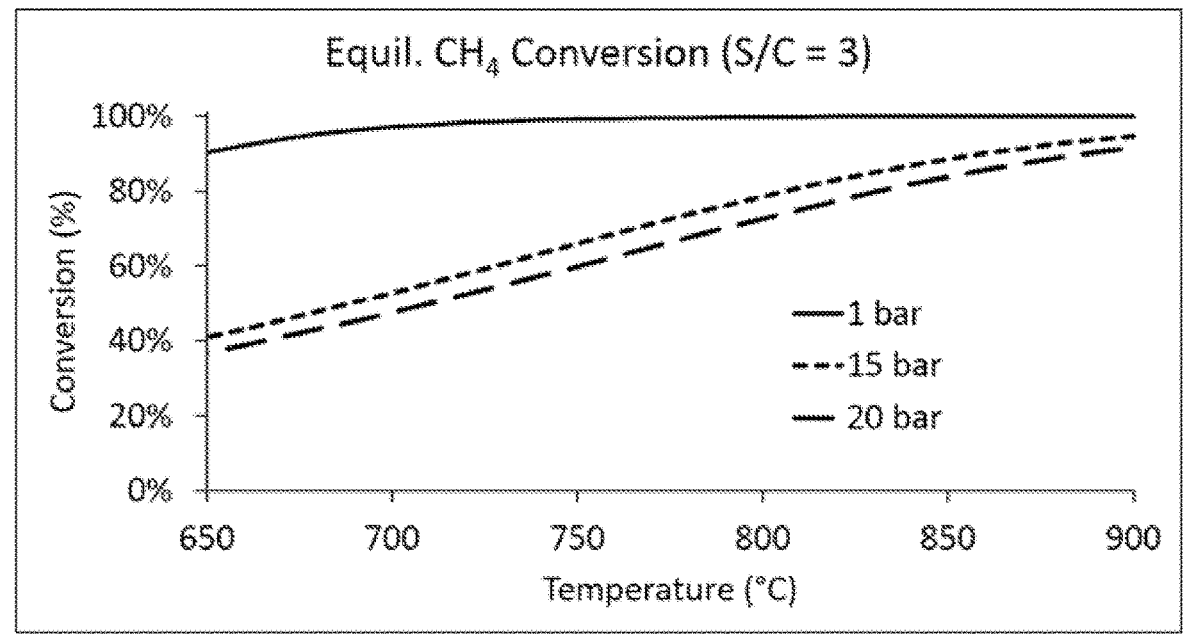
FIG. 16 provides a graphical representation of equilibrium conversion of methane in the temperature range of 650 to 900° C., pressure of 1 to 20 bara, and steam to carbon (S/C) ratio of 3.

SMR is an endothermic equilibrium-controlled reaction that is volume expanding with an increase in moles as the reaction proceeds. This means that for the reaction to progress to levels of meaningful hydrogen production, temperature must be increased, especially as the pressure is increased. FIG. 16 shows that as temperature increases, conversion increases with a monotonically increasing function. Conversion drops with increasing pressure. Industrial reactors operate at temperatures between 850° C., and 950° C., and pressure between 20 and 40 bara. High-pressure conditions are necessary to meet the downstream processing conditions, e.g. to avoid costly and risky hydrogen compression, while also achieving high conversion to overcome equilibrium constraints. To keep methane conversion above 80%, the average catalyst bed temperature must be kept high (above about 850° C., at about 20 bar). Also, due to the equilibrium nature of SMR, comparison of catalyst performance for activity is meaningfully done at 1 bara and lower temperature where reaction kinetics play a bigger role than at high pressure and temperature.

The performance of the catalyst on the inventive catalyst support material or the present disclosure, with SMR catalysts deposited as an exterior coating (i.e., shell) around a SiC core has been experimentally evaluated with reaction tests at both laboratory and pilot plant scales. In the laboratory, the reactions were performed by loading a specific volume of pellets in high temperature ½-inch Inconel Ni-alloy tubes. Heat was supplied in the laboratory using an electrically heated furnace. Reaction conditions for lab-scale testing are shown in Table 12. Recorded temperature is the tube skin temperature outside the catalyst bed. Prior to entering the reactor, methane meets vaporized steam in a vaporization chamber maintained at 500° C.

TABLE 12

| Parameter | Limits | |
|---|---|---|
| | Lower | Upper |
| Temperature (° C.) | 650 | 850 |
| Pressure (bar) | 1 | 1 |
| Space Velocity (hr⁻¹) | 3000 | 9000 |
| Steam/Carbon Ratio | 3 | 3 |

Catalyst-coated pellets are weighed and loaded in a one-inch nickel-Inconel tube reactor supported by inert alumina media on both ends. The reactant inlet side contains substantially more inert materials than the outlet side. The reactor is loaded into an electrically-heated furnace. A flow of reducing gas (hydrogen or a mixture of hydrogen and nitrogen) is introduced into the reactor while heating at 3 C/min to 650 C, where reduction occurs for a minimum period of 2 h. The reaction is started by flowing a stream of pure hydrogen at 100 sccm, followed by water. The water passes through a heated zone to vaporize it into steam. After a further 15 min, methane is introduced, and after a further 15 min, hydrogen is removed. Steam to methane content is controlled to 3, and the reaction progress monitored using gas chromatography (GC) through a temperature range of 650 C to 850 C. At 850 C, the lifetime performance of the catalyst is monitored with period sampling using GC. A 100% conversion of methane is realized when no methane signal can be detected by the GC while even a 1% drop, attributable to loss of activity is realized when methane signal is recorded at 1% by the calibrated GC.

The tested catalysts have been prepared by coating SMR catalysts onto the inventive, high thermal conductivity cores of the present disclosure. Similarly, porous support materials have been coated onto the inventive catalyst core and SMR-active metals thereafter impregnated onto the porous support layer. For example, Catalyst A was prepared by spraying onto 10 grams of the disclosed catalyst support 0.21 grams of a catalyst containing 1.5% precious group metals supported on ceria-zirconia support. In the present study 10.2 grams of Catalyst A (or approximately 7.5 cm$^3$) were loaded into the reactor. Catalyst B was prepared by infiltrating a 0.8 grams outer layer that was deposited onto 20 grams of the disclosed cores, with Ni$^{2+}$ $^{ions\ that\ translate\ into}$ 0.46 grams Ni metal, corresponding to 36.5% Ni in the outer layer. Additionally, Mg$^{2+}$ ions (translating to 0.05 grams of MgO) were added to this outer layer. In this example, 17.3 grams of Catalyst B (or approximately 15 cm$^3$) was loaded into the reactor. These catalysts have a coating thickness anywhere between 25 to 100 μm.

Figure 17:
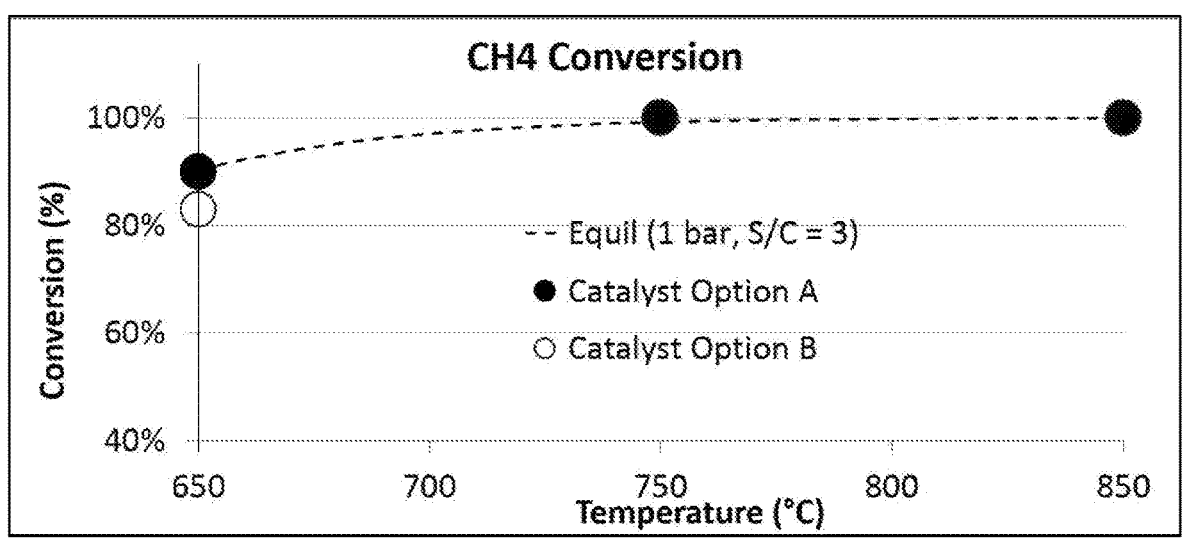
FIG. 17 shows the catalytic performance of the inventive catalyst support in steam methane reforming conditions, with option A having the outer porous layer impregnated with SMR-active metal ions subsequently calcined, and with Option B having a layer of active catalyst directly deposited on the outside the inventive catalyst support material.

FIG. 17 shows graphical results of the low-pressure testing of the above catalysts. These catalysts all show equilibrium conversion at the temperatures and conditions tested, e.g. equilibrium performance was achieved from a space velocity of 3000 to 9000 hr$^{-1}$. These catalysts have been tested at different space velocities as seen in FIG. 18.

Figure 19:
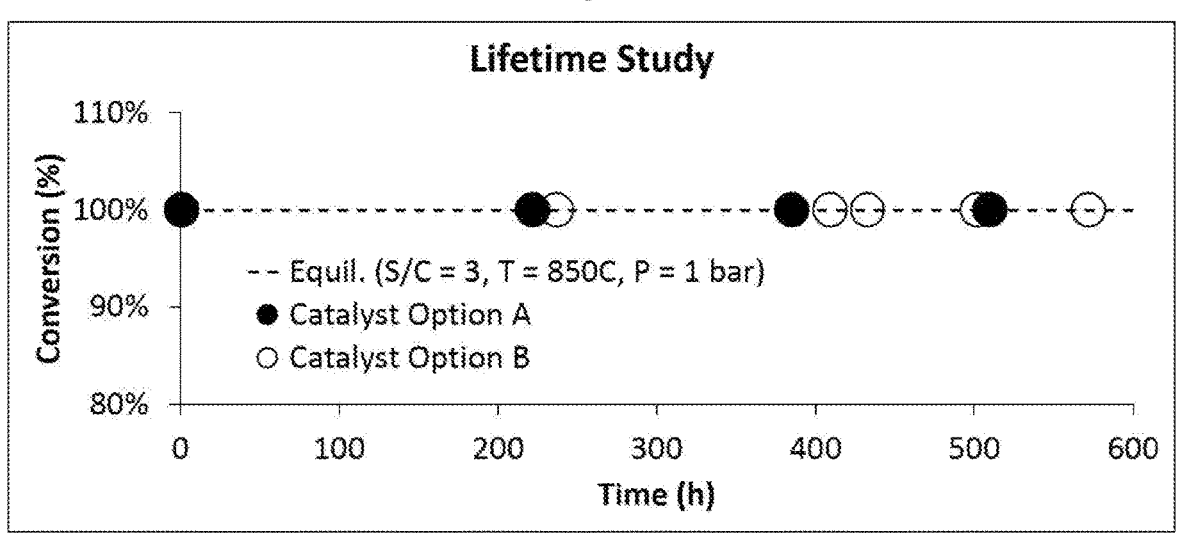
FIG. 19 shows performance stability during steam methane reforming conditions, with Option A having the outer porous layer impregnated with SMR-active metal ions subsequently calcined, and with Option B having a layer of active catalyst directly deposited on the outside the inventive catalyst support material.

Industrially, commercial hydrogen production via SMR is realized at a space velocity from about 2,000 to 3,000 hr$^{-1}$. Lifetime activity of some of these materials has been assessed for a time period of 600 hours with no evidence of degradation, carbon formation, pressure rise, or metal dusting. The catalyst lifetime is seen in FIG. 19. These results reveal that the catalyst supported on the inventive catalyst support material can support outer coats of reforming catalysts deposited as a catalyst slurry or impregnated onto a previously-deposited porous coating and can retain high activity for at least 600 hours.

Figure 18:
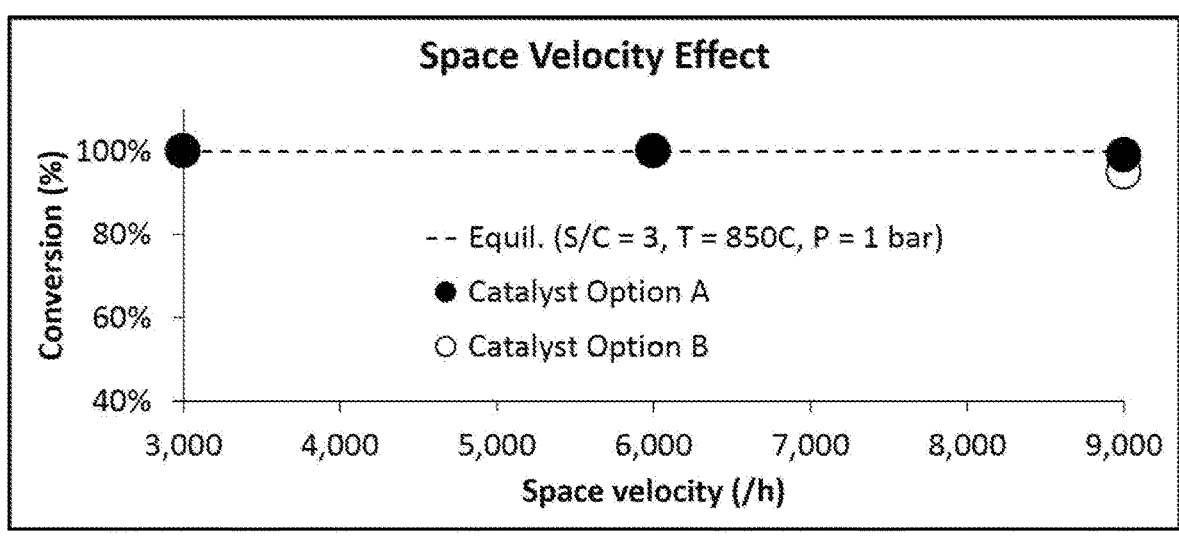
FIG. 18 shows the effect of space velocity study on inventive catalyst support material under steam methane reforming conditions, with option A having the outer porous layer impregnated with SMR-active metal ions subsequently calcined, and with Option B having a layer of active catalyst directly deposited on the outside the inventive catalyst support material.

As seen in FIG. 18, Catalyst A (1.5% PGM coated catalyst) shows a 100% approach to equilibrium at 650° C., 1 bara, 3:1 Steam: Carbon, and a GHSV of 3,000 hr$^{-1}$ and a WHSV of 1.5 hr$^{-1}$. Catalyst B (1.5% PGM infiltrated catalyst) shows a 92% approach to equilibrium at a GHSV of 3,000 hr$^{-1}$ and a WHSV of 0.1 hr$^{-1}$.

Catalyst A (1.5% PGM catalyst) shows greater than a 95% approach to equilibrium at a GHSV of 9000 hr$^{-1}$ and a WHSV of 1,787,000 hr$^{-1}$ and a temperature of 850° C. while Catalyst B under equal conditions shows greater than 90% approach to equilibrium.

(1) Lower OPEX Reactor Costs and (2) Higher Productivity Provided by the SiC-Based Catalyst Support Cores of the Present Disclosure SMR is the main route for industrial hydrogen production, and is an equilibrium-controlled, highly endothermic reaction. Industrially, SMR reactors are operated at high temperature (850 to 950° C.) and high-pressure conditions (20 to 40 bar). The high operating pressure is typically the result of pressure requirements from downstream processes, and high temperatures are required to overcome thermodynamic limitations and achieve high methane conversion (>70%).

The SMR reaction is typically performed on a catalyst disposed as a bed of otherwise loose particles tightly packed within fixed-bed tubular reactors placed in a reactor box. The tubes are placed in an array at fixed distances from each other with natural gas burners interspersed in-between them to provide heat. Heat from the burners (at temperatures of 1100° C. and above) radiates through the reactor tube walls and through the fixed bed to the surface of the catalyst sites where endothermic reforming of methane with steam takes place. The endothermicity of the reaction means that there is continual reduction in temperature on the catalyst surface, which may lead to cold spots. The lowering of heat as a result of the endothermic reaction is counteracted by an increased heat flux from the walls of the reactor. The increased heat flux increases energy demand on the burners. The effect of this increased utility is increased natural gas usage and operating costs.

Figure 20:
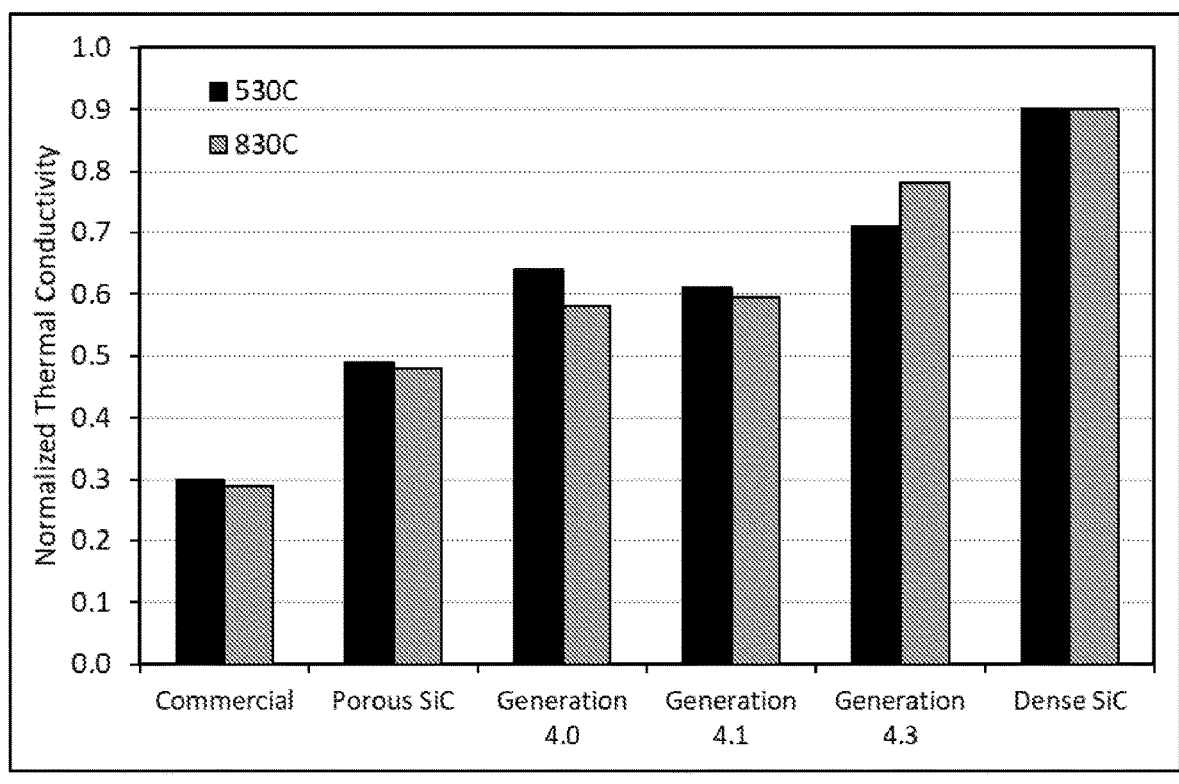
FIG. 20 shows the packed bed thermal conductivity of commercial SMR materials, different generations of inventive catalyst, and dense SiC at 530° C., and 830° C. (values normalized to dense SiC which serves as the benchmark).

The catalysts of the present disclosure have been shown to have high thermal conductivity properties compared to current SMR catalysts (see FIG. 20). Table 13 provides a performance comparison at 20 bara feed pressure for a conventional packed bed effective thermal conductivity and the inventive packed bed showing impact of wall temperature. When the thermal conductivity of inventive catalyst of the present disclosure and commercial SMR catalyst materials are used in a reactor performance predictive model (as described in detail previously herein), the results show that increased thermal conductivity of the inventive material leads to a lowering of tube wall temperatures by up to 30° C. with a representative case of 13 C reduction for similar methane conversion/hydrogen yield compared to commercial catalyst. This phenomenon (purely due to increased thermal conductivity) has several benefits, two of which are as follows.

TABLE 13

| K$_{eff}$ (W/ m-K) | GHSV (hr$^{-1}$) | Wall temp (° C.) | Feed temp (° C.) | CH$_4$ conversion | H$_2$ mass fraction | Avg outlet Temp (° C.) |
|---|---|---|---|---|---|---|
| 9.5 | 1,915 | 800 | 800 | 44.2% | 0.053 | 567.7 |
| 13.2 | 1,915 | 800 | 800 | 46.9% | 0.055 | 578.3 |
| 9.5 | 1,915 | 830 | 800 | 44.4% | 0.053 | 571.1 |
| 13.2 | 1,915 | 830 | 800 | 47.1% | 0.055 | 583.1 |
| 9.5 | 1,915 | 830 | 830 | 47.6% | 0.056 | 574.9 |
| 13.2 | 1,915 | 830 | 830 | 50.4% | 0.058 | 587.2 |
| 9.5 | 1,915 | 860 | 860 | 51.0% | 0.059 | 584.0 |
| 13.2 | 1,915 | 860 | 860 | 53.9% | 0.061 | 598.2 |

Firstly, if tube wall temperatures are not dropped but maintained at set constant temperature, the inventive catalyst support material leads to higher outlet temperatures and higher methane conversion/hydrogen yield. This increased performance is a margin for increasing feed flow without reducing the baseline conversion (conversion of commercial catalyst at similar conditions). Increased feed flow leads to increased productivity and is attractive to hydrogen producers with limited plant capacity.

Secondly, the increase in reactor tube outlet temperatures as a result of use of the inventive material implies that the reactor tube wall temperatures can be reduced by a similar margin and still keep the original heat flux across the reactor tube without a loss in methane conversion. The lowering of tube wall temperatures by 30° C. is as a consequence of lowering of natural gas burner temperatures by as much as 125° C. Burners burning as a reduced temperature has the effect of less natural gas being consumed and hence a reduction in operation expenses (OPEX) associated with natural gas burner fuel. A reduction of 30° C. to a burner temperature of 1100° C.

Key advantages for catalysts according to the present disclosure are summarized based on the detailed descriptions herein:

Reduced tube wall metal temperature of 5 to 30° C., at equal GHSV, temperature, pressure, and feed composition as compared to a commercial SMR catalyst Increased feed flow rate and corresponding hydrogen production by 1 to 30% with equal conversion as compared to a commercial SMR catalyst with equal temperature, pressure, and feed composition Lower operating costs for production of hydrogen result from a lower tube wall temperature. As reported by Zolotech, a 30-50 F (16 to 28° C.) drop in tube wall temperatures results in a fuel savings of 1.5 to 2.5 BTU/scf which corresponds to an annual OPEX savings of $200,000 to $350,000 for a 100 million SCFD reformer. Catalysts of the present disclosure will reduce SMR OPEX by at least 2.5 BTU/scf and in a range of 1 to about 3 BTU/scf when compared to a conventional methane reforming catalyst in a similar plant design.

A reduced tube wall temperature of 30° C. used in conjunction with a conformal catalyst packing, as enabled with catalysts of the present disclosure, will facilitate easy catalyst integration within existing reactor tubes or existing tube and plant designs. This technology differentiates from structured catalysts which are difficult to integrate into existing plant tubes and reactor designs. Kumar et al, 2015, report that a 20° C. reduction in tube wall temperature will increase the tube life by 50%. They also report than a 1% reduction in the energy cost portion of plant OPEX results in a savings of $600,000 per year for a 100 million SCFD Hydrogen plant. A 30° C. reduction in tube wall temperature will reduce energy costs for the production of hydrogen from about 0.25 to about 1%.

Rostrup-Nielsen and Sehested 2003 report that without steam export, the energy consumption for hydrogen production from SMR is 300 BTU/scf. The reduction in tube wall temperature thereby reduces the OPEX by up to about 1% or from a range of about 0.1 to about 1% for the production of hydrogen from methane reforming using the disclosed catalyst. The total thermal efficiency of a methane reforming plant which includes waste heat recovery is about 95%. An about 1% reduction in operating costs is significant for hydrogen production and is an additional savings in addition to the reduced cost for tube replacement and the associated plant downtime during a tube turnaround, e.g. maintenance and tube replacement cycle.

As described in the John Zinc Combustion Handbook, SMR tubes when operated at high temperature and pressure are in the creep regime and near the mechanical limit for material properties. Tube failures can create a safety hazard and fire at the plant which also reduces uptime. The catalysts of the present disclosure allow lower wall temperatures and thus move the tube wall operating temperature away from the mechanical limit for performance to reduce tube cracks, ruptures, and plant shutdowns. The catalysts of the present disclosure can extend the tube life by 3 to 12 months and can allow the plant to operate safely with fewer incidents of tube rupture and plant fires.

Catalysts and Catalyst Cores Comprising SiC Increase Effective Packed Bed Conductivity Through Changes In Solid Loading, Thermal Conductivity, and Emissivity As discussed previously herein, catalysts and catalyst cores (i.e., catalyst supports) of the present disclosure are comprised of a high thermal conductivity composite of $SiC/Al_2O_3$ that offers improved heat transfer in a packed bed. In addition, these catalysts and catalyst cores offer a higher total, normal emissivity as compared to conventional, commercial catalysts, and therefore provide improved heat transfer in a packed bed when operating in a high temperature environment. The improved effective packed bed thermal conductivity from catalyst and catalyst core conductivity and emissivity is realized even when maintaining similar geometry and bed packing density as with conventional catalysts.

The effective bed thermal conductivity was determined experimentally using experimental procedures and equipment described previously herein. As noted previously, the anticipated reactor tube wall temperature when using catalyst systems of the present disclosure can be reduced by 10 to 30° C. in comparison to the requisite wall temperature when using a conventional methane reforming catalyst while providing an equivalent hydrogen production rate.

One standard for calculating the effective packed bed thermal conductivity from individual geometric and bed properties is the ZBS (Zehner, Bauer, and Schlunder) model. The ZBS model includes a representative cylindrical unit cell comprised of the catalyst pellet and fluid medium and takes into account the geometrical interactions between other pellets and the solid/fluid domain. The model adjusts the effective conductivity based upon the conductivity of the fluid and pellet solid, emissivity of the pellet solid, porosity (i.e., void ratio) of the packed bed (geometric effects), shape corrections, deformation parameters, pressure, and gas kinetic changes based on the mean free path for gas molecules.

In previous examples herein, the effect of an increased pellet thermal conductivity was explored in isolation. At lower temperatures, the effect of radiative heat transfer is minimized or trivial. However, at the temperatures utilized during steam methane reforming and other catalytic reactions, radiative heat transfer is a primary lever. Radiation plays a primary role due to scaling with temperature cubed. The ZBS model allows for the effects of emissivity and conductivity to be resolved.

Using measured and calculated parameters, the effective packed bed thermal conductivity was determined for a varying range of total, normal emissivity and pellet thermal conductivity. A fixed packed bed geometry was used which corresponds to the experimental measurements discussed in the example above titled "Reduced wall temperature and increased hydrogen production for Steam Methane Reforming using inventive catalyst." The packed bed model was held at a fixed temperature of 800° C., at ambient pressure with a bed porosity of 0.40 in nitrogen gas.

The effects of total, normal emissivity vary exponentially at lower pellet thermal conductivity and linearly at higher pellet conductivity. For reference, the measured and calculated parameters for the catalyst core of the present disclosure and commercial catalysts are provided. The novel core of the present disclosure achieves its enhanced effective packed bed thermal conductivity by improvements in its pellet thermal conductivity as well as its increased total, normal emissivity. However, increases in either parameter would both increase the overall effective conductivity.

In one embodiment of a catalyst of the present disclosure, a SiC-based core (e.g., SiC in a protective alumina matrix) is coated with a thin, translucent covering of porous alumina in order to increase the emissivity of the catalyst produced therefrom. The total, normal emissivity of SiC at high temperature is very high, but it may be increased using other types of coatings, dopants, or base metals. These base metals are normally lightly to heavily oxidized and include, but are not limited to, iron, steel, stainless steel, nickel, titanium, nichrome, etc. SiC is not the only ceramic that can be used to increase emissivity. Other ceramics include carbide coatings, iron oxide, silicon nitride, zirconia, MgO, ZrC, etc. In addition, high emissivity glasses may be used. BSAS can also be used to increase emissivity of the support while also protecting the core, SiC, material from its environment (as further described herein). Other glass, base, or ceramic coatings may be used such as aluminum silicate, borosilicate, Vycor, Pyrex, various carbide materials, CaO stabilized with Zr/Fe/Cr oxides, carbonundum, and unstabilized zirconia.

Thus, by enhancing the thermal conductivity of the catalyst by substituting a high thermal conductivity and high total, normal emissivity material for the conventional catalyst (that is, replacing the porous Ni—Al$_2$O$_3$ composite catalyst with one comprising a catalytic coating on a dense core comprising SiC), the heat transfer capability of the bed improves by a factor of approximately 5 in stagnant conditions, and a constant offset improvement of about 1.5 to 3.5 at the anticipated system flow of 2000 to 5000 GHSV (See FIGS. 10 and 11) representative for methane reforming reactions at high temperature due to the effects of thermal dispersion and pressure turbulent conduction.

The increase in effective radial thermal conductivity more efficiently transfers heat away from the walls of high temperature reactor tubes to the catalyst bed and the reactant gases, thereby more efficiently driving endothermic reactions. The heat required for completing the reaction does not change, but thermal losses are reduced as the peak temperature is reduced, allowing the energy input to be reduced in the form of the feed-rate for fuel and oxygen (or air).

The thermal gradient between the tube wall and the center of the catalyst particulate bed is reduced which allows for a reduced tube wall temperature to produce an equivalent amount of hydrogen. Alternatively, the tube wall can be maintained at the same temperature with a correspondingly similar tube lifetime as a conventional catalyst while concurrently increasing the throughput or productivity of hydrogen by a range of 5 to 30% as compared to a conventional catalyst. Tube lifetime can be significantly increased, thinner-walled tubes, tubes using less-expensive alloys or more conventional manufacturing processes may be used, all of which would achieve significant system capital cost reduction.

Various embodiments of catalyst cores (i.e., catalyst supports) and catalysts according to the present disclosure have been described in detail above, as have various types and classes of reactions in which the catalysts of the present disclosure can be used. It will be understood, however, that the components, features and configurations, as well as the methods of manufacturing the catalyst cores and catalysts and methods of using the same are not limited to the specific embodiments described herein.

By way of example, any of the variety of catalyst cores and catalysts employing the cores described herein can be used with any of a wide variety of catalyzed reactions and processes, including, but not limited to: acetylation, addition reactions, alkylation, dealkylation, hydrodealkylation, reductive alkylation, amination, aromatization, arylation, autothermal reforming, carbonylation, decarbonylation, reductive carbonylation, carboxylation, reductive carboxylation, reductive coupling, condensation, cracking, hydrocracking, cyclization, cyclooligomerization, dehalogenation, dimerization, epoxidation, esterification, Fischer-Tropsch, halogenation, hydrohalogenation, homologation, hydration, dehydration, hydrogenation, dehydrogenation, hydrocarboxylation, hydroformylation, hydrogenolysis, hydrometallation, hydrosilation, hydrolysis, hydrotreating, hydrodesulferization/hydrodenitrogenation (HIDS/HDN), isomerization, methanation, methanol synthesis, methylation, demethylation, metathesis, nitration, oxidation, partial oxidation, polymerization, reduction, steam and carbon dioxide reforming, sulfonation, telomerization, transesterification, trimerization, water gas shift (WGS), and reverse water gas shift (RWGS).

What we claim is:

1. A catalyst comprising:
(a) a core comprising a composite of SiC grains and a protective matrix of one or more metal oxides in voids between the SiC grains, said core having a density ≥60% of theoretical density;
(b) a catalytically active layer adhered to, and external to, said core; and
(c) an interfacial layer located between the core and the catalytically active layer, wherein the interfacial layer comprises alumina, silica, titania, zirconia, a mixture of two or more of the foregoing, or an oxide compound of two or more of the foregoing.

2. The catalyst of claim 1, wherein said one or more metal oxides are chosen from the group consisting of alumina, titania, and silica.

3. The catalyst of claim 1, wherein said protective matrix comprises Al$_2$O$_3$.

4. The catalyst of claim 3, wherein said protective matrix further comprises one or more additional metal oxides chosen from the group consisting of silica, mixed oxides of aluminum and silicon, titania, and mixed oxides of aluminum and titanium.

5. The catalyst of claim 3, wherein said protective matrix further comprises Al$_6$Si$_2$O$_{13}$.

6. The catalyst of claim 1, wherein a volume ratio of metals in the metal oxide protective matrix to SiC in the core, based on the relative amounts of metals in the starting materials used to form the core, is between about 0.025 and about 0.80.

7. The catalyst of claim 3, wherein a volume ratio of aluminum to SiC in the core, based on the relative amounts in the starting materials used to form the core, is between about 0.05 and about 0.50.

8. The catalyst of claim 1, wherein said catalytically active layer comprises one or more catalytically active metals.

9. The catalyst of claim 8, wherein said one or more catalytically active metals are chosen from the group consisting of: Ni, Co, Ru, Rh, Pd, Ir, Pt, Os, Re, Au, Ag, Cu, Fe, Mn, Mg, V, Mo, and Cr.

10. The catalyst of claim 1, wherein said catalytically active layer comprises a porous coating over the core and a catalytically active material disposed on the internal and external surfaces of the porous coating.

11. The catalyst of claim 10, wherein said porous coating comprises a porous alumina shell over the core.

12. The catalyst of claim 1, wherein said interfacial layer comprises a dense coating covering said core, wherein said interfacial layer has a density from about 80% to 100% of theoretical density.

13. The catalyst of claim 12, wherein said interfacial layer comprises alumina, silica, titania, or barium strontium aluminosilicate ("BSAS").

14. The catalyst of claim 1, further comprising a gas-tight, hermetic, protective coating located between the catalytically active layer and the interfacial layer.

15. The catalyst of claim 14, wherein said gas-tight, hermetic, protective coating comprises $Al_2O_3$ in combination with at least one glass former.

16. The catalyst of claim 15, wherein said at least on glass former is chosen from the group consisting of alkaline earth aluminosilicate glasses, alkaline earth aluminoborosilicate glasses, and lanthanide aluminosilicate glasses.

17. The catalyst of claim 14, wherein said gas-tight, hermetic, protective coating comprises $Al_2O_3$ and at least on glass former chosen from the group consisting of: CaO—$SiO_2$—$Al_2O_3$ ("CAS"), MgO—$SiO_2$—$Al_2O_3$ ("MAS"), SrO—$SiO_2$—$Al_2O_3$, BaO—$SiO_2$—$Al_2O_3$, mixed alkaline earth aluminosilicates, rare earth elements doped alkaline earth aluminosilicates, $B_2O_3$ modified alkaline earth aluminosilicates, and $TiO_2$ modified alkaline earth aluminosilicates.

18. A method of performing a catalyzed reaction, comprising:

(a) feeding one or more reactants into a reactor containing a catalyst according to claim 1, wherein the catalytically active layer comprises one or more catalytically active metals suitable for catalyzing the reaction; and (b) reacting the one or more reactants in the reactor over the catalyst to produce a product.

19. The catalyst of claim 1, wherein the interfacial layer has a density greater than the density of the core.

20. The catalyst of claim 1, wherein the interfacial layer comprises α-alumina.

21. The catalyst of claim 1, wherein the interfacial layer wherein comprises a dense alumina coating covering the core, wherein the interfacial layer has a density from 70% to 90% of theoretical density.

22. A catalyst comprising:

(a) a core comprising a composite of SiC grains and a protective matrix of one or more metal oxides in voids between the SiC grains, said core having a density ≥60% of theoretical density;

(b) a catalytically active layer adhered to, and external to, said core; and (c) a gas-tight, hermetic, protective coating located between the catalytically active layer and the core.

23. The catalyst of claim 22, wherein said gas-tight, hermetic, protective coating comprises α-alumina.

\* \* \* \* \*